US011906089B2

(12) United States Patent
Hargett et al.

(10) Patent No.: US 11,906,089 B2
(45) Date of Patent: Feb. 20, 2024

(54) CO-MOLDED SNAP-ON SUPPORT BASE, AND SUPPORT SYSTEM AND METHOD OF USING THE SAME

(71) Applicant: The Boeing Company, Chicago, IL (US)

(72) Inventors: Michael Bruton Hargett, Charleston, SC (US); Brian Erick Waters, Holly Hill, SC (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/827,693

(22) Filed: May 28, 2022

(65) Prior Publication Data

US 2023/0400124 A1    Dec. 14, 2023

(51) Int. Cl.
*F16L 3/127* (2006.01)
*F16L 3/223* (2006.01)
(Continued)

(52) U.S. Cl.
CPC .............. *F16L 3/127* (2013.01); *F16L 3/13* (2013.01); *F16L 3/2235* (2013.01); *F16L 3/2431* (2019.08); *H02G 3/32* (2013.01)

(58) Field of Classification Search
CPC . F16L 3/127; F16L 3/2431; F16L 3/13; F16L 3/2235; F16L 3/23; F16L 3/1222; H02G 3/32
See application file for complete search history.

(56) References Cited

U.S. PATENT DOCUMENTS

| 3,157,377 A | 11/1964 | Orenick |
| 4,244,544 A | 1/1981 | Kornat |
| (Continued) | | |

FOREIGN PATENT DOCUMENTS

| CA | 2959870 A1 * | 8/2013 | ............... B64C 1/00 |
| DE | 202014008285 U1 | 1/2015 | |

OTHER PUBLICATIONS

Mcmaster strut channel framing and fitting online product data page dated Jun. 12, 2020, https://www.mcmaster.com/strut-channel-systems/ (Year: 2020).*

(Continued)

*Primary Examiner* — Terrell L McKinnon
*Assistant Examiner* — Ding Y Tan

(57) ABSTRACT

There is provided a co-molded snap-on support base, including a top portion, and a bottom portion co-molded with the top portion. The bottom portion includes an attachment clip for a one-step snap-on attachment to an elongate bar structure. The attachment clip includes first and second side attachment arms. The attachment clip further includes a lateral retaining strip formed on each of the first and second side attachment arms. The bottom portion further includes at least one secondary retaining clip projecting from an interior surface of the bottom portion of the co-molded snap-on support base. The at least one secondary retaining clip is designed to mate with at least one hole in the elongate bar structure, to align and to further secure the co-molded snap-on support base to the elongate bar structure. The co-molded snap-on support base is used to reduce a time of installation of apparatuses for routing elongate elements.

20 Claims, 33 Drawing Sheets

(51) Int. Cl.
*H02G 3/32* (2006.01)
*F16L 3/24* (2006.01)
*F16L 3/13* (2006.01)

(56) References Cited

U.S. PATENT DOCUMENTS

| | | | |
|---|---|---|---|
| 5,149,027 A * | 9/1992 | Weber | F16L 3/2235 |
| | | | 248/68.1 |
| 5,189,766 A | 3/1993 | Weber | |
| 5,333,822 A | 8/1994 | Benoit et al. | |
| 5,799,906 A | 9/1998 | Hillegonds | |
| 5,967,468 A | 10/1999 | Veghte et al. | |
| 6,443,403 B1 | 9/2002 | Page et al. | |
| 6,729,585 B2 | 5/2004 | Ogden | |
| D497,100 S * | 10/2004 | Stephen | D8/382 |
| 6,880,787 B2 | 4/2005 | Stephen et al. | |
| 7,523,898 B1 | 4/2009 | Barry et al. | |
| 7,654,492 B2 | 2/2010 | Balderama et al. | |
| 7,686,259 B2 * | 3/2010 | Caveney | H02G 3/32 |
| | | | 211/85.5 |
| 7,770,852 B2 * | 8/2010 | Caveney | H02G 3/32 |
| | | | 411/401 |
| 8,403,272 B2 | 3/2013 | Ohno | |
| 9,470,252 B2 * | 10/2016 | Karls | F16B 19/1081 |
| 10,907,679 B2 | 2/2021 | Shehab | |
| 2004/0037667 A1 * | 2/2004 | Stephen | F16B 35/041 |
| | | | 411/401 |
| 2005/0242245 A1 * | 11/2005 | Balderama | F16L 3/23 |
| | | | 248/65 |
| 2005/0258314 A1 | 11/2005 | Schilles et al. | |
| 2006/0080933 A1 | 4/2006 | Robicheau | |
| 2009/0282655 A1 * | 11/2009 | James | B64C 1/20 |
| | | | 24/458 |
| 2010/0294896 A1 | 11/2010 | Sayilgan | |
| 2013/0187014 A1 * | 7/2013 | James | F16B 39/28 |
| | | | 248/222.14 |
| 2013/0189050 A1 * | 7/2013 | James | F16B 37/045 |
| | | | 411/166 |
| 2014/0014775 A1 * | 1/2014 | Luthi | H02G 5/00 |
| | | | 242/472.8 |
| 2015/0316091 A1 * | 11/2015 | James | H02G 3/32 |
| | | | 411/166 |
| 2018/0356007 A1 * | 12/2018 | Waters | F16L 3/137 |
| 2019/0078606 A1 * | 3/2019 | Shehab | F16B 39/023 |

OTHER PUBLICATIONS

HellermannTyton Jul. 2011 bundle separation, mount and cable management product catalog, (Year: 2011).*

Anixter Inline Ratchet P-Clamps from HellermannTyton, dated Nov. 1, 2019 https://www.anixter.com/en_us/manufacturers/h/hellermanntyton/hellermanntyton-inline-ratchet-p-clamp.html (Year: 2019).*

* cited by examiner

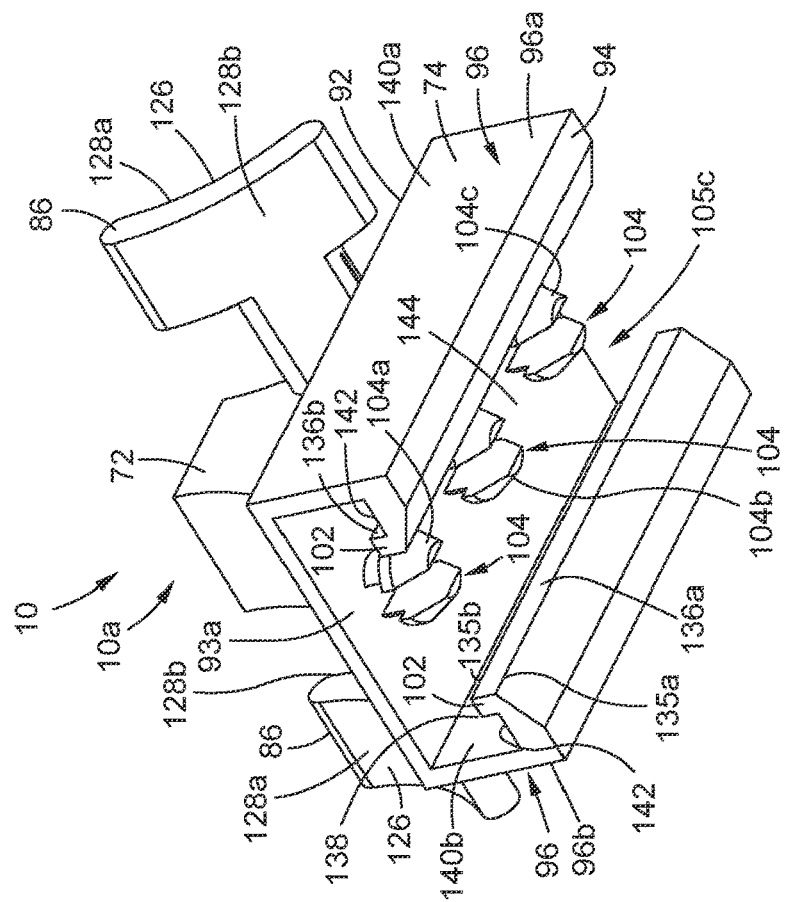
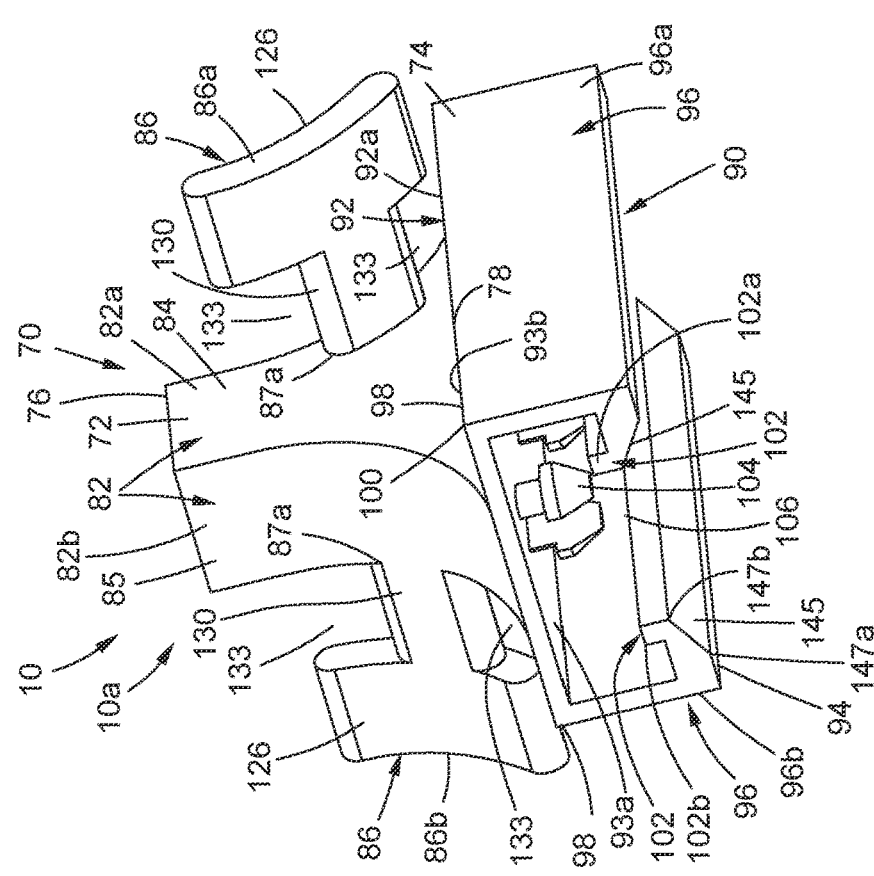
FIG. 2A
FIG. 2B

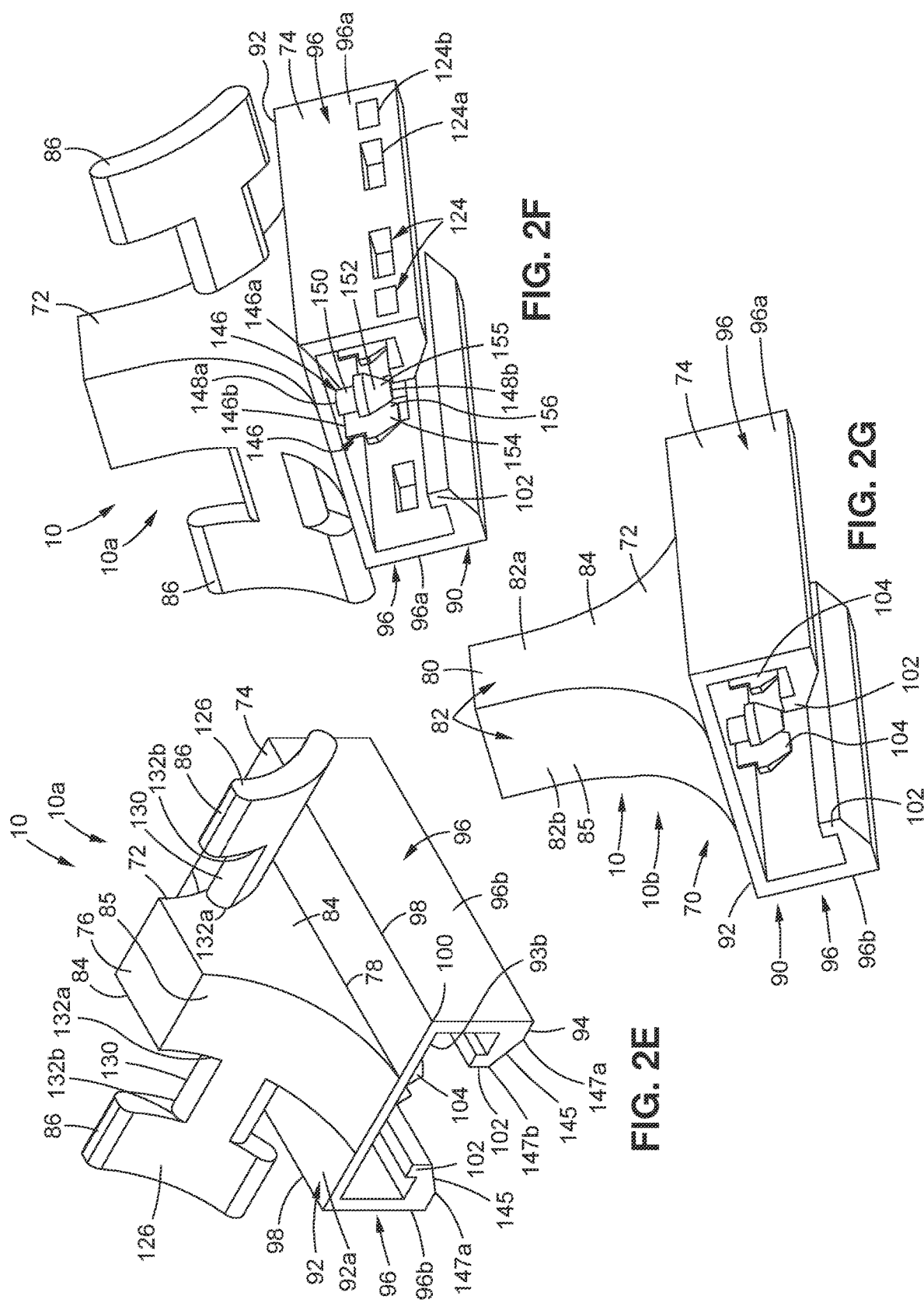

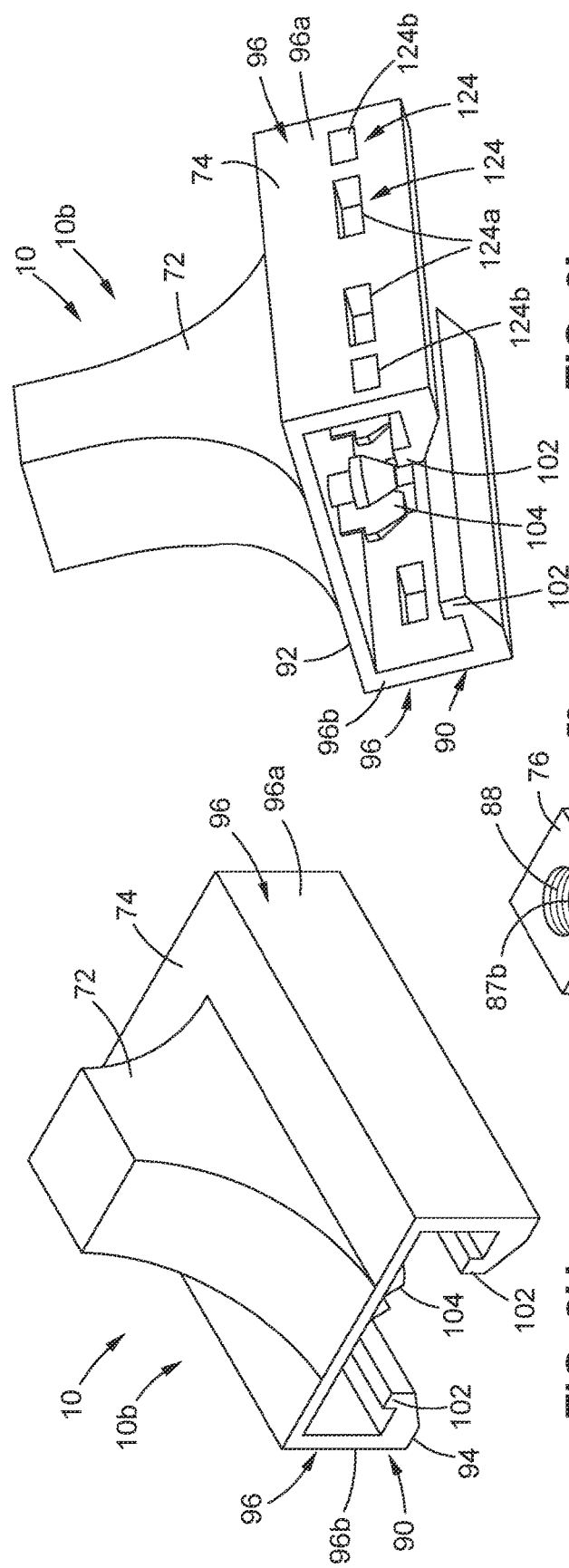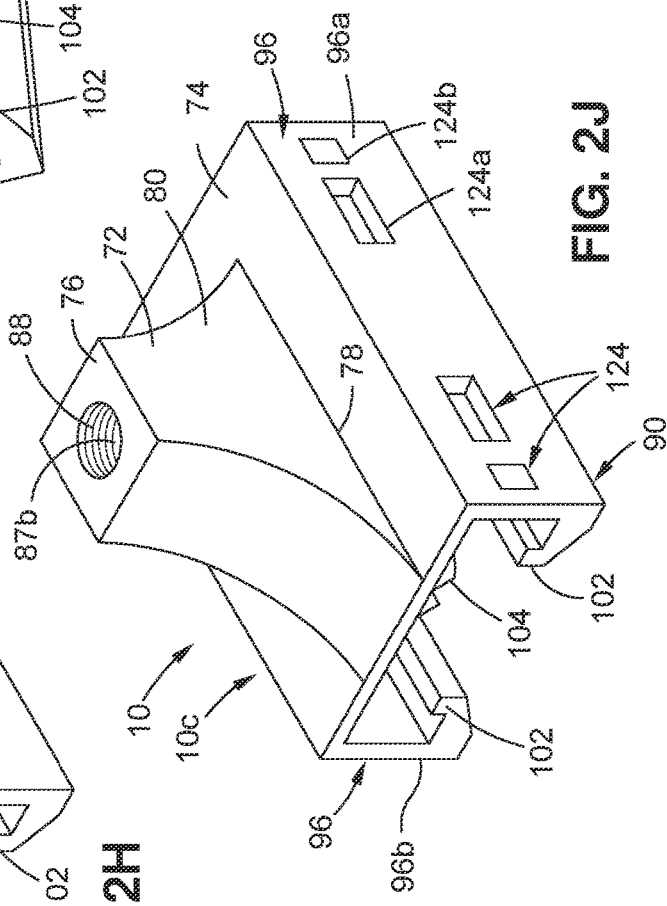

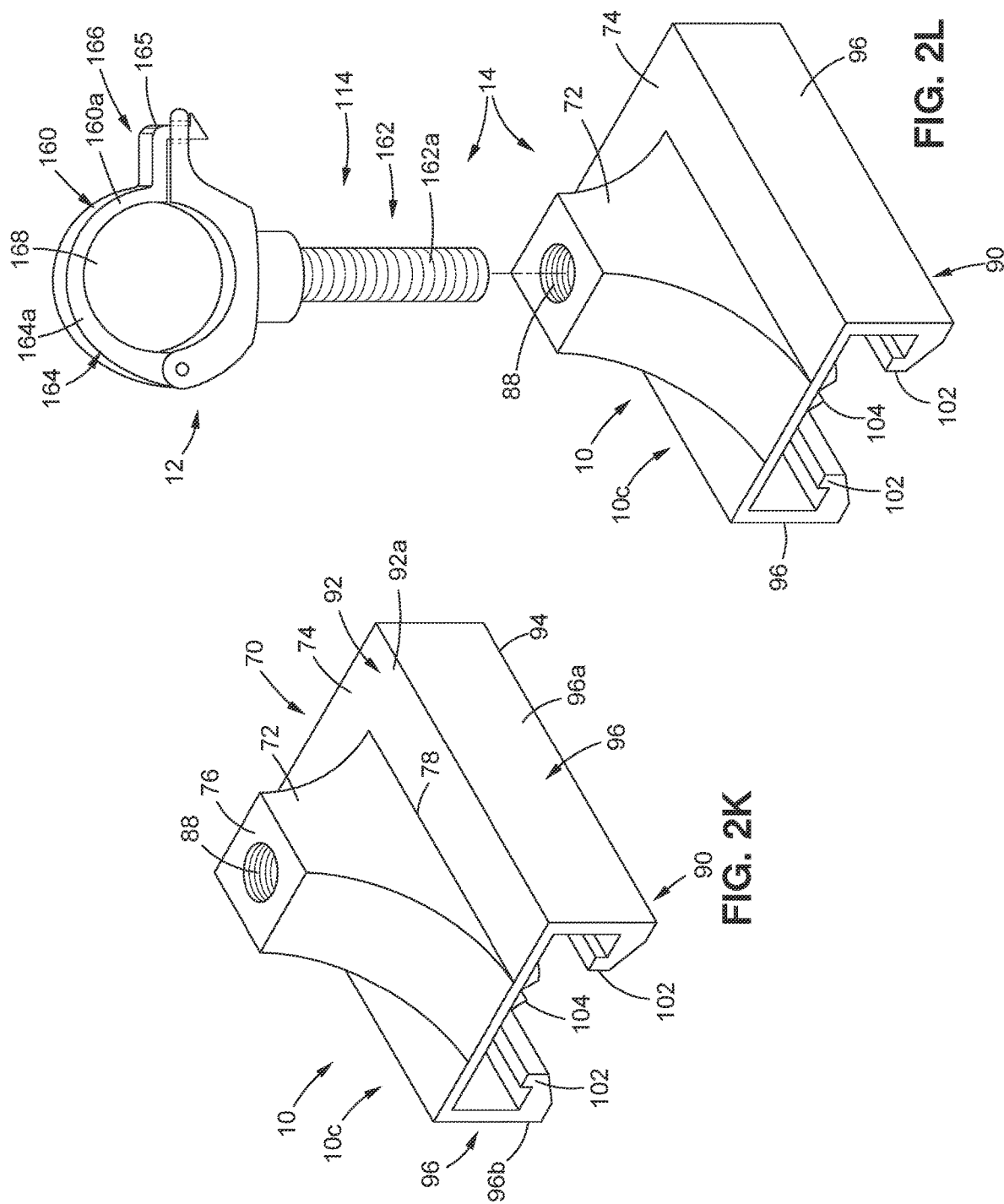

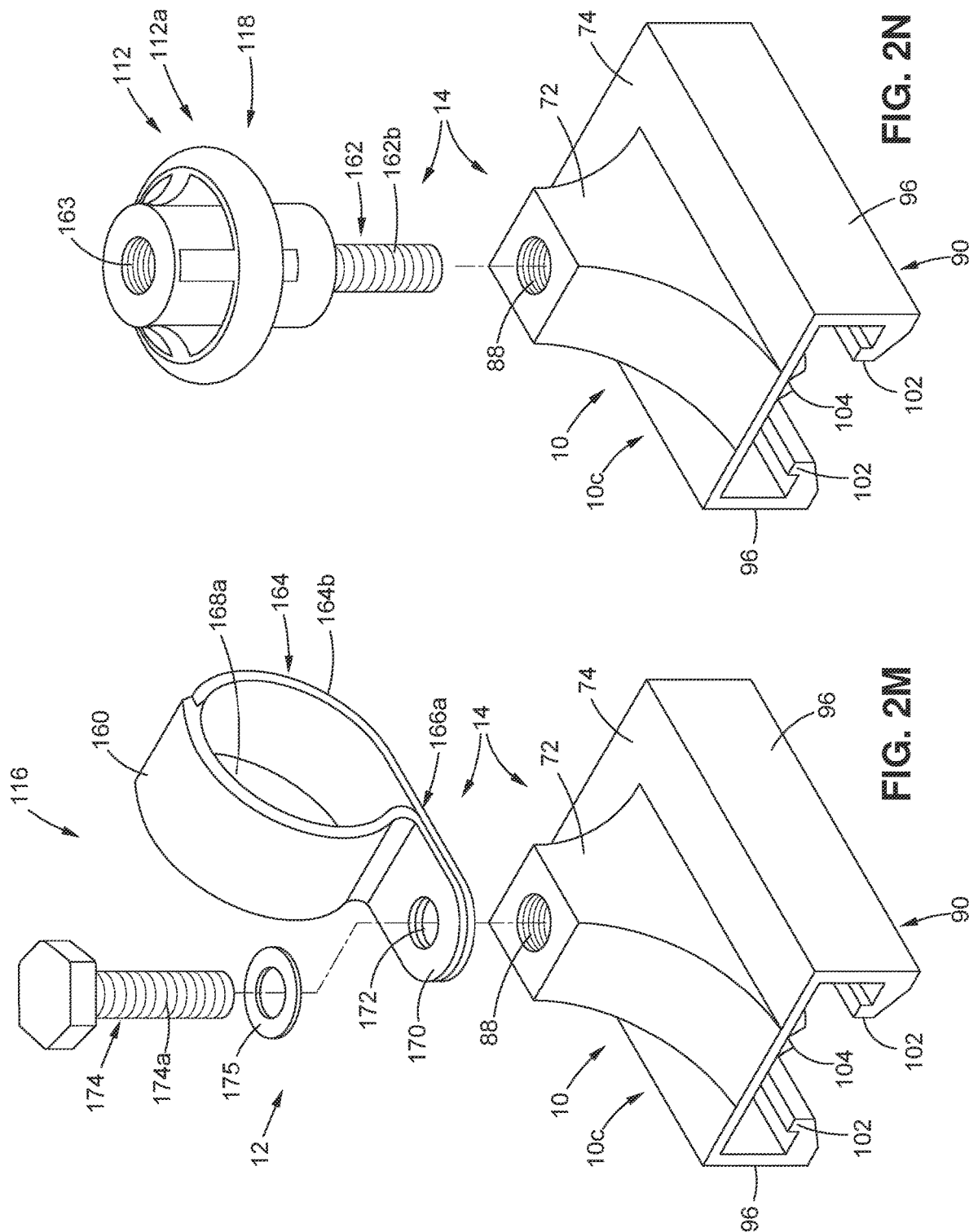

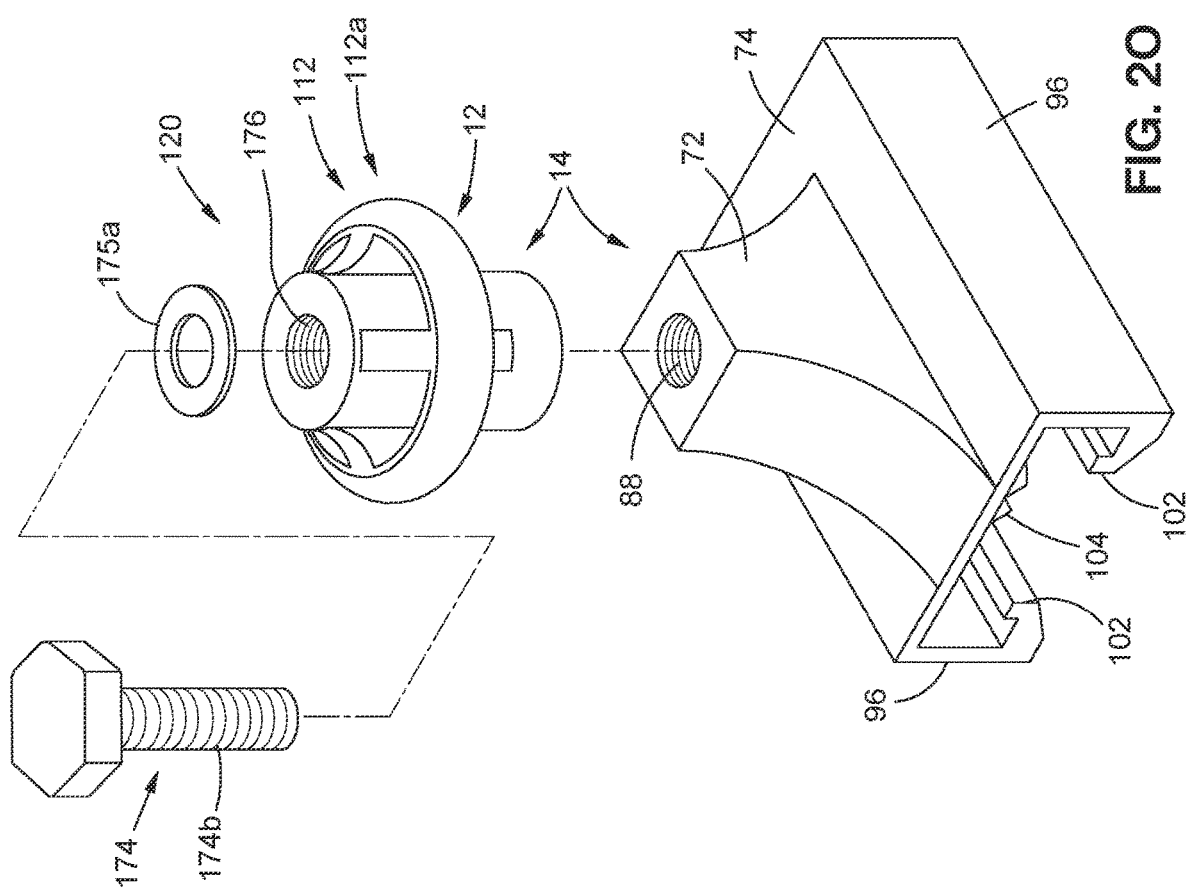

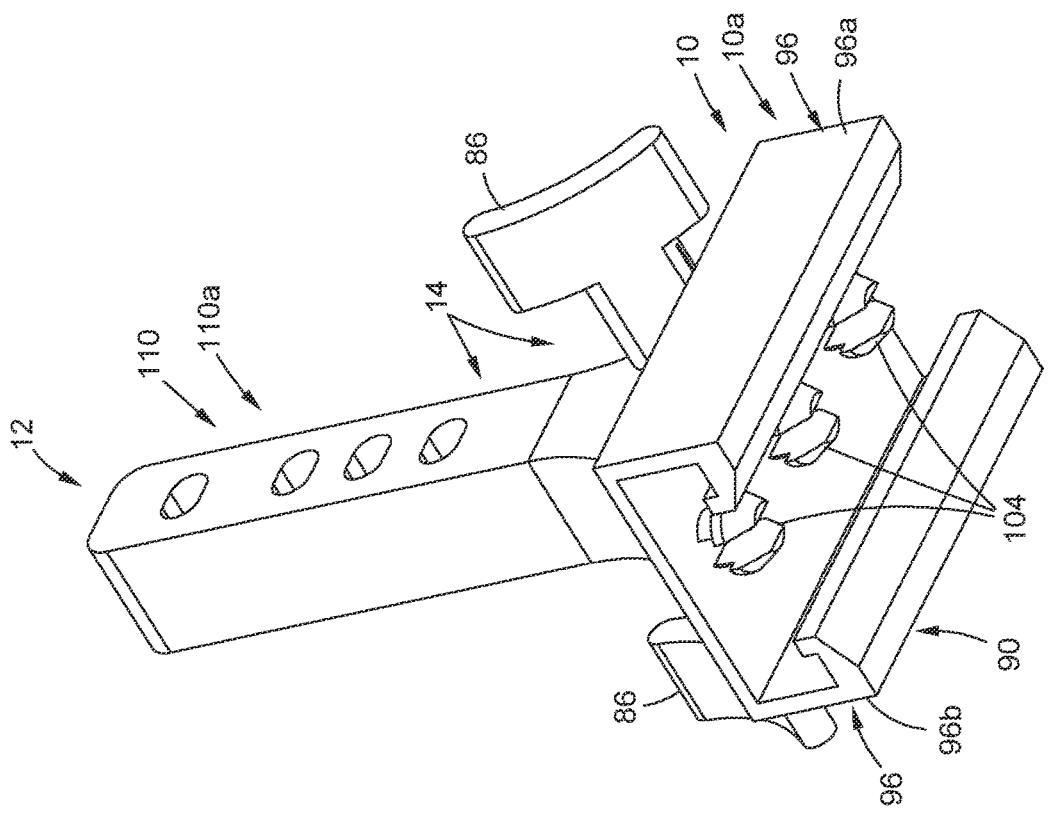
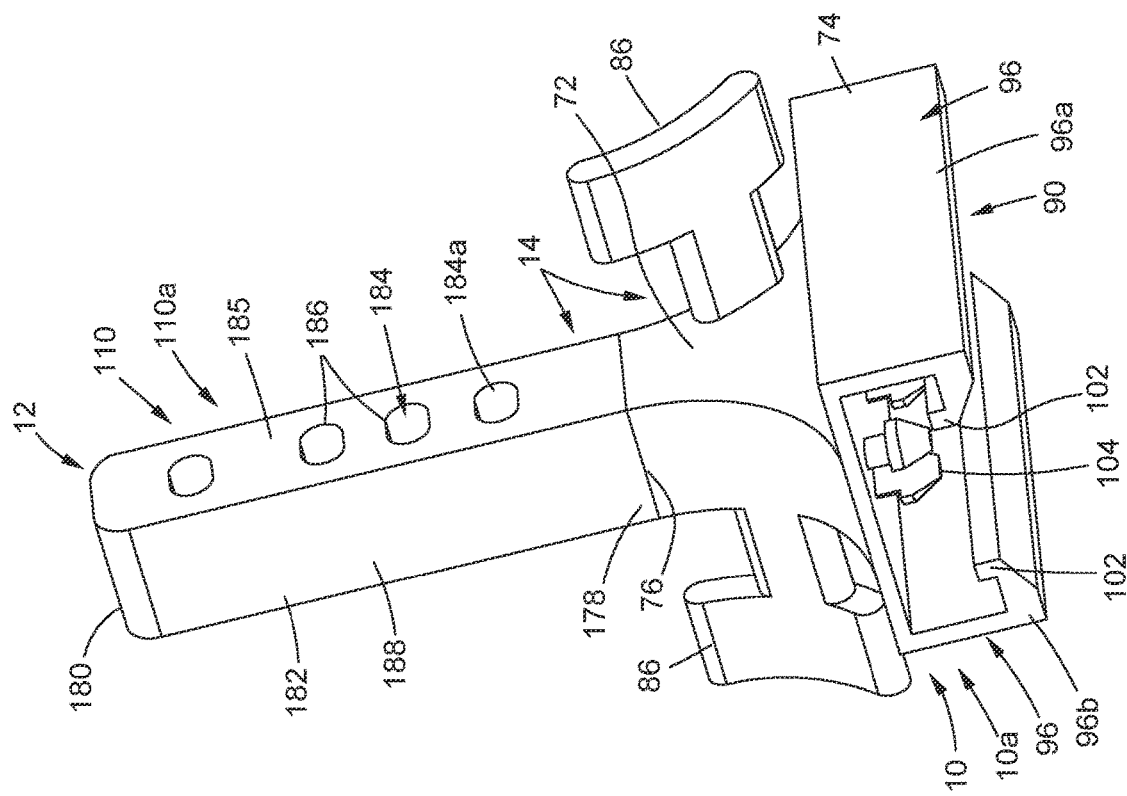

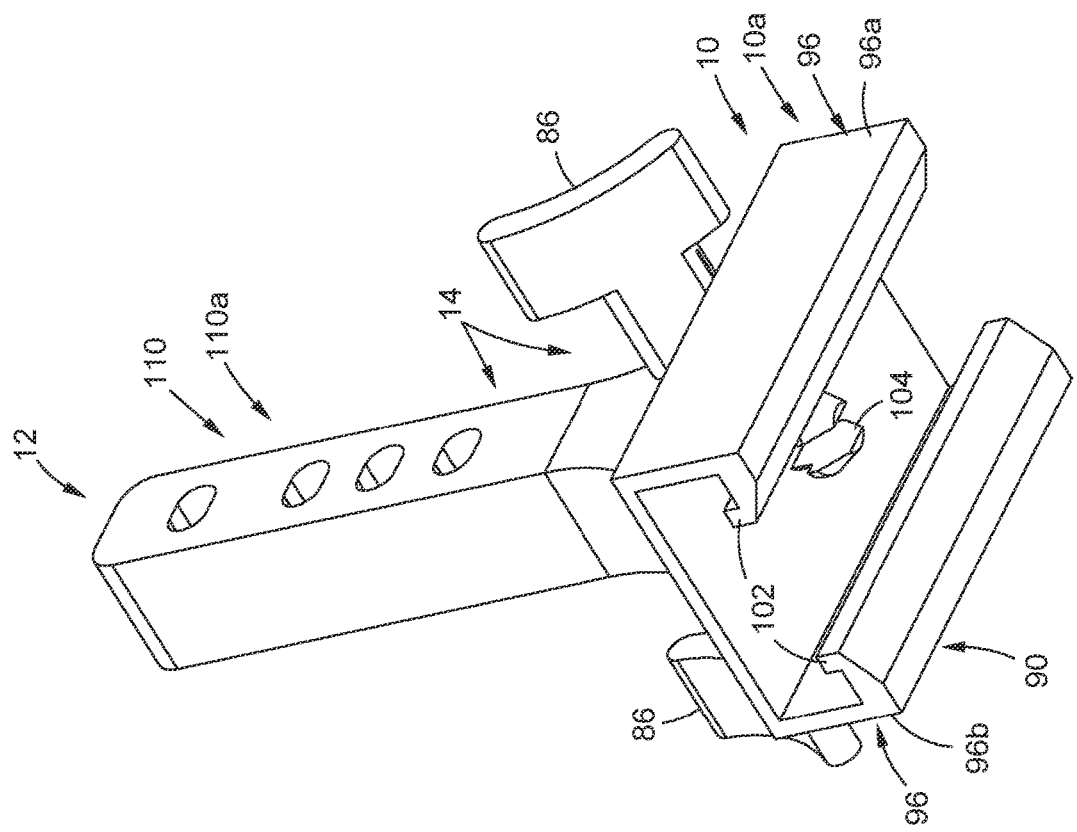
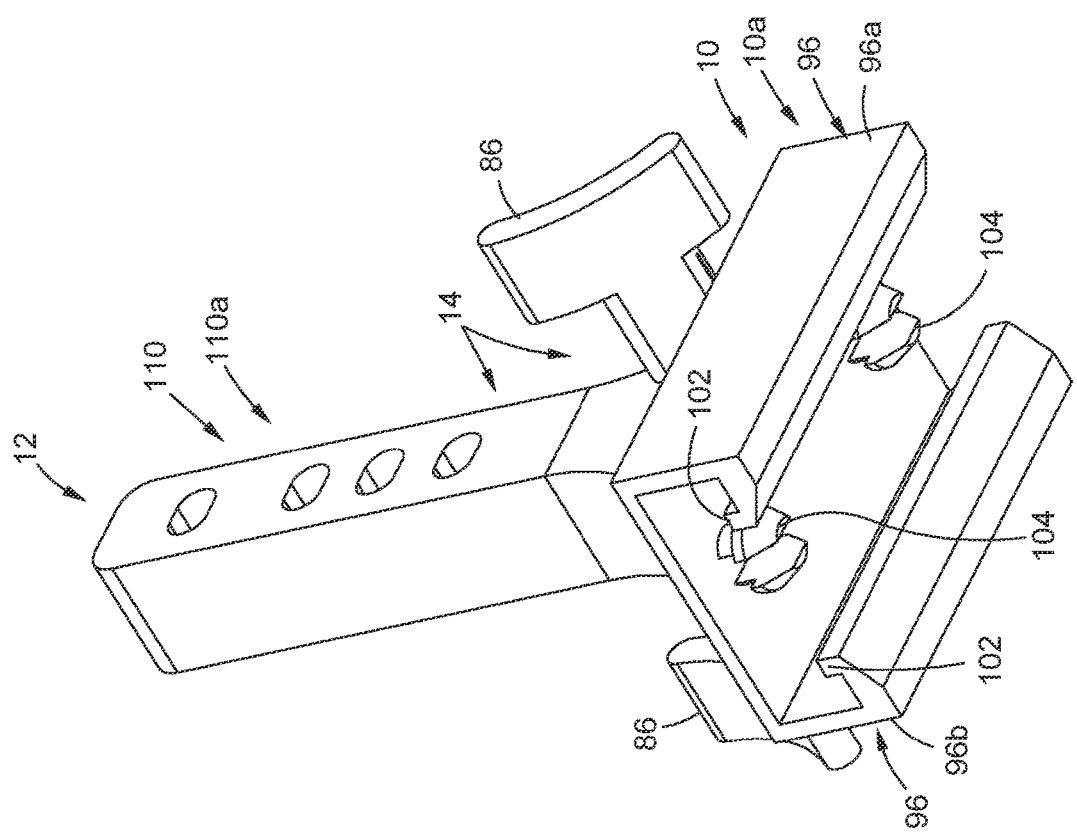

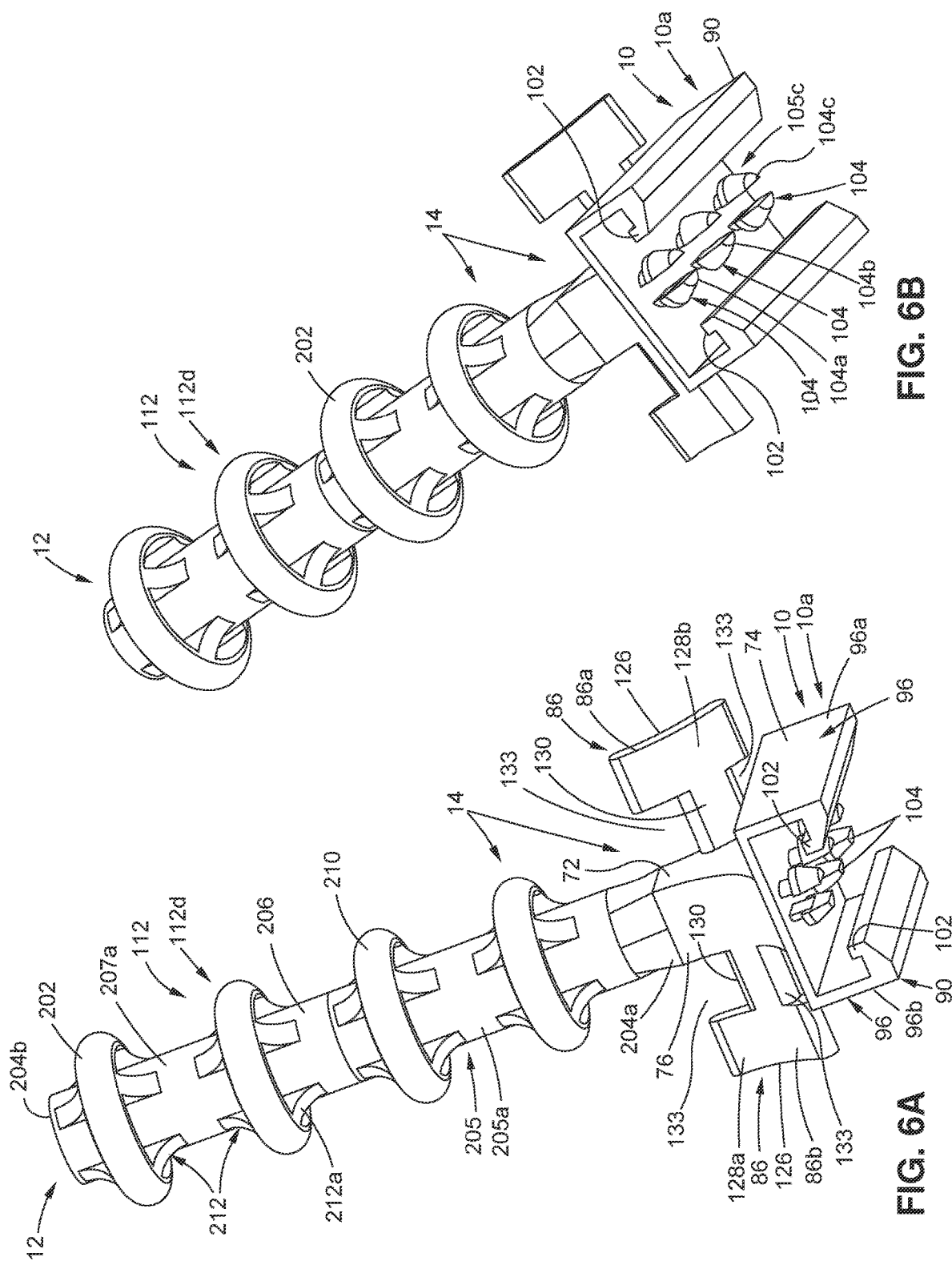

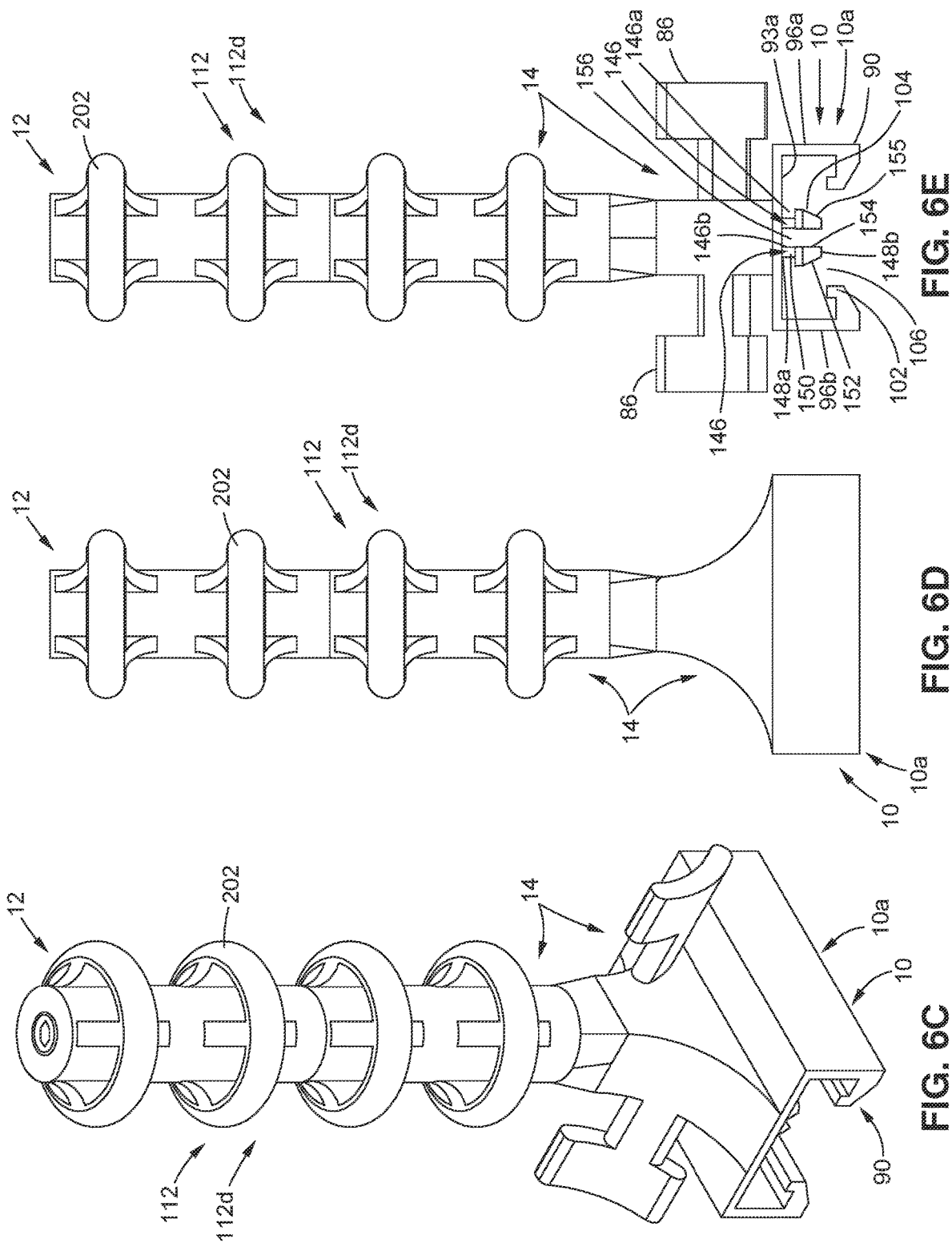

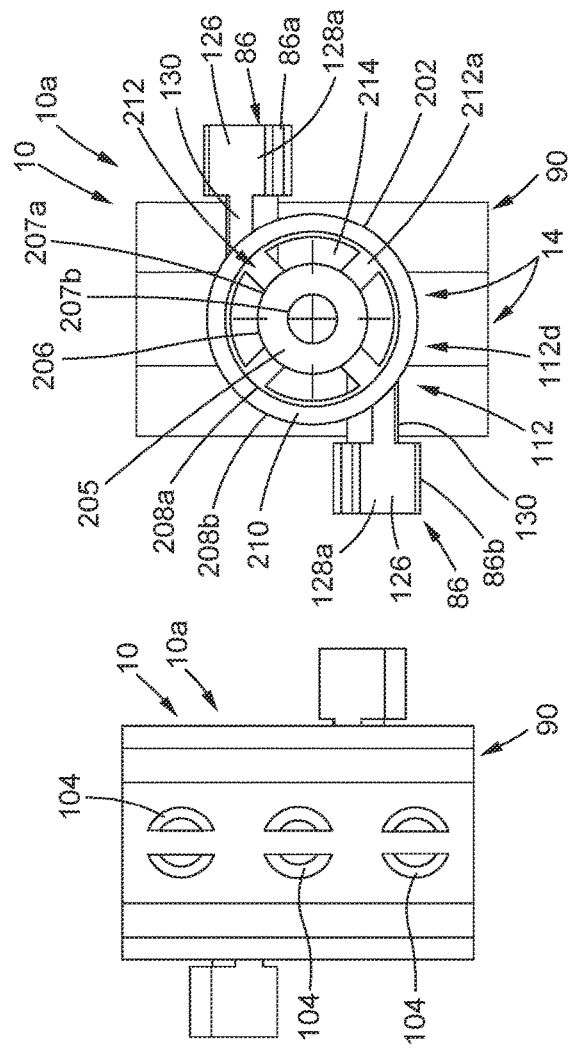
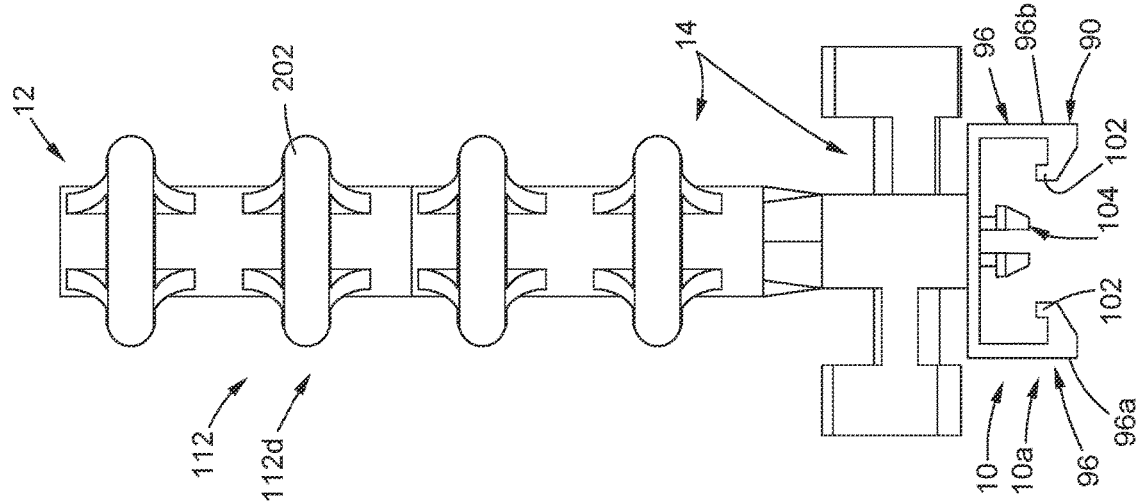

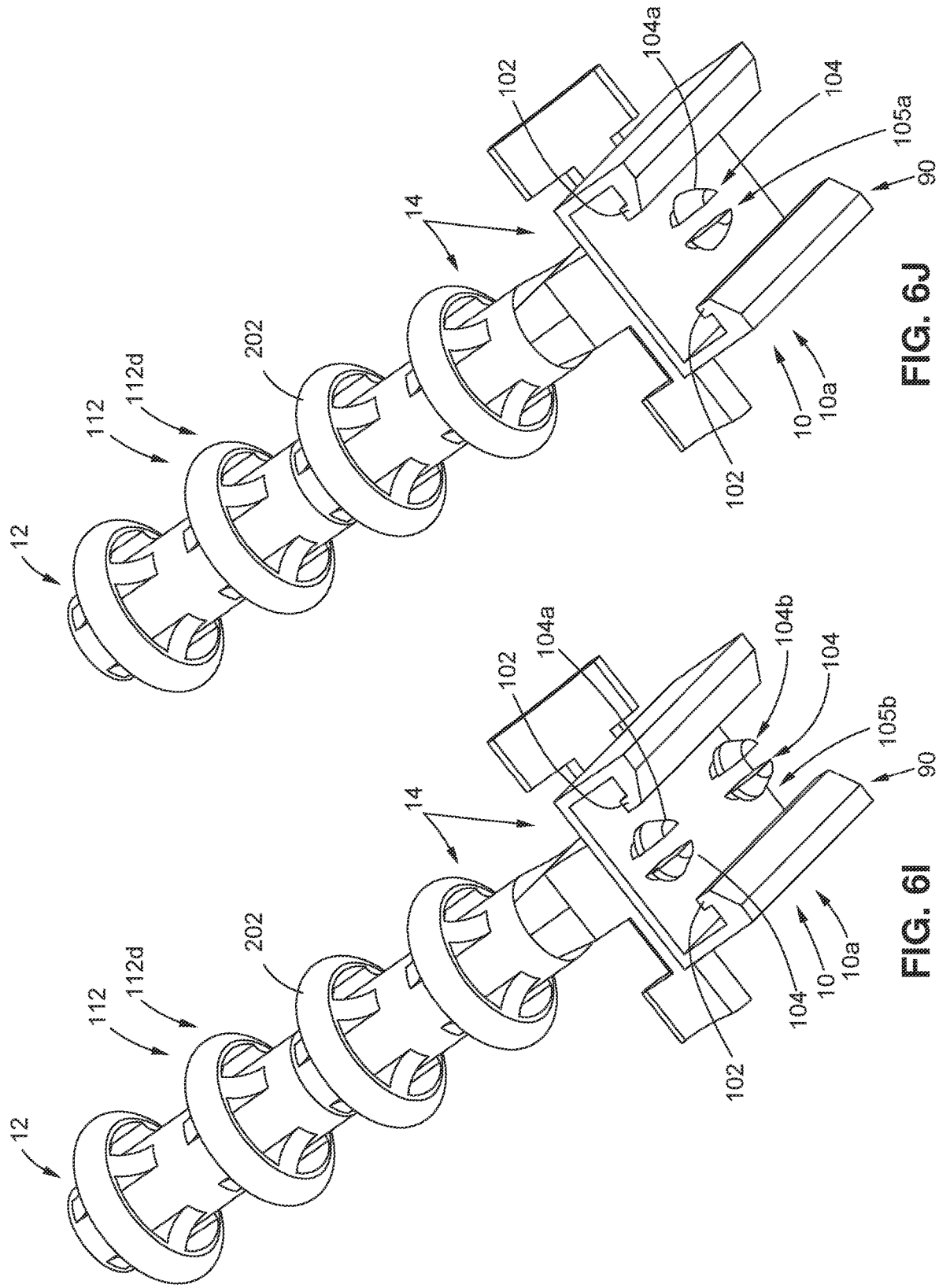

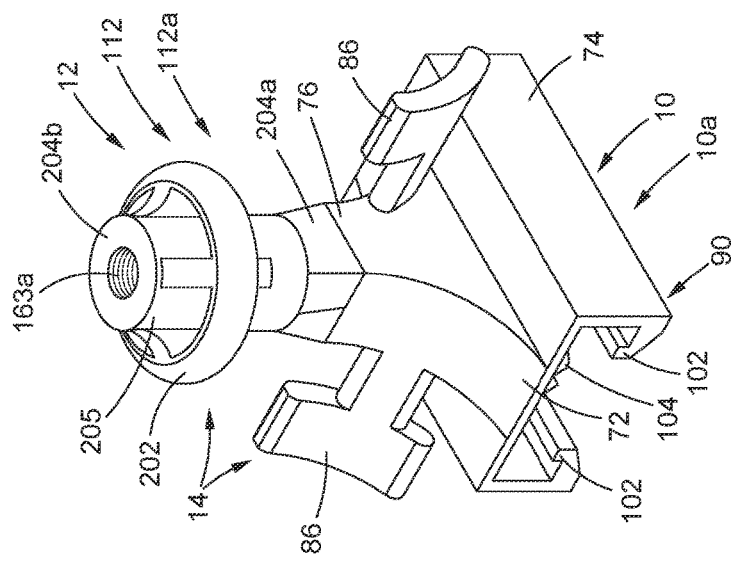
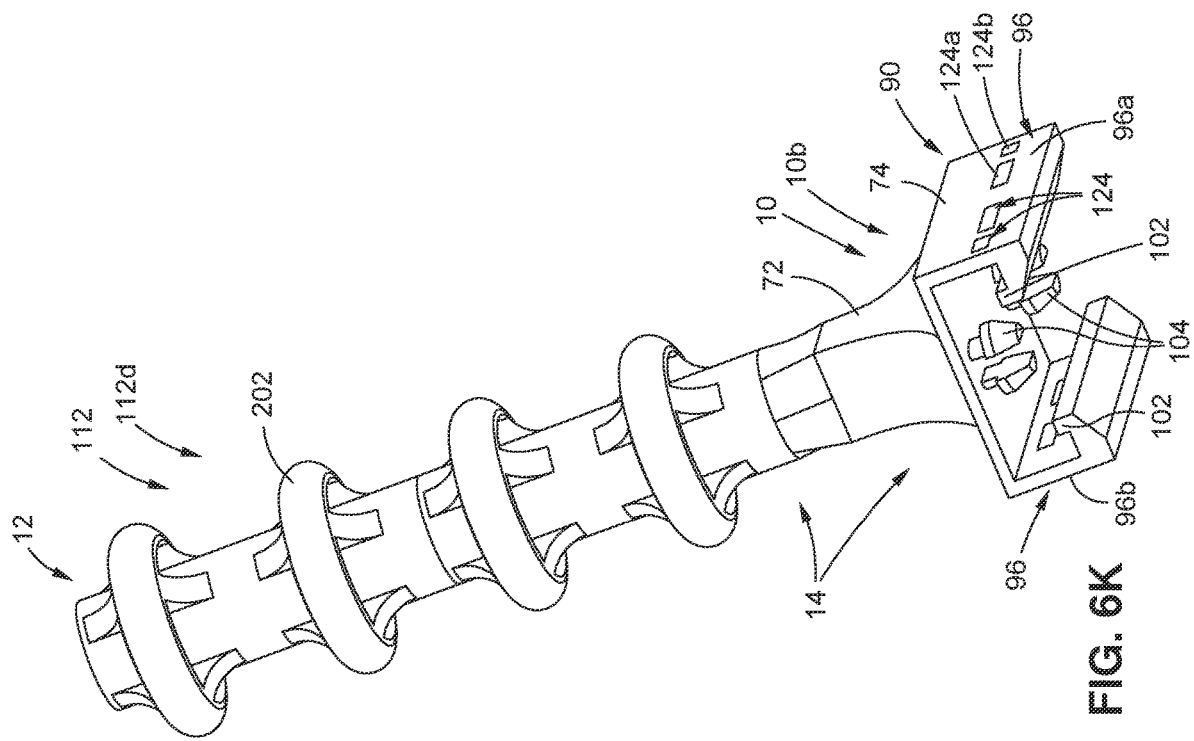
FIG. 6L.
FIG. 6K.

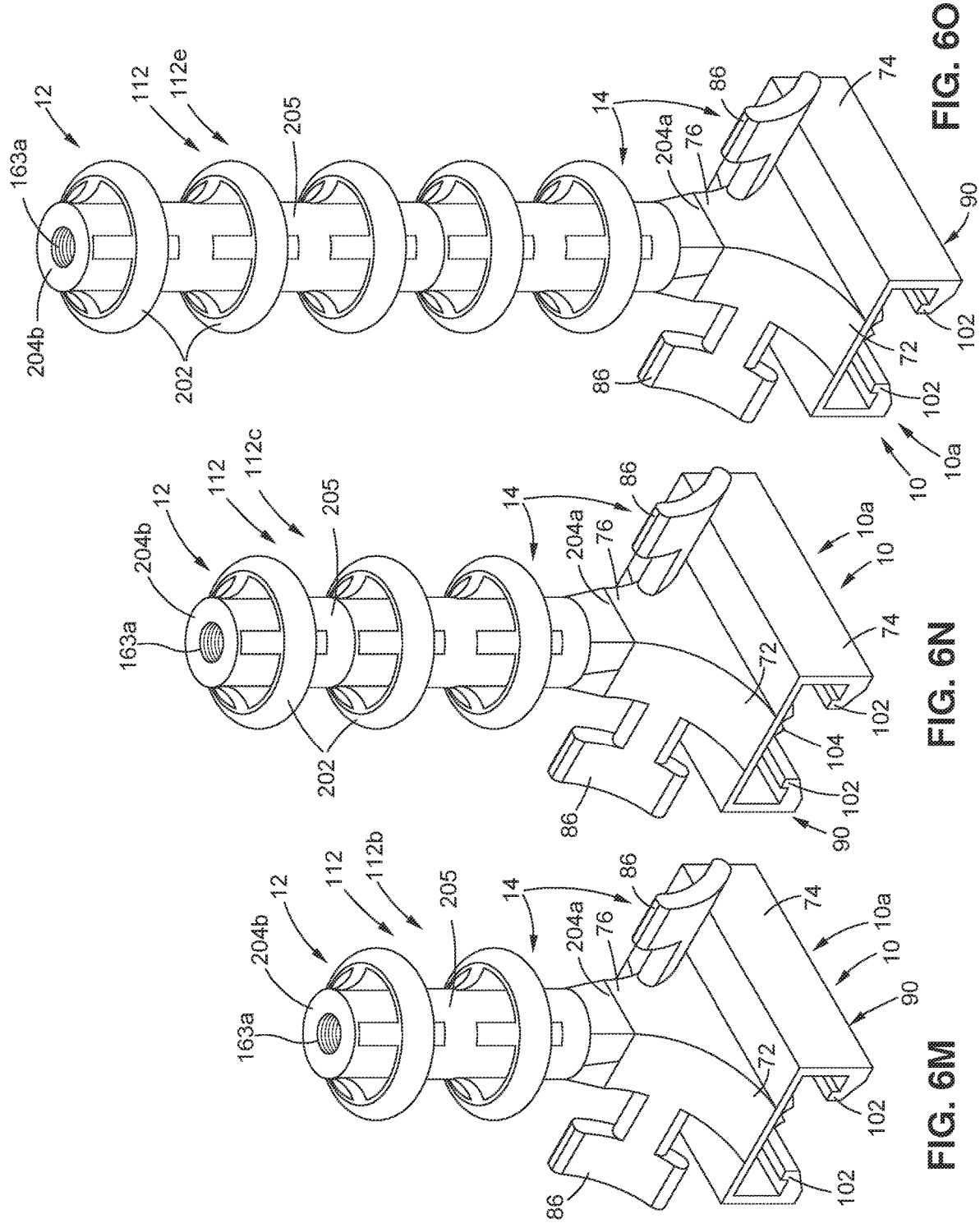

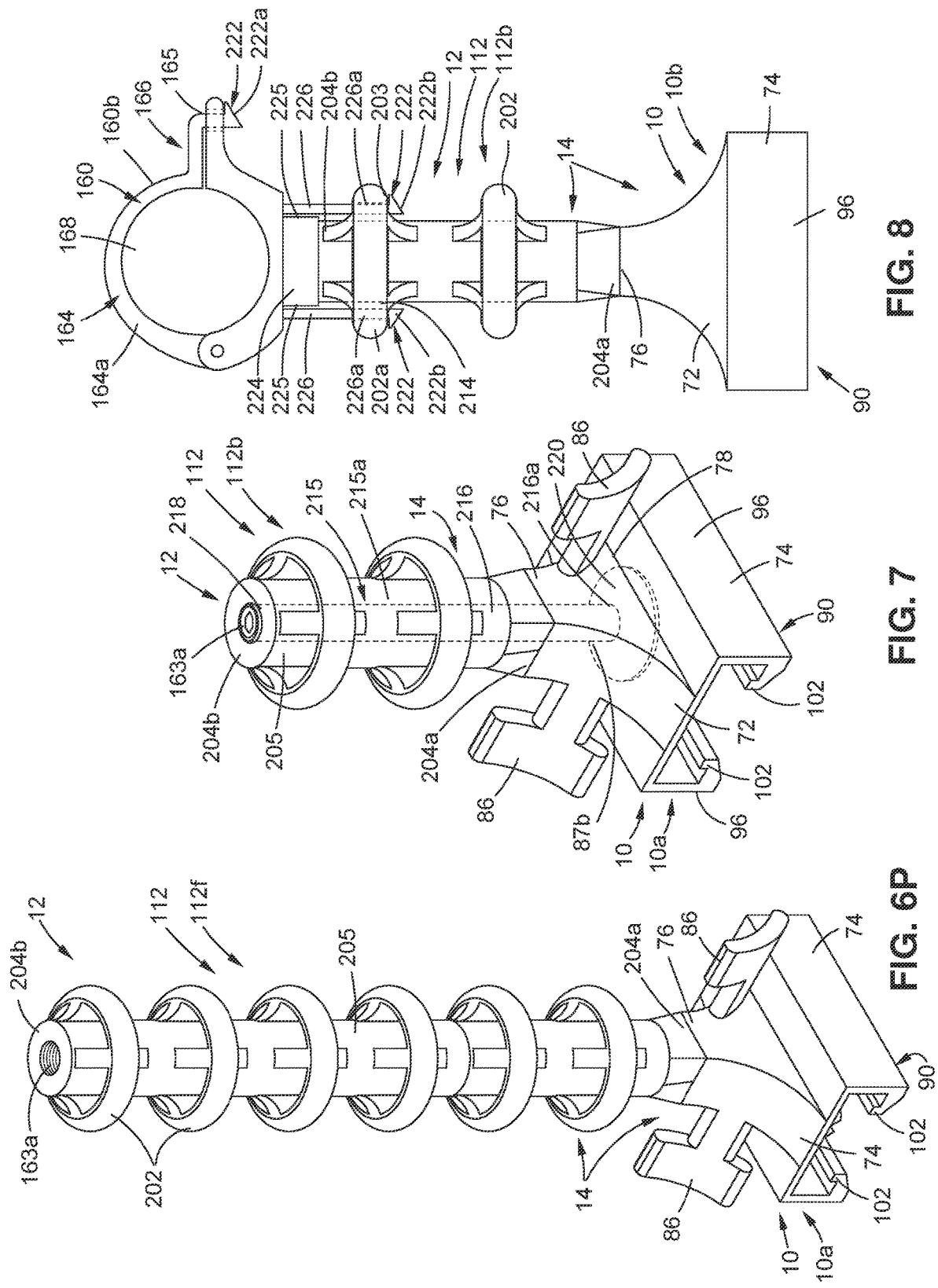

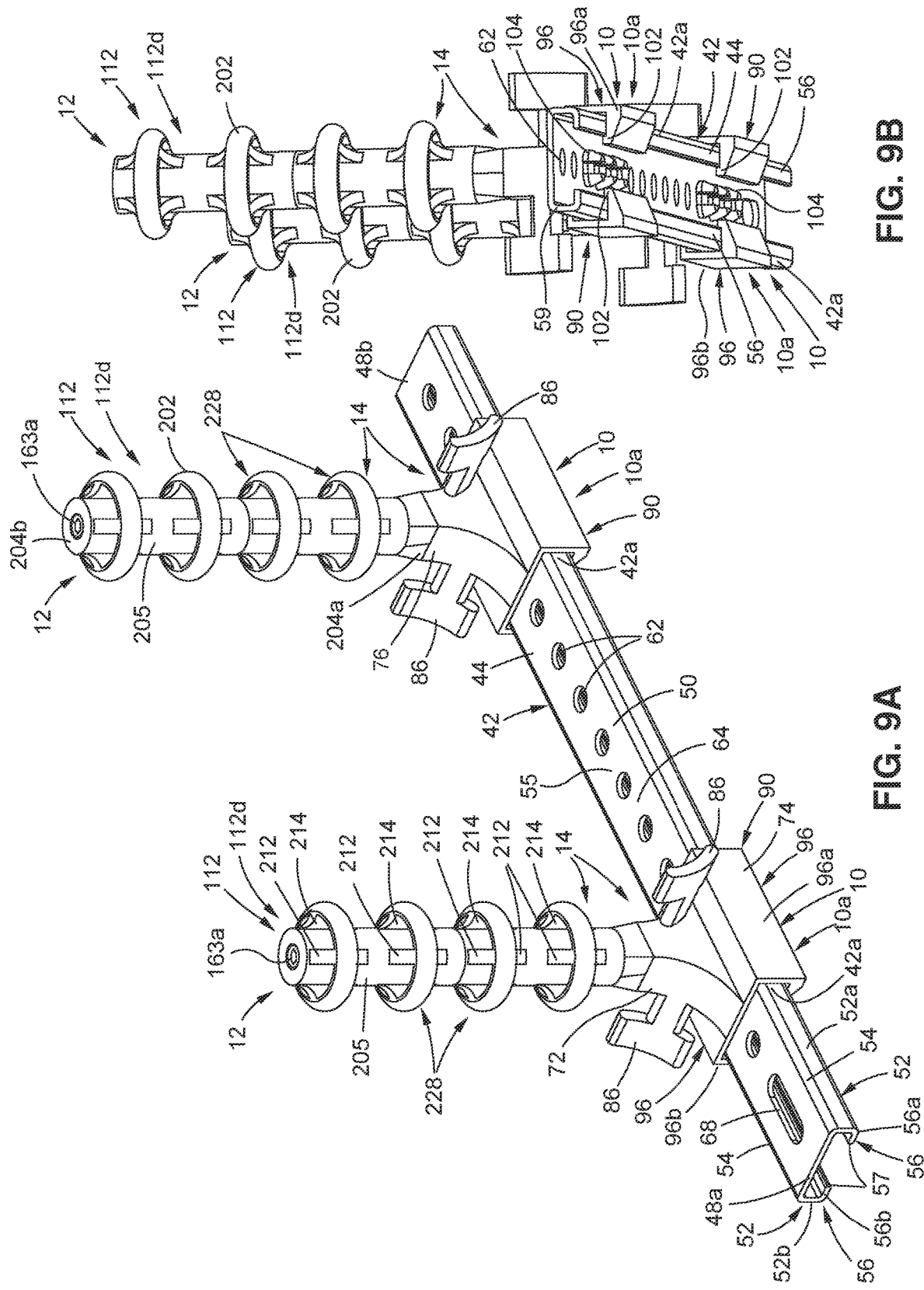

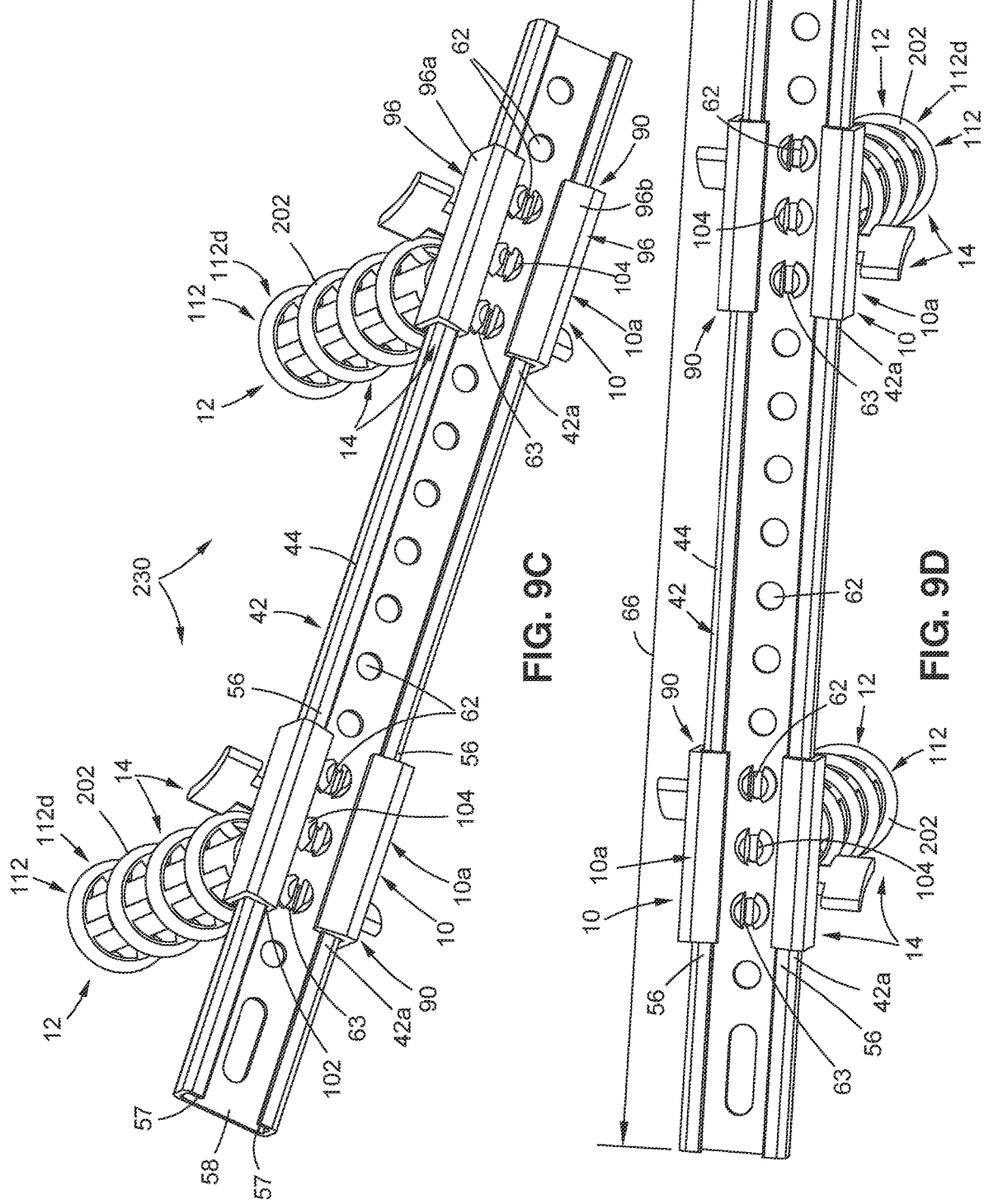

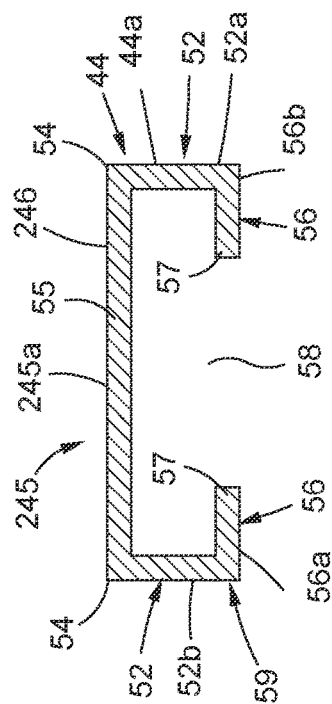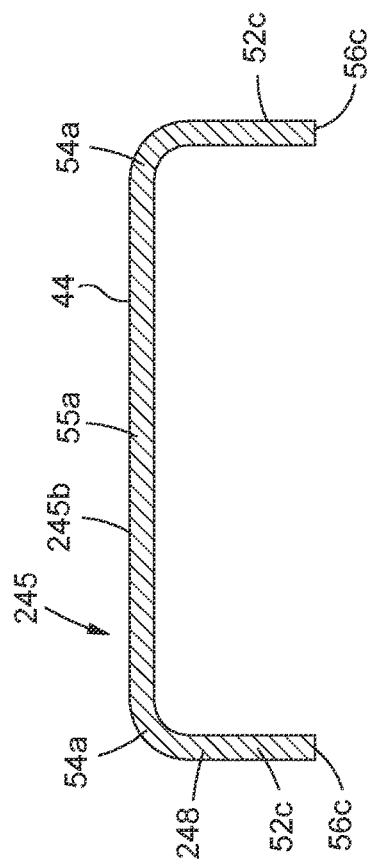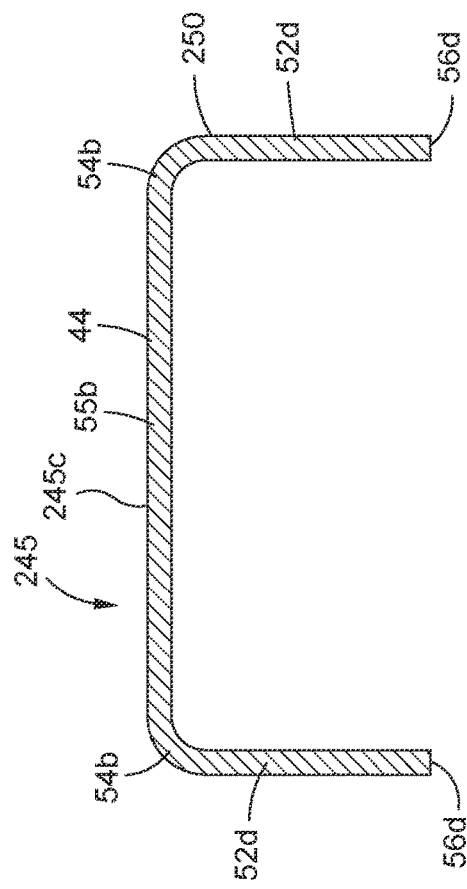

CO-MOLDED SNAP-ON SUPPORT BASE, AND SUPPORT SYSTEM AND METHOD OF USING THE SAME

FIELD

The disclosure relates generally to systems and methods for installing components for supporting elongate elements, and more specifically, to systems and methods for installing components for supporting, routing, and attaching elongate elements, such as wires, and harnesses for elongate elements, in a vehicle, such as an aircraft.

BACKGROUND

In vehicles, such as aircraft, rotorcraft, spacecraft, watercraft, automobiles, and other vehicles, components, such as ring posts and monuments, may be used to support, route, and attach, elongate elements, such as wires, cables, tubes, hoses, and the like, and harnesses bundling the elongate elements, in and to the vehicle. Known ring posts typically consist of one or more rings each having radially extending spokes that define a corresponding number of through openings therebetween. Known monuments typically consist of a tower member with a post and a base extending from the post. Thousands of such ring posts and monuments are typically installed in the manufacture and use of large commercial aircraft, to hold the elongate elements or harnesses out of the way while work is being performed, or to route the elongate elements or harnesses throughout the aircraft.

One known ring post installation system and method includes installing and securing a ring post to an elongate structure, such as a spanner bar, with a fastener assembly. One type of ring post has a short threaded post designed to rotate and thread into another ring post, or through a hole in the spanner bar, and then is secured with a washer and a nut under the spanner bar. Another type of ring post is a hollow ring post that is installed with a screw that is inserted through the hollow ring post and through a hole in the spanner bar, and secured with washers and a nut on a bottom side of the spanner bar. However, manually rotating the ring posts, threadably coupling the ring posts to the spanner bar or to other ring posts, and attaching the ring posts on the bottom side of the spanner bar with fasteners, washers, and/or nuts to secure the ring posts, is very time and labor intensive. Each ring post may take one minute or more to install on the spanner bar or other elongate structure. Such increased time and labor may increase the overall costs of manufacturing. Moreover, the use of added fasteners, washers, nuts, or other fastener assembly components to attach the ring posts to, and under, the spanner bar may add unwanted weight to the aircraft.

Further, numerous tools, such as drills, screwdrivers, wrenches, or other tools, may be needed to build a ring post stack-up on the spanner bar. The use of numerous tools may increase the need for tracking and/or calibration of the tools, and may increase the risk of lost tools in a manufacturing area. In addition, stacking ring posts together may require "clocking" the ring posts, which is a procedure for orienting the ring posts with respect to each other, to align the through openings of the ring posts, and to align the ring posts with respect to the spanner bar. Correctly clocking the ring posts is time and labor intensive.

In addition, one known monument installation system and method includes centering the monument on an elongate structure, such as a spanner bar, with a centering nub located on a bottom of a base of the monument, and installing, but not locking, the base over the spanner bar. A separate installation clip is used to secure the monument to the spanner bar, by inserting legs of the installation clip through installation holes formed in each side of the base of the monument, and attaching the installation clip to the base under the bottom of the spanner bar. However, manually centering the monument on the spanner bar, and manually inserting the installation clip through the base of the monument under the bottom of the spanner bar, to secure the monument to the spanner bar, is time and labor intensive. Each monument may take one minute or more to install on the spanner bar or other elongate structure. Such increased time and labor may increase the overall costs of manufacturing. Moreover, the use of the installation clips to secure the monuments to the spanner bar may add unwanted weight to the aircraft.

Accordingly, there is a need in the art for an improved assembly, system, and method for installing ring posts, monuments, and similar support components or apparatuses for elongate elements, such as wires and the like, in a vehicle, that save installation time and labor, that are fast, easy, and efficient to install with a one-step snap-on attachment, that require no added fastener assemblies for attachment to an elongate structure, thus removing unwanted weight, that require no tools to attach or install to the elongate structure, that improve the ergonomics of installation, and that provide advantages over known assemblies, systems, and methods.

SUMMARY

Example implementations of the present disclosure provide an assembly, system, and method for installing components or apparatuses for routing elongate elements in a vehicle. As discussed in the below detailed description, versions of the assembly, system, and method may provide significant advantages over known assemblies, systems, and methods.

In a version of the disclosure, there is provided a co-molded snap-on support base. The co-molded snap-on support base comprises a top portion and a bottom portion co-molded with the top portion.

The bottom portion comprises an attachment clip designed for a one-step snap-on attachment to an elongate bar structure. The attachment clip comprises a first side attachment arm and a second side attachment arm, to secure the co-molded snap-on support base to a portion of the elongate bar structure. The attachment clip further comprises a lateral retaining strip formed on each of the first side attachment arm and the second side attachment arm, to clamp against bottom ends of the portion of the elongate bar structure.

The bottom portion further comprises at least one secondary retaining clip projecting from an interior surface of the bottom portion of the co-molded snap-on support base into a channel formed between the first side attachment arm and the second side attachment arm. The at least one secondary retaining clip is designed to mate with at least one hole in the elongate bar structure, to align and to further secure the co-molded snap-on support base to the elongate bar structure.

The co-molded snap-on support base is used to reduce a time of installation of apparatuses for routing elongate elements.

In another version of the disclosure, there is provided a support system using a co-molded snap-on support base, to reduce a time of installation of apparatuses for routing elongate elements in a vehicle. The support system comprises an elongate bar structure comprising a spanner bar. The support system further comprises a snap-on assembly comprising the co-molded snap-on support base coupled to one of the apparatuses.

The co-molded snap-on support base comprises a top portion coupled to one of the apparatuses, and comprises a bottom portion co-molded with the top portion. The bottom portion comprises an attachment clip designed for a one-step snap-on attachment to the elongate bar structure.

The attachment clip comprises a first side attachment arm and a second side attachment arm, to secure the co-molded snap-on support base to a portion of the elongate bar structure. The attachment clip further comprises a lateral retaining strip formed on each of the first side attachment arm and the second side attachment arm, to clamp against bottom ends of the portion of the elongate bar structure.

The bottom portion further comprises at least one secondary retaining clip projecting from an interior surface of the bottom portion of the co-molded snap-on support base into a channel formed between the first side attachment arm and the second side attachment arm. The at least one secondary retaining clip is designed to mate with at least one hole in the elongate bar structure, to align and to further secure the co-molded snap-on support base to the elongate bar structure.

The support system further comprises one or more of the elongate elements attached to the snap-on assembly. The co-molded snap-on support base is used to reduce the time of installation of the apparatuses for routing the elongate elements in a vehicle.

In another version of the disclosure, there is provided a method of using a co-molded snap-on support base, to reduce a time of installation of apparatuses for routing elongate elements in a vehicle. The method comprises the step of providing a snap-on assembly comprising a co-molded snap-on support base coupled to one of the apparatuses.

The co-molded support base comprises a top portion coupled to one of the apparatuses, and comprises a bottom portion co-molded with the top portion. The bottom portion comprises an attachment clip with a first side attachment arm, a second side attachment arm, and a lateral retaining strip formed on each of the first side attachment arm and the second side attachment arm. The bottom portion further comprises at least one secondary retaining clip projecting from an interior surface of the bottom portion of the co-molded support base into a channel formed between the first side attachment arm and the second side attachment arm.

The method further comprises the step of installing the snap-on assembly on an elongate bar structure. The step of installing comprises the sub-step of attaching the first side attachment arm and the second side attachment arm of the attachment clip of the co-molded snap-on support base, in a one-step snap-on attachment, to a portion of the elongate bar structure, so that the lateral retaining strips of the first side attachment arm and the second side attachment arm clamp against bottom ends of the portion of the elongate bar structure, to secure the co-molded snap-on support base to the elongate bar structure.

The step of installing further comprises the sub-step of mating the at least one secondary retaining clip of the co-molded snap-on support base, with at least one hole in the elongate bar structure, to align and to further secure the co-molded snap-on support base to the elongate bar structure.

The method further comprises the step of attaching one or more of the elongate elements to the snap-on assembly installed on the elongate bar structure in the vehicle.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 2A is an illustration of a front right side perspective view of an exemplary version of a co-molded snap-on support base of the disclosure;

FIG. 2B is an illustration of a bottom perspective view of the co-molded snap-on support base of FIG. 2A, having three secondary retaining clips;

FIG. 2E is an illustration of a top perspective view of the co-molded snap-on support base of FIG. 2A;

FIG. 2F is an illustration of a front right side perspective view of the co-molded snap-on support base of FIG. 2A, having openings in the side attachment arms;

FIG. 2G is an illustration of a front right side perspective view of a version of a co-molded snap-on support base having no curved support surface elements;

FIG. 2H is an illustration of a top perspective view of the co-molded snap-on support base of FIG. 2G;

FIG. 2I is an illustration of a front right side perspective view of the co-molded snap-on support base of FIG. 2G, having openings in the side attachment arms;

FIG. 2J is an illustration of a top perspective view of a version of a co-molded snap-on support base of the disclosure, having a threaded opening formed in a top portion, having openings in the side attachment arms, and having no curved support surface elements;

FIG. 2K is an illustration of a top perspective view of the co-molded snap-on support base of FIG. 2J, having no openings in the side attachment arms;

FIG. 2L is an illustration of a top perspective view of the co-molded snap-on support base of FIG. 2K, configured for attachment to an apparatus in the form of a threaded end p-clamp assembly;

FIG. 2M is an illustration of a top perspective view of the co-molded snap-on support base of FIG. 2K, configured for attachment to an apparatus in the form of a p-clamp fastener assembly;

FIG. 2N is an illustration of a top perspective view of the co-molded snap-on support base of FIG. 2K, configured for attachment to an apparatus in the form of a threaded end ring post assembly;

FIG. 2O is an illustration of a top perspective view of the co-molded snap-on support base of FIG. 2K, configured for attachment to an apparatus in the form of a ring post fastener assembly;

FIG. 3A is an illustration of a front right side perspective view of an exemplary version of a snap-on assembly of the disclosure, showing a co-molded snap-on support base co-molded with an apparatus in the form of a version of a monument;

FIG. 3B is an illustration of a bottom perspective view of the snap-on assembly of FIG. 3A, having three secondary retaining clips;

FIG. 3C is an illustration of a bottom perspective view of the snap-on assembly of FIG. 3A, having two secondary retaining clips;

FIG. 3D is an illustration of a bottom perspective view of the snap-on assembly of FIG. 3A, having one secondary retaining clip;

FIG. 6A is an illustration of a front perspective view of another exemplary version of a snap-on assembly of the disclosure, in the form of a co-molded snap-on support base with three secondary retaining clips, and co-molded with an apparatus in the form of a ring post with four rings;

FIG. 6B is an illustration of a bottom perspective view of the snap-on assembly of FIG. 6A;

FIG. 6C is an illustration of a front right side perspective view of the snap-on assembly of FIG. 6A;

FIG. 6D is an illustration of a left side view of the snap-on assembly of FIG. 6A;

FIG. 6E is an illustration of a front view of the snap-on assembly of FIG. 6A;

FIG. 6F is an illustration of a rear view of the snap-on assembly of FIG. 6A;

FIG. 6G is an illustration of a bottom view of the snap-on assembly of FIG. 6A;

FIG. 6H is an illustration of a top view of the snap-on assembly of FIG. 6A;

FIG. 6I is an illustration of a bottom perspective view of the snap-on assembly of FIG. 6A, where the co-molded snap-on support base has two secondary retaining clips;

FIG. 6J is an illustration of a bottom perspective view of the snap-on assembly of FIG. 6A, where the co-molded snap-on support base has one secondary retaining clip;

FIG. 6K is an illustration of a front perspective view of the snap-on assembly of FIG. 6I, where the co-molded snap-on support base has openings in the side attachment arms and no curved support surface elements;

FIG. 6L is an illustration of a front right side perspective view of an exemplary version of a snap-on assembly of the disclosure, in the form of a co-molded snap-on support base co-molded with an apparatus in the form of a ring post with one ring;

FIG. 6M is an illustration of a front right side perspective view of an exemplary version of a snap-on assembly of the disclosure, in the form of a co-molded snap-on support base co-molded with an apparatus in the form of a ring post with two rings;

FIG. 6N is an illustration of a front right side perspective view of an exemplary version of a snap-on assembly of the disclosure, in the form of a co-molded snap-on support base co-molded with an apparatus in the form of a ring post with three rings;

FIG. 6O is an illustration of a front right side perspective view of an exemplary version of a snap-on assembly of the disclosure, in the form of a co-molded snap-on support base co-molded with an apparatus in the form of a ring post with five rings;

FIG. 6P is an illustration of a front right side perspective view of an exemplary version of a snap-on assembly of the disclosure, in the form of a co-molded snap-on support base co-molded with an apparatus in the form of a ring post with six rings;

FIG. 7 is an illustration of a front right side perspective view of an exemplary version of a snap-on assembly of the disclosure, in the form of a co-molded snap-on support base co-molded with an apparatus in the form of a ring post with two rings, and having a metal rod insert disposed in an interior of the ring post;

FIG. 8 is an illustration of a left side view of an exemplary version of a snap-on assembly of the disclosure, in the form of a co-molded snap-on support base co-molded with an apparatus in the form of a ring post with two rings, and having a p-clamp attached to a top end of the ring post;

FIG. 9A is an illustration of a right side perspective view of snap-on assemblies of FIG. 6A installed on an elongate bar structure;

FIG. 9B is an illustration of a rear perspective view of the snap-on assemblies installed on the elongate bar structure of FIG. 9A;

FIG. 9C is an illustration of a bottom right side perspective view of the snap-on assemblies installed on the elongate bar structure of FIG. 9A;

FIG. 9D is an illustration of a bottom perspective view of the snap-on assemblies installed on the elongate bar structure of FIG. 9A;

FIG. 13A is an illustration of a cross-sectional front view of a version of a spanner bar used with a version of a support system of the disclosure;

FIG. 13B is an illustration of a cross-sectional front view of another version of a spanner bar that may be used with a version of a support system of the disclosure;

FIG. 13C is an illustration of a cross-sectional front view of yet another version of a spanner bar that may be used with a version of a support system of the disclosure;

Figure 1:
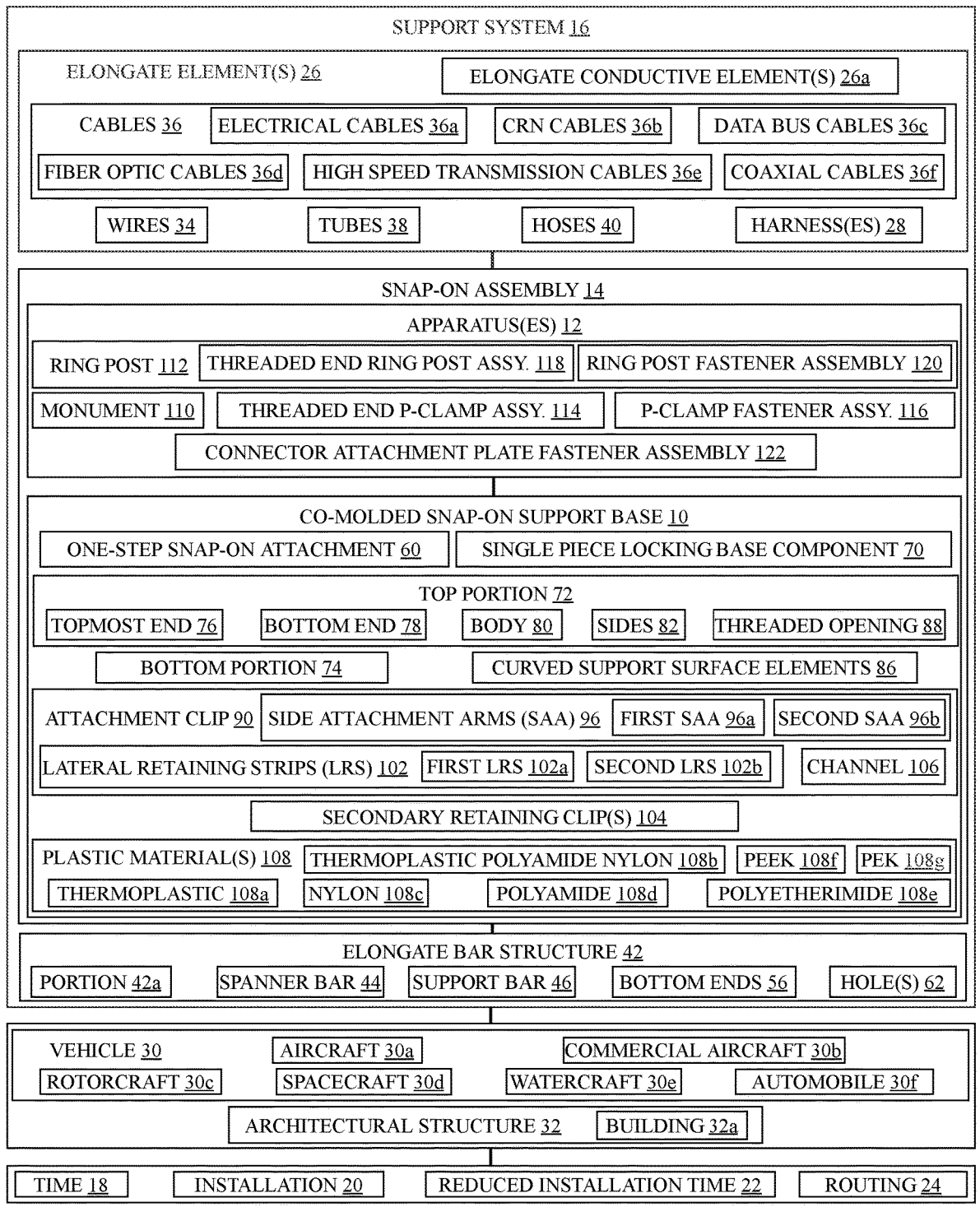
FIG. 1 is an illustration of a block diagram of an exemplary support system having an exemplary co-molded snap-on support base of the disclosure.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

In a version of the disclosure, there is provided a co-molded snap-on support base 10 (see FIGS. 1, 2A-2K) configured for coupling, such as by co-molding or attaching, to an apparatus 12 (see FIGS. 1, 2L-2O, 3A, 6A), to form a snap-on assembly 14 (see FIGS. 1, 2L-2O, 3A, 6A). In other versions of the disclosure, there are provided a support system 16 (see FIGS. 1, 4, 10A) using the co-molded snap-on support base 10, and a method 270 (see FIG. 15) of using the co-molded snap-on support base 10. As used herein, "co-molding" means creating a single piece part from two or more parts, or two or more materials, via a process such as overmolding, injection molding, or insert molding.

Now referring to FIG. 1, FIG. 1 is an illustration of a block diagram of an exemplary support system 16 having an exemplary snap-on assembly 14 comprising an exemplary co-molded snap-on support base 10 of the disclosure and exemplary apparatuses 12. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the support system 16 in FIG. 1 are not meant to imply physical or architectural limitations to the manner in which an illustrative example may be implemented. Other components in addition to, or in place of, the ones illustrated may be used. Some components may be unnecessary.

As shown in FIG. 1, use of the co-molded snap-on support base 10 in the support system 16 reduces a time 18 of installation 20, to obtain a reduced installation time 22, for installing apparatuses 12 used for routing 24 one or more elongate elements 26, and also for routing 24 one or more harnesses 28 bundling, holding, and/or surrounding the elongate elements 26, in a vehicle 30, or an architectural structure 32.

As shown in FIG. 1, the support system 16 comprises one or more elongate elements 26 configured for attachment to, and attached to, the snap-on assembly 14. As shown in FIG. 1, the elongate elements 26 may comprise conductive elongate elements 26a, for example, wires 34 and cables 36. As further shown in FIG. 1, the cables 36 may comprise electrical cables 36a, current return network (CRN) cables 36b, data bus cables 36c, fiber optic cables 36d, high speed transmission cables 36e, coaxial cables 36f, or other types of cables. The elongate elements 26 may also comprise tubes 38 (see FIG. 1), hoses 40 (see FIG. 1), or other suitable elongate elements. The various elongate elements 26 secured by the support system 16 have varying diameters.

The support system 16 with the snap-on assembly 14 is used to route, support, and attach the elongate elements 26, and harnesses 28 bundling, holding, and/or surrounding, the elongate elements 26, during the manufacture of the vehicle 30 and/or when the vehicle 30 is in use. As used herein, a "harness" means an assembly of elongate elements, such as wires or cables, bundled, held, surrounded, or bound by a durable material, or sleeve of durable material, such as rubber, vinyl, electrical tape, conduit, or another suitable durable material. The sleeve may be fire retardant. By bundling or binding multiple elongate elements 26, such as wires 34 and cables 36, into a harness 28, the elongate elements 26 may be secured against the adverse effects of vibrations, abrasions, and moisture, and by constricting the elongate elements 26 into a bundle, usage of space is optimized. Further, if an installer has only one harness to install, instead of multiple elongate elements 26, such as wires 34 and cables 36, installation time may be reduced.

As shown in FIG. 1, the vehicle 30 may comprise an aircraft 30a (see also FIG. 16), such as a commercial aircraft 30b, a rotorcraft 30c, a spacecraft 30d, a watercraft 30e, or an automobile 30f. The vehicle 30 may also comprise another suitable vehicle routing elongate elements 26 and harnesses 28 during manufacture and/or use. The support system 16 with the snap-on assembly 14 is also used to route, support, and attach the elongate elements 26, and the harnesses 28 bundling, holding, and/or surrounding, the elongate elements 26, in non-vehicular settings, such as in architectural structures 32 (see FIG. 1), such as buildings 32a (see FIG. 1), including offices, homes, warehouses, or other suitable architectural structures, and particularly when elongate elements 26 of differing diameters extend along a common path.

As shown in FIG. 1, the support system 16 further comprises an elongate bar structure 42 comprising a spanner bar 44, a support bar 46, or another suitable elongate bar structure, on which the co-molded snap-on support base 10 is installed and attached to. Each co-molded snap-on support base 10 with the coupled apparatus 12 is installed and directly attached to a portion 42a (see FIG. 1) of the elongate bar structure 42, such as the spanner bar 44.

In one version, as shown in FIG. 9A, the elongate bar structure 42, such as in the form of the spanner bar 44, comprises a first end 48a, a second end 48b, an elongate body 50 formed between the first end 48a and the second end 48b, and sides 52 (see also FIG. 13A), such as a first side 52a and a second side 52b, that depend downwardly from top edges 54 (see also FIG. 13A) of the elongate body 50. The elongate bar structure 42, such as in the form of the spanner bar 44, further comprises a top end 55 (see FIGS. 9A, 13A) and comprises bottom ends 56 (see FIGS. 1, 9A, 13A), such as a first bottom end 56a (see FIG. 9A) and a second bottom end 56b (see FIG. 9A), integral with, and perpendicular to, the first side 52a and the second side 52b, respectively. The elongate bar structure 42, such as in the form of the spanner bar 44, further comprises an edge surface 57 (see FIG. 9A) depending upwardly from each bottom end 56 and facing into an interior channel 58 (see FIGS. 9C, 13A) formed between the edge surfaces 57 and formed in the interior space of the elongate bar structure 42, such as the spanner bar 44, surrounded by the top end 55, the sides 52, and the bottom ends 56. The co-molded snap-on support base 10 is attached with a one-step snap-on attachment 60 (see FIG. 1) over the top end 55, the sides 52, the bottom ends 56, and the edge surfaces 57 of the portion 42a of the elongate bar structure 42, such as the spanner bar 44, to which the co-molded snap-on support base 10 is attached.

The top end 55, sides 52, and bottom ends 56 of the elongate bar structure 42, such as the spanner bar 44, form a bracket 59 (see FIGS. 9B, 13A) having a generally C-shaped configuration 246 (see FIG. 13A). However, the elongate bar structure 42, such as the spanner bar 44, can have other suitable shapes and sizes, including polygonal, round, elliptical, and the like. The elongate bar structure 42, such as the spanner bar 44, may also form a hollow elongate structure or may be primarily solid depending on the application.

The elongate bar structure 42, such as the spanner bar 44, has a plurality of holes 62 (see FIGS. 1, 5, 9A, 10A), such as through holes, that define registration points 63 (see FIGS. 5, 9D, 10C) formed through a central portion 64 (see FIG. 9A) of the elongate body 50, along a length 66 (see FIG. 9D) of the elongate bar structure 42, such as the spanner bar 44. Preferably, the holes 62 are spaced an equal distance apart from each other along the length 66. In one version, the elongate bar structure 42, such as the spanner bar 44, is about 18 (eighteen) inches long, although the length 66 of the elongate bar structure 42, such as the spanner bar 44, can vary from a few inches to several feet or more depending upon the application. In addition, the elongate bar structure 42, such as the spanner bar 44, may be linear as shown, but may have other, non-linear configurations if so desired.

Figure 10A:
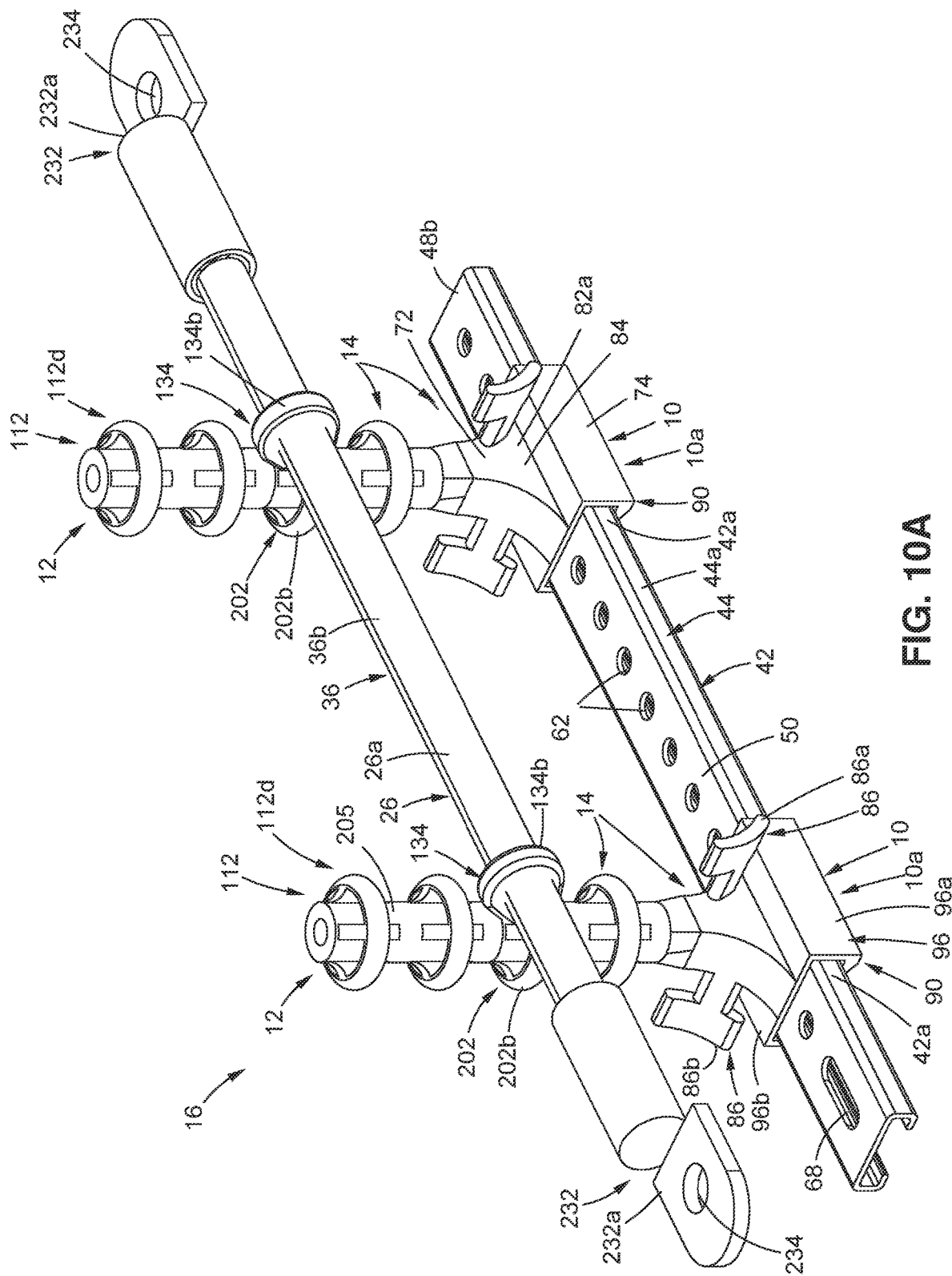
FIG. 10A is an illustration of a right side perspective view of another exemplary version of a support system of the disclosure, showing the snap-on assemblies of FIG. 6A, installed on an elongate bar structure, and showing an elongate element attached to ring posts of the snap-on assemblies.

As shown in FIGS. 9A, 10A, the elongate bar structure 42, such as the spanner bar 44, has a slot opening 68 formed through the central portion 64 of the elongate body 50, at, or near, the first end 48a of the elongate bar structure 42, such as the spanner bar 44. The slot opening 68 is designed to receive a fastener (not shown), such as a screw, bolt, or other suitable fastener, to fasten the elongate bar structure 42, such as the spanner bar 44, to the interior of the vehicle 30, for example, the aircraft 30a, or to another structure in the vehicle 30, or to an architectural structure 32. The slot opening 68 allows for positional tolerances between the elongate bar structure 42, such as the spanner bar 44, and the attachment points in the interior of the vehicle 30, for example, the aircraft 30a, or on another structure in the vehicle 30, or on an architectural structure 32. The co-molded snap-on support base 10 is designed for insertion through one hole 62, two holes 62, or three holes 62 in the portion 42a of the elongate bar structure 42, such as the spanner bar 44, on which the co-molded snap-on support base 10 is attached.

The elongate bar structure 42, such as the spanner bar 44, may be made of a metal material, such as aluminum, steel, stainless steel, plated steel, titanium, or a combination of one or more thereof. However, any material capable of supporting the associated loads of the elongate elements 26 and harnesses 28 for the elongate elements 26, may be used, including but not limited to, metals and alloys thereof, composites, such as plastic, polymer, nylon, ceramic, or another suitable composite material, and combinations of one or more thereof.

As shown in FIG. 1, the snap-on assembly 14 comprises the co-molded snap-on support base 10 configured for coupling to, and coupled to, one of the apparatuses 12. The co-molded snap-on support base 10 comprises a single piece locking base component 70 (see FIGS. 1, 2A, 2G, 2K) that is co-molded and configured for attachment to, and is attached to, the portion 42a of the elongate bar structure 42, such as the spanner bar 44, without the use of tools, installation clips, or fasteners to facilitate attachment.

As shown in FIG. 1, the co-molded snap-on support base 10 comprises a top portion 72 (see also FIG. 2A) and a bottom portion 74 (see also FIG. 2A) co-molded with the top portion 72. The top portion 72 comprises a topmost end 76 (see FIGS. 1, 2A, 2E, 2J), a bottom end 78 (see FIGS. 1, 2A, 2E, 2J), and a body 80 (see FIGS. 1, 2A). The body 80 has sides 82 (see FIGS. 1, 2A), including first opposite sides 82*a* (see FIG. 2A) comprising straight sides 84 (see FIG. 2A) and second opposite sides 82*b* (see FIG. 2A) comprising curved sides 85 (see FIG. 2A). In one version, the top portion 72 comprises curved support surface elements 86 (see FIGS. 1, 2A) integrally formed with exterior portions 87*a* (see FIG. 2A) of the top portion 72, and extending away from, or outwardly from, the first opposite sides 82*a* comprising the straight sides 84. The curved support surface elements 86 are designed to support the elongate elements 26, and/or to support the harnesses 28 bundling, holding, and/or surrounding, the elongate elements 26. The curved support surface elements 86 are discussed in further detail below with respect to FIG. 2A. The top portion 72, in one version, comprises a threaded opening 88 (see FIGS. 1, 2J) formed in the topmost end 76 and through an interior portion 87*b* of the top portion 72.

Figure 2C:
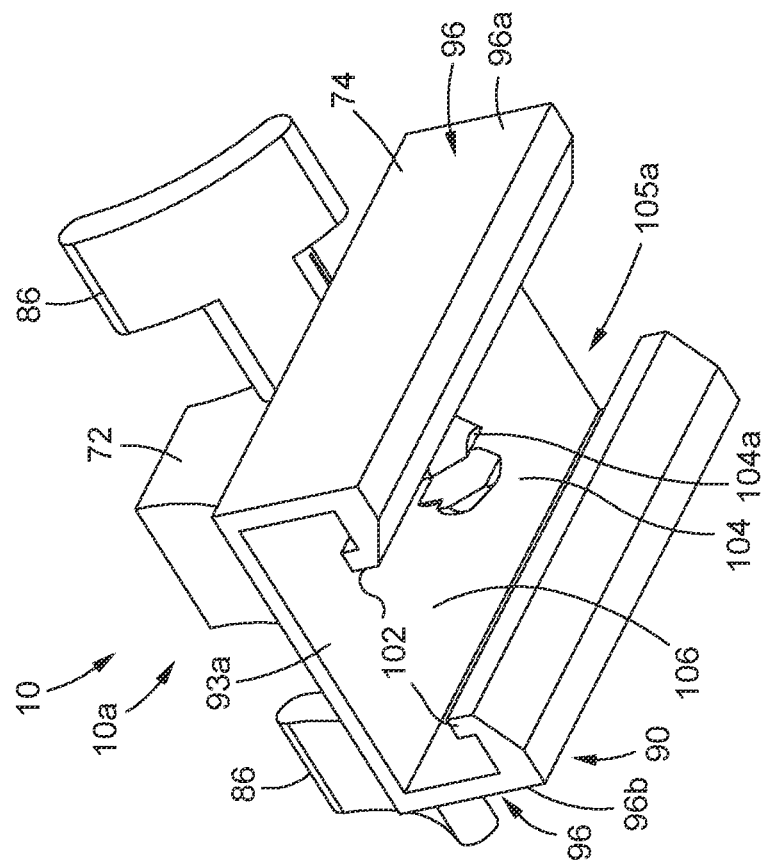
FIG. 2C is an illustration of a bottom perspective view of the co-molded snap-on support base of FIG. 2A, having two secondary retaining clips.

The bottom portion 74 comprises an attachment clip 90 (see FIGS. 1, 2A). The bottom portion 74 has a top end 92 (see FIGS. 2A, 2E), such as in the form of a top platform end 92*a* (see FIGS. 2A, 2E), having an interior surface 93*a* (see FIGS. 2A-2D) and an exterior surface 93*b* (see FIGS. 2A, 2E). The attachment clip 90 of the bottom portion 74 further comprises a bottommost end 94 (see FIGS. 2A-2B), and side attachment arms (SAA) 96 (see FIGS. 1, 2A), including a first side attachment arm (SAA) 96*a* (see FIGS. 1, 2A), and a second side attachment arm (SAA) 96*b* (see FIGS. 2A) opposite the first side attachment arm 96*a*. The first side attachment arm 96*a* and the second side attachment arm 96*b* extend downwardly from edges 98 (see FIG. 2A, 2E) of the top end 92, such as the top platform end 92*a*, to form a right angle 100 (see FIGS. 2A, 2E), or a 90 degree angle, with respect to the top end 92, such as the top platform end 92*a*. The attachment clip is designed for the one-step snap-on attachment 60 (see FIG. 1) to the elongate bar structure 42, such as the spanner bar 44. The first side attachment arm 96*a* and the second side attachment arm 96*b* secure the co-molded snap-on support base 10 to the portion 42*a* of the elongate bar structure 42, such as the spanner bar 44, between the first side attachment arm 96*a* and the second side attachment arm 96*b*.

The attachment clip 90 of the bottom portion 74 further comprises lateral retaining strips 102 (LRSs) (see FIGS. 1, 2A, 2E), such as a first lateral retaining strip (LRS) 102*a* (see FIGS. 1, 2A, 2E) and a second lateral retaining strip (LRS) 102*b* (see FIGS. 1, 2A, 2E), formed on the side attachment arms 96, such as each of the first side attachment arm 96*a* and the second side attachment arm 96*b*, to clamp against the bottom ends 56 of the portion 42*a* of the elongate bar structure 42, such as the spanner bar 44. The lateral retaining strips 102 are discussed in further detail below with respect to FIG. 2A.

The bottom portion 74 further comprises at least one secondary retaining clip 104 (see FIGS. 1, 2A-2D) projecting downwardly from the interior surface 93*a* (see FIGS. 2A-2D) of the top end 92, such as the top platform end 92*a*, of the bottom portion 74 of the co-molded snap-on support base 10, into a channel 106 (see FIGS. 1, 2A-2B) formed between the first side attachment arm 96*a* and the second side attachment arm 96*b*. The at least one secondary retaining clip 104 (see FIG. 5) is designed to mate with at least one hole 62 (see FIG. 5) in the elongate bar structure 42, such as the spanner bar 44, to align, and to further secure, the co-molded snap-on support base to the elongate bar structure 42, such as the spanner bar 44. The co-molded snap-on support base 10 may comprise one of, one secondary retaining clip 104 (see FIG. 2D), two secondary retaining clips 104 (see FIG. 2C), or three secondary retaining clips 104 (see FIG. 2B).

The co-molded snap-on support base 10 comprises the single piece locking base component 70 made of one or more plastic materials 108 (see FIG. 1), comprising thermoplastic 108*a* (see FIG. 1), thermoplastic polyamide nylon 108*b* (see FIG. 1), nylon 108*c* (see FIG. 1), polyamide 108*d* (see FIG. 1), polyetherimide 108*e* (see FIG. 1), polyetheretherketone (PEEK) 108*f* (see FIG. 1), polyetherketone (PEK) 108*g* (see FIG. 1), or another suitable plastic material. The co-molded snap-on support base 10 may be made of one or more of these plastic materials 108 and used in vehicles 30, such as aircraft 30*a*, or used in other vehicles 30 and architectural structures 32.

As shown in FIG. 1, the snap-on assembly 14 of the support system 16 comprises the apparatus 12 coupled to the co-molded snap-on support base 10. In one version, the topmost end 76 of the top portion 72 of the co-molded snap-on support base 10 is co-molded with one of the apparatuses 12 comprising, a monument 110 (see FIGS. 1, 3A), or a ring post 112 (see FIGS. 1, 6A). The monument 110 comprises a first monument 110*a* (see FIGS. 3A-3G), a second monument 110*b* (see FIG. 3H), or another suitable type of monument. The monument 110 is discussed in further detail below with respect to FIGS. 3A-3H. The ring post 112 comprises a 1-ring ring post 112*a* (see FIG. 6L), a 2-ring ring post 112*b* (see FIG. 6M), a 3-ring ring post 112*c* (see FIG. 6N), a 4-ring ring post 112*d* (see FIGS. 6A-6F, 6I-6K), a 5-ring ring post 112*e* (see FIG. 6O), or a 6-ring ring post 112*f* (see FIG. 6P). The ring post 112 is discussed in further detail below with respect to FIGS. 6A-6P. The monument 110 and ring post 112 may be made of one or more plastic materials 108, comprising thermoplastic 108*a*, thermoplastic polyamide nylon 108*b*, nylon 108*c*, polyamide 108*d*, polyetherimide 108*e*, polyetheretherketone (PEEK) 108*f*, polyetherketone (PEK) 108*g*, or another suitable plastic material. The monument 110 and ring post 112 may be made of one or more of these plastic materials 108 and used in vehicles 30, such as aircraft 30*a*, or used in other vehicles 30 and architectural structures 32. Metal materials, as discussed below, may be used to make inserts inserted in the ring posts 112, to provide added reinforcement.

In another version, the top portion 72 has the threaded opening 88 (see FIGS. 1, 22J, 2K) formed in the topmost end 76 of the top portion 72, and the threaded opening 88 is configured for attachment to one of the apparatuses 12 comprising, a threaded end p-clamp assembly (ASSY.) 114 (see FIGS. 1, 2L), a p-clamp fastener assembly 116 (see FIGS. 1, 2M), a threaded end ring post assembly (ASSY.) 118 (see FIGS. 1, 2N), a ring post fastener assembly (ASSY.) 120 (see FIGS. 1, 2O), a connector attachment plate fastener assembly 122 (see FIG. 1), or another suitable apparatus.

Now referring to FIGS. 2A-2J, FIGS. 2A-2J show versions of the co-molded snap-on support base 10 of the disclosure. FIGS. 2A-2F show a version of the co-molded snap-on support base 10, such as in the form of co-molded snap-on support base 10*a*, having curved support surface elements 86. FIGS. 2G-2I show another version of the co-molded snap-on support base 10, such as in the form of co-molded snap-on support base 10*b*, with no curved support surface elements 86. FIGS. 2J-2K show another version of the co-molded snap-on support base 10, such as in the form of co-molded snap-on support base 10*c*, with no curved support surface elements 86 and with the threaded opening 88 in the topmost end 76 of the top portion 72.

Figure 2D:
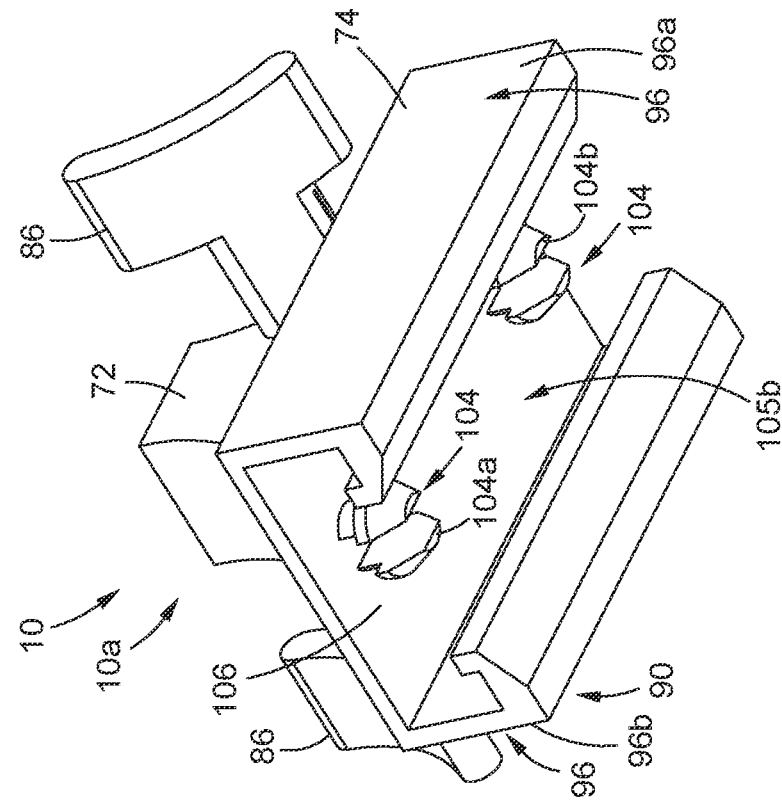
FIG. 2D is an illustration of a bottom perspective view of the co-molded snap-on support base of FIG. 2A, having one secondary retaining clip.

FIG. 2A is an illustration of a front right side perspective view of an exemplary version of the co-molded snap-on support base 10, such as in the form of co-molded snap-on support base of the disclosure. FIG. 2B is an illustration of a bottom perspective view of the co-molded snap-on support base 10, such as in the form of co-molded snap-on support base 10*a*, of FIG. 2A, having three secondary retaining clips 104. FIG. 2C is an illustration of a bottom perspective view of the co-molded snap-on support base 10, such as in the form of co-molded snap-on support base of FIG. 2A, having two secondary retaining clips 104. FIG. 2D is an illustration of a bottom perspective view of the co-molded snap-on support base 10, such as in the form of co-molded snap-on support base 10*a*, of FIG. 2A, having one secondary retaining clip 104. FIG. 2E is an illustration of a top perspective view of the co-molded snap-on support base 10, such as in the form of co-molded snap-on support base 10*a*, of FIG. 2A. FIG. 2F is an illustration of a front right side perspective view of the co-molded snap-on support base 10, such as in the form of co-molded snap-on support base 10*a*, of FIG. 2A, having openings 124 in the side attachment arms 96.

FIGS. 2A-2F show the co-molded snap-on support base 10, such as in the form of co-molded snap-on support base 10*a*, comprising the top portion 72 and the bottom portion 74 co-molded with the top portion 72. FIGS. 2A, 2E show the top portion 72 comprising the topmost end 76 and the bottom end 78. As shown in FIG. 2A, the top portion 72 further comprises the body 80 having sides 82, including first opposite sides 82*a* comprising the two straight sides 84 (see also FIG. 2E) and second opposite sides 82*b* comprising the two curved sides 85 (see also FIG. 2E).

In this version, as shown in FIGS. 2A-2F, the co-molded snap-on support base 10, such as in the form of co-molded snap-on support base 10*a*, comprises the curved support surface elements 86 integrally formed with the top portion 72, and extending away from, or outwardly from, the first opposite sides 82*a* (see FIG. 2A) comprising the straight sides 84 (see FIG. 2A) of the top portion 72. The curved support surface elements 86 are designed to support the elongate elements 26 (see FIGS. 1, 4, 10A), and/or to support the harnesses 28 (see FIGS. 1, 12) bundling, holding, and/or surrounding, the elongate elements 26. As shown in FIG. 2A, the curved support surface elements 86 comprise a first curved support surface element 86*a* and a second curved support surface element 86*b*. Each of the curved support surface elements 86, such as the first curved support surface element 86*a* and the second curved support surface element 86*b*, comprises a curved support 126 (see FIGS. 2A, 2B, 2E, 6H) having a curved support surface side 128*a* (see FIGS. 2B, 6H), or contact side, and a back side 128*b* (see FIG. 2B), or non-contact side. The curved support surface side 128*a* of the curved support 126 has a curved shape similar to the curved side 85 (see FIG. 2A) of the top portion 72, so that an elongate element 26 (see FIG. 4), such as a wire 34 (see FIG. 4) or cable 36, is supported on the curved support surface side 128*a* of the curved support 126 and the curved side 85 of the top portion 72, when coupled to the co-molded snap-on support base 10.

Each of the curved support surface elements 86, such as the first curved support surface element 86*a* and the second curved support surface element 86*b*, further comprises an extender arm 130 (see FIGS. 2A, 2E, 6H), each having a first end 132*a* (see FIG. 2E) integral with the top portion 72, and extending outwardly from, the straight side 84 of the top portion 72, and each having a second end 132*b* (see FIG. 2E) integral with the curved support 126. Each extender arm 130 defines recess portions 133 (see FIGS. 2A, 6A) formed above and below the extender arm 130, and formed between the curved support 126 and the straight side 84 of the top portion 72.

Figure 4:
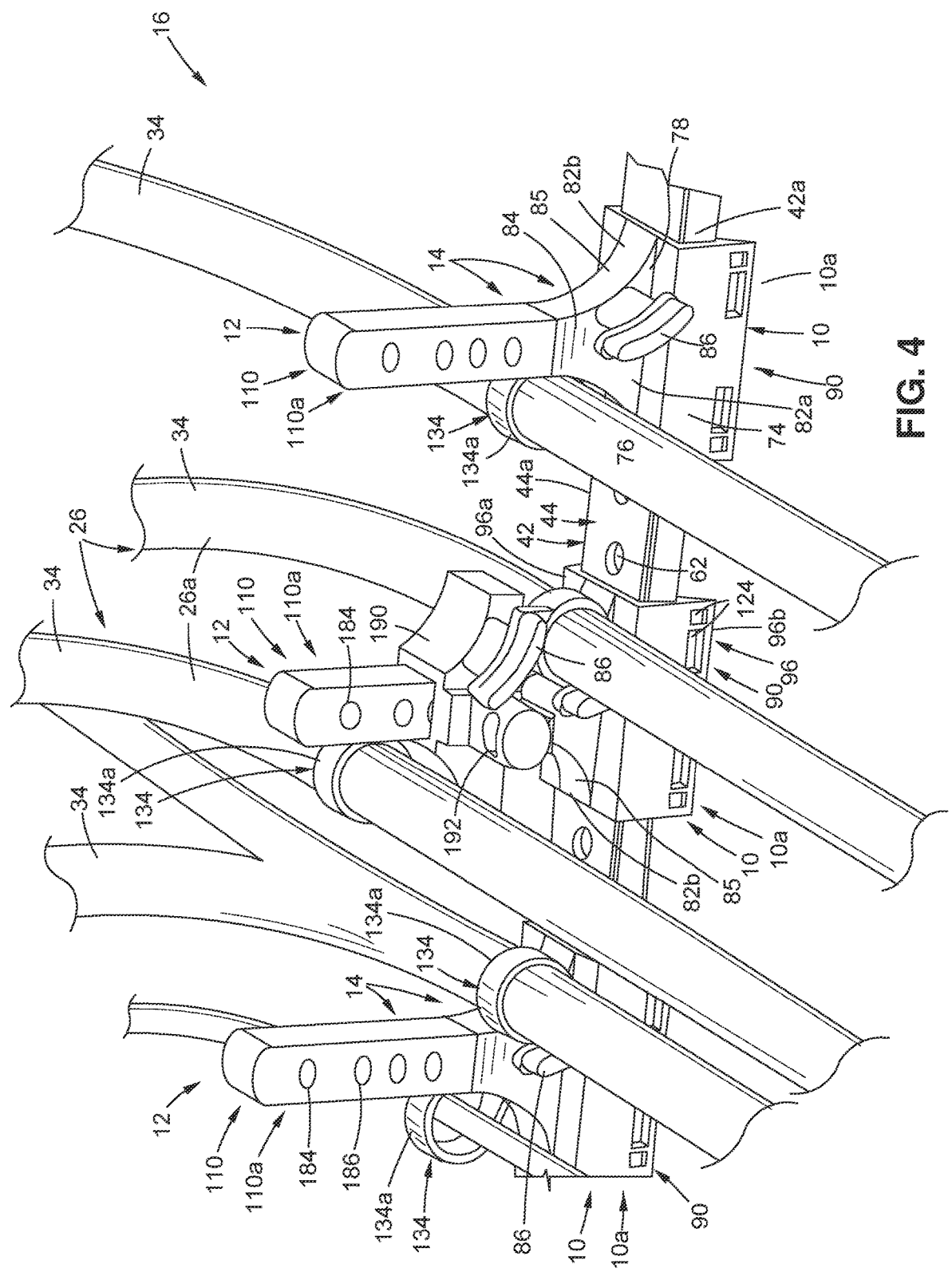
FIG. 4 is an illustration of a right side perspective view of an exemplary version of a support system of the disclosure, showing snap-on assemblies of FIG. 3A, installed on an elongate bar structure, and showing elongate elements attached to the snap-on assemblies.

The recess portions 133 are of a sufficient size to receive a fastener device 134 (FIG. 4). The fastener device 134 comprises a zip tie 134*a* (see FIG. 4), a cable tie 134*b* (see FIG. 10A), or another suitable fastener or attachment device. The fastener device 134, such as the zip tie 134*a* or cable tie 134*b*, typically comprises a thin, flexible polymer, such as nylon, strip for encircling or surrounding the elongate elements 26, for example, wires 34 or cables 36, and/or the harness 28, where the strip has a locking head end and a serrated end, where the serrated end is threaded through the locking head end, to fasten and lock the fastener device 134, such as the zip tie 134*a*, or cable tie 134*b*, around the multiple elongate elements 26, and/or harness 28.

The bottom portion 74 of the co-molded snap-on support base 10 comprises the attachment clip 90 (see FIGS. 2A-2F). The bottom portion has the top end 92 (see FIGS. 2A, 2B, 2E), such as in the form of the top platform end 92*a* (see FIGS. 2A, 2E), having the interior surface 93*a* (see FIGS. 2A-2D) and the exterior surface 93*b* (see FIGS. 2A, 2E). The attachment clip 90 of the bottom portion 74 further comprises the bottommost end 94 (see FIGS. 2A-2B), and further comprises the side attachment arms 96 (see FIGS. 2A-2F), including the first side attachment arm 96*a* (see FIGS. 2A-2F), and the second side attachment arm 96*b* (see FIGS. 2A-2F) opposite the first side attachment arm 96*a*. The bottom portion 74 preferably has a length 75*a* (see FIG. 3E) in a range of 1.0 inch to 5.0 inches, and more preferably has a length 75*a* of 1.5 inches+/−0.03 inch. The bottom portion 74 preferably has a width 75*b* (see FIG. 3E) in a range of 0.5 inch to 3.0 inches, and more preferably has a width 75*b* of 1.0 inch+/−0.03 inch.

As shown in FIGS. 2A-2F, the attachment clip 90 of the bottom portion 74 further comprises the lateral retaining strips 102, such as the first lateral retaining strip 102*a* (see FIGS. 1, 2A, 2E) and the second lateral retaining strip 102*b*, formed on the side attachment arms 96, such as each of the first side attachment arm 96*a* and the second side attachment arm 96*b*, to clamp against the bottom ends 56 (see FIGS. 5, 9D) and/or the edge surfaces 57, of the portion 42*a* of the elongate bar structure 42, such as the spanner bar 44. As shown in FIG. 2B, each lateral retaining strip 102 has a first end 135*a*, or lower end, a second end 135*b*, or upper end, a first side surface 136*a*, a second side surface 136*b*, and a top surface 138. Each lateral retaining strip 102 has a generally square or rectangular shaped profile. As further shown in FIG. 2B, each of the first side attachment arm 96*a* and the second side attachment arm 96*b* has an arm exterior side surface 140*a*, an arm interior side surface 140*b*, and an arm interior surface 142. As shown in FIG. 2B, in this version of the co-molded snap-on support base 10, the second side surface 136*b* of each lateral retaining strip 102 forms a 90 degree angle with the arm interior surface 142, and the arm interior surface 142 forms a 90 degree angle with the arm interior side surface 140*b*. Further, as shown in FIG. 2B, the arm exterior side surface 140*a* forms a 90 degree angle with the bottommost end 94. As shown in FIG. 2A, the channel 106 is formed between the arm interior side surfaces 140*b* of the first side attachment arm 96*a* and the second side attachment arm 96*b*, and between the first side surfaces 136*a* of the lateral retaining strips 102, which face each other and face into an interior 144 (see FIG. 2B) of the bottom portion 74 of the co-molded snap-on support base 10.

As shown in FIGS. 2A, 2E, the first side attachment arm 96a and the second side attachment arm 96b each have a sloped surface portion 145 having a first end 147a adjacent the bottommost end 94 and having a second end 147b adjacent the first side surface 136a of each lateral retaining strip 102. The sloped surface portion 145 slopes upwardly from the bottommost end 94 to the first side surface 136a of the lateral retaining strip 102. The angle formed between the bottommost end 94 (see FIG. 2A) and the sloped surface portion 145 (see FIG. 2A) at the first end 147a (see FIG. 2A) may be an angle in a range of 25 (twenty-five) degrees to 35 (thirty-five) degrees with respect to the bottommost end 94 at 0 (zero) degrees, and preferably, the sloped surface portion 145 is at an angle of 29 (twenty-nine) degrees with respect to the bottommost end 94 at 0 (zero) degrees. For lighter loads, less material may be used for the co-molded snap-on support base 10, such as for the first side attachment arm 96a and the second side attachment arm 96b, and a smaller angle may be used. For larger loads, more material may be used for the co-molded snap-on support base 10, such as for the first side attachment arm 96a and the second side attachment arm 96b, and a larger angle may be used.

As shown in FIGS. 2A-2F, the bottom portion 74 further comprises at least one secondary retaining clip 104 projecting downwardly from the interior surface 93a (see FIGS. 2A-2D) of the top end 92 (see FIG. 2A), such as the top platform end 92a (see FIG. 2A), of the bottom portion 74 of the co-molded snap-on support base 10 into the channel 106 (see FIGS. 2A-2B) formed between the first side attachment arm 96a and the second side attachment arm 96b. The at least one secondary retaining clip 104 (see FIG. 5) is designed to mate with at least one hole 62 (see FIG. 5) in the elongate bar structure 42, such as the spanner bar 44, to align, and to further secure, the co-molded snap-on support base 10 to the elongate bar structure 42, such as the spanner bar 44. The co-molded snap-on support base 10 may comprise one of, one secondary retaining clip 104 (see FIG. 2D), two secondary retaining clips 104 (see FIG. 2C), or three secondary retaining clips 104 (see FIG. 2B). FIG. 2D shows a 1-secondary retaining clip attachment 105a with the secondary retaining clip 104 in the form of a first secondary retaining clip 104a. FIG. 2E shows a 2-secondary retaining clip attachment 105b with the secondary retaining clips 104 in the form of a first secondary retaining clip 104a and a second secondary retaining clip 104b. FIG. 2B shows a 3-secondary retaining clip attachment 105c with the secondary retaining clips 104 in the form of a first secondary retaining clip 104a, a second secondary retaining clip 104b, and a third secondary retaining clip 104c.

In one version, each secondary retaining clip 104 comprises two clip portions 146 (see FIGS. 2F, 6E), such as a first clip portion 146a and a second clip portion 146b. Each clip portion 146 has a first end 148a (see FIGS. 2F, 6E) integral with, and projecting downwardly from, the interior surface 93a (see FIGS. 2F, 6E) of the top end 92 of the bottom portion 74. Each clip portion 146 further has a second end 148b (see FIGS. 2F, 6E) extending into the channel 106 (see FIGS. 2F, 6E). As shown in FIGS. 2F, 6E, each clip portion 146 further has a stem portion 150 extending downwardly from the first end 148a, and the stem portion 150 is integral with a head portion 152 extending downwardly from the stem portion 150. The head portion 152 generally has a greater width than the stem portion 150.

As further shown in FIGS. 2F, 6E, each clip portion 146 has a flat side 154, where the flat side 154 of the first clip portion 146a faces, and is the mirror image of, the flat side 154 of the second clip portion 146b. Each head portion 152 has a one-half truncated cone shape profile 155 (see FIG. 6E), that is, if the flat sides 154 of the head portions 152 are joined together, the head portions 152 of each clip portion 146 together have a truncated cone shape profile. As further shown in FIGS. 2F, 6E, there is a gap 156 between the flat sides 154 of the clip portions 146. The clip portions 146 are sufficiently flexible, such that when the secondary retaining clip 104 is inserted into a hole 62 (see FIG. 5) on the elongate bar structure 42, such as the spanner bar 44, the clip portions 146 are pinched together to narrow, or close, the gap 156 between the clip portions 146 to allow the head portions 152 to be inserted through the hole 62. Once the head portions 152 are inserted through the hole 62, the clip portions 146 move back to their original position to further lock or retain the co-molded snap-on support base 10 to the elongate bar structure 42. The one or more secondary retaining clips 104 are made of the one or more plastic materials 108 (see FIG. 1), comprising thermoplastic 108a (see FIG. 1), thermoplastic polyamide nylon 108b (see FIG. 1), nylon 108c (see FIG. 1), polyamide 108d (see FIG. 1), polyetherimide 108e (see FIG. 1), polyetheretherketone (PEEK) 108f (see FIG. 1), polyetherketone (PEK) 108g (see FIG. 1), or another suitable plastic material. The one or more secondary retaining clips 104 may be made of one or more of these plastic materials 108 and, as part of the co-molded snap-on support base 10, used in vehicles 30, such as aircraft 30a, or used in other vehicles 30 and architectural structures 32.

As further shown in FIG. 2F, in one version, the first side attachment arm 96a and the second side attachment arm 96b of the bottom portion 74 each have one or more openings 124, such as first openings 124a, or large openings, and second openings 124b, or small openings, formed in the arm exterior side surface 140a of each of the side attachment arms 96 of the bottom portion 74. As shown in FIG. 2F, the openings 124 are rectangular shaped. However, the openings 124 may be of another suitable shape. The openings 124 in the co-molded snap-on support base 10 provide a weight reduction feature for vehicles 30, such as aircraft 30a, for example, commercial aircraft 30b, or other vehicles. In addition, the openings 124 are designed to optionally receive an installation clip 158 (see FIG. 5), or another suitable fastener or attachment device, for further securing the co-molded snap-on support base 10 to the elongate bar structure 42, such as the spanner bar 44. The use of an installation clip 158 is optional, and although the co-molded snap-on support base 10 with the attachment clip 90 having the lateral retaining strips 102 and the secondary retaining clips 104 provide sufficient securement to the elongate bar structure 42, it may be desirable in certain cases to have additional securement with the installation clip 158. For example, the installation clip 158 may be used for additional securement if several heavy harnesses, such as power feeders, are attached to the monument 110 or ring post 112, may be used in high vibration areas in the vehicle 30 or architectural structure 32, may be used in an exposed area where equipment, cargo, or components may accidentally knock the co-molded snap-on support base 10 from its position on the elongate bar structure 42, such as the spanner bar 44, or may be used in other situations for additional securement. The installation clip 158 may be made of a flexible plastic material or metal material.

FIGS. 2G-2I show the co-molded snap-on support base 10, such as in the form of co-molded snap-on support base 10b, comprising a single piece locking base component 70 (see FIG. 2G), with no curved support surface elements 86. FIG. 2G is an illustration of a front right side perspective view of the co-molded snap-on support base 10, such as in the form of co-molded snap-on support base 10b, having no curved support surface elements 86. FIG. 2H is an illustration of a top perspective view of the co-molded snap-on support base 10b of FIG. 2G. The co-molded snap-on support base 10, such as in the form of co-molded snap-on support base 10b, is identical to the co-molded snap-on support base 10, such as in the form of co-molded snap-on support base except for the absence of the curved support surface elements 86 (see FIG. 2A). In this version, an apparatus 12, such as a p-clamp 160 (see FIG. 2M), a bracket (not shown), or another suitable apparatus may be attached to the co-molded snap-on support base 10 with a fastener or fastener assembly, and the elongate elements 26 may be attached to the p-clamp 160, bracket, or other suitable apparatus. FIG. 2I is an illustration of a front right side perspective view of the co-molded snap-on support base 10, such as in the form of co-molded snap-on support base 10b of FIG. 2G, having openings 124, such as first openings 124a and second openings 124b, in the side attachment arms 96 of the bottom portion 74.

FIGS. 2G-2I show the top portion 72 co-molded, or integral with, the bottom portion 74. FIG. 2G shows the body 80 with sides 82, such as the first opposite sides 82a comprising the straight sides 84, and the second opposite sides 82b comprising the curved sides 85, of the top portion 72. FIGS. 2G-2I show the bottom portion 74 comprising the attachment clip 90 and the top end 92 and the bottommost end 94 of the bottom portion 74. FIGS. 2G-2I further show the side attachment arms 96, such as the first side attachment arm 96a and the second side attachment arm 96b, show the lateral retaining strips 102, and show the secondary retaining clip 104.

FIGS. 2J-2K show the co-molded snap-on support base 10, such as in the form of co-molded snap-on support base 10c, comprising a single piece locking base component 70 (see FIG. 2K), with no curved support surface elements 86 (see FIG. 2A) and with the threaded opening 88 in the topmost end 76 of the top portion 72. FIG. 2J is an illustration of a top perspective view of the co-molded snap-on support base 10, such as in the form of co-molded snap-on support base having the threaded opening 88 formed in a top portion 72, having openings 124, such as first openings 124a and second openings 124b, in the side attachment arms 96 of the bottom portion 74, and having no curved support surface elements 86. The co-molded snap-on support base 10, such as in the form of co-molded snap-on support base 10c, of FIG. 2J, is identical to the co-molded snap-on support base 10, such as in the form of co-molded snap-on support base 10a (see FIG. 2A), except for the absence of the curved support surface elements 86 (see FIG. 2A), the addition of the threaded opening 88, and the addition of the openings 124.

FIG. 2K is an illustration of a top perspective view of the co-molded snap-on support base 10 of FIG. 2J, but having no openings 124 in the side attachment arms 96. The co-molded snap-on support base 10, such as in the form of co-molded snap-on support base 10c, of FIG. 2K, is identical to the co-molded snap-on support base 10, such as in the form of co-molded snap-on support base 10a (see FIG. 2A), except for the absence of the curved support surface elements 86 (see FIG. 2A), and the addition of the threaded opening 88.

FIGS. 2J-2K show the top portion 72 co-molded, or integral with, the bottom portion 74. FIG. 2J shows the topmost end 76, the bottom end 78, and the body 80 of the top portion 72. FIGS. 2J-2K show the bottom portion 74 comprising the attachment clip 90 and the top end 92 (see FIG. 2K), such as the top platform end 92a (see FIG. 2K), and the bottommost end 94 (see FIG. 2K) of the bottom portion 74. FIGS. 2J-2K further show the side attachment arms 96, such as the first side attachment arm 96a and the second side attachment arm 96b, show the lateral retaining strips 102, and show the secondary retaining clip 104.

Now referring to FIG. 2L, FIG. 2L is an illustration of a top perspective view of the co-molded snap-on support base 10, such as in the form of co-molded snap-on support base 10c, of FIG. 2K, configured for attachment, and in use, is attached, to an apparatus 12 in the form of a threaded end p-clamp assembly 114. FIG. 2L shows the snap-on assembly 14 comprising the apparatus 12, such as the threaded end p-clamp assembly 114, configured for attachment to the threaded opening 88 of the co-molded snap-on support base 10. FIG. 2L shows the top portion 72 with the threaded opening 88 and the top portion 72 co-molded to the bottom portion 74. FIG. 2L further shows the bottom portion 74 comprising the attachment clip 90, the side attachment arms 96, the lateral retaining strips 102, and the secondary retaining clip 104. As shown in FIG. 2L, the threaded end p-clamp assembly 114 comprises a p-clamp 160, such as a latch p-clamp 160a, attached, or coupled, to a threaded end 162, such as a threaded end post 162a. The threaded end 162, such as the threaded end post 162a, is configured to be inserted and threadably rotated and secured in and to the threaded opening 88. The p-clamp 160, such as the latch p-clamp 160a, comprises a body 164, such as a hinged circular latch body 164a, with a latch closure 165. As shown in FIG. 2L, the p-clamp 160, such as the latch p-clamp 160a, is in a closed position 166, and an opening 168 formed by the hinged circular latch body 164a, such as made of a metal material, is designed to receive, surround, and hold, one or more elongate elements 26, such as wires 34 or cables 36, or is designed to receive, surround, and hold, a harness 28 of elongate elements 26.

Now referring to FIG. 2M, FIG. 2M is an illustration of a top perspective view of the co-molded snap-on support base 10, such as in the form of co-molded snap-on support base 10c, of FIG. 2K, configured for attachment, and in use, is attached, to an apparatus 12 in the form of a p-clamp fastener assembly 116. FIG. 2M shows the snap-on assembly 14 comprising the apparatus 12, such as the p-clamp fastener assembly 116, configured for attachment to the threaded opening 88 of the co-molded snap-on support base 10. FIG. 2M shows the top portion 72 with the threaded opening 88 and the top portion 72 co-molded to the bottom portion 74. FIG. 2M further shows the bottom portion 74 comprising the attachment clip 90, the side attachment arms 96, the lateral retaining strips 102, and the secondary retaining clip 104. As shown in FIG. 2M, the p-clamp fastener assembly 116 comprises a p-clamp 160 comprising a body 164, such as a hinged circular body 164b, with each end terminating in a flat mounting portion 170 with a mounting hole 172. The p-clamp 160 is configured to be mounted, and is mounted, to the threaded opening 88 of the co-molded snap-on support base 10 with an attachment element 174, such as a threaded screw 174a, and a washer 175. The attachment element 174, such as the threaded screw 174a, is configured to be inserted and threadably rotated and secured in and to the threaded opening 88. As shown in FIG. 2M, the p-clamp 160 is in a closed position 166a, and an opening 168a formed by the hinged circular body 164b, such as made of a metal material, is designed to receive, surround, and hold, one or more elongate elements 26, such as wires 34 or cables 36, or is designed to receive, surround, and hold, a harness 28 of elongate elements 26.

Now referring to FIG. 2N, FIG. 2N is an illustration of a top perspective view of the co-molded snap-on support base 10, such as in the form of co-molded snap-on support base 10c, of FIG. 2K, configured for attachment, and in use, is attached, to an apparatus 12 in the form of a threaded end ring post assembly 118. FIG. 2N shows the snap-on assembly 14 comprising the apparatus 12, such as the threaded end ring post assembly 118, configured for attachment to the threaded opening 88 of the co-molded snap-on support base 10. FIG. 2N shows the top portion 72 with the threaded opening 88 and the top portion 72 co-molded to the bottom portion 74. FIG. 2N further shows the bottom portion 74 comprising the attachment clip 90, the side attachment arms 96, the lateral retaining strips 102, and the secondary retaining clip 104. As shown in FIG. 2N, the threaded end ring post assembly 118 comprises a ring post 112, such as a 1-ring ring post 112a, attached, or coupled, to a threaded end 162, such as a threaded end post 162b. The threaded end 162, such as the threaded end post 162a, is configured to be inserted and threadably rotated and secured in and to the threaded opening 88. As shown in FIG. 2N, the ring post 112 has a top threaded opening 163 formed in the top of the ring post 112 configured to receive another ring post 112, or another suitable attachment structure.

Now referring to FIG. 2O, FIG. 2O is an illustration of a top perspective view of the co-molded snap-on support base 10, such as in the form of co-molded snap-on support base 10c, of FIG. 2K, configured for attachment, and in use, is attached to, an apparatus 12 in the form of a ring post fastener assembly 120. FIG. 2O shows the snap-on assembly 14 comprising the apparatus 12, such as the ring post fastener assembly 120, configured for attachment to the threaded opening 88 of the co-molded snap-on support base 10. FIG. 2O shows the top portion 72 with the threaded opening 88 and the top portion 72 co-molded to the bottom portion 74. FIG. 2O further shows the bottom portion 74 comprising the attachment clip 90, the side attachment arms 96, the lateral retaining strips 102, and the secondary retaining clip 104. As shown in FIG. 2O, threaded end ring post assembly 118 comprises a ring post 112, such as a 1-ring ring post 112a, having a threaded through opening 176 configured for alignment with the threaded opening 88. The ring post 112 is configured to be mounted, and is mounted, to the threaded opening 88 of the co-molded snap-on support base 10 with an attachment element 174, such as a threaded screw 174b, and a washer 175a. The attachment element 174, such as the threaded screw 174b, is configured to be inserted and threadably rotated and secured in and to the threaded opening 88.

Now referring to FIGS. 3A-3H, FIGS. 3A-3H show a version of a snap-on assembly 14 of the disclosure, where the snap-on assembly 14 comprises a co-molded snap-on support base such as in the form of co-molded snap-on support base 10a (see FIGS. 3A-3F, 3H), or in the form of co-molded snap-on support base 10b (see FIG. 3G), co-molded with an apparatus 12 in the form of a monument 110.

Figure 3F:
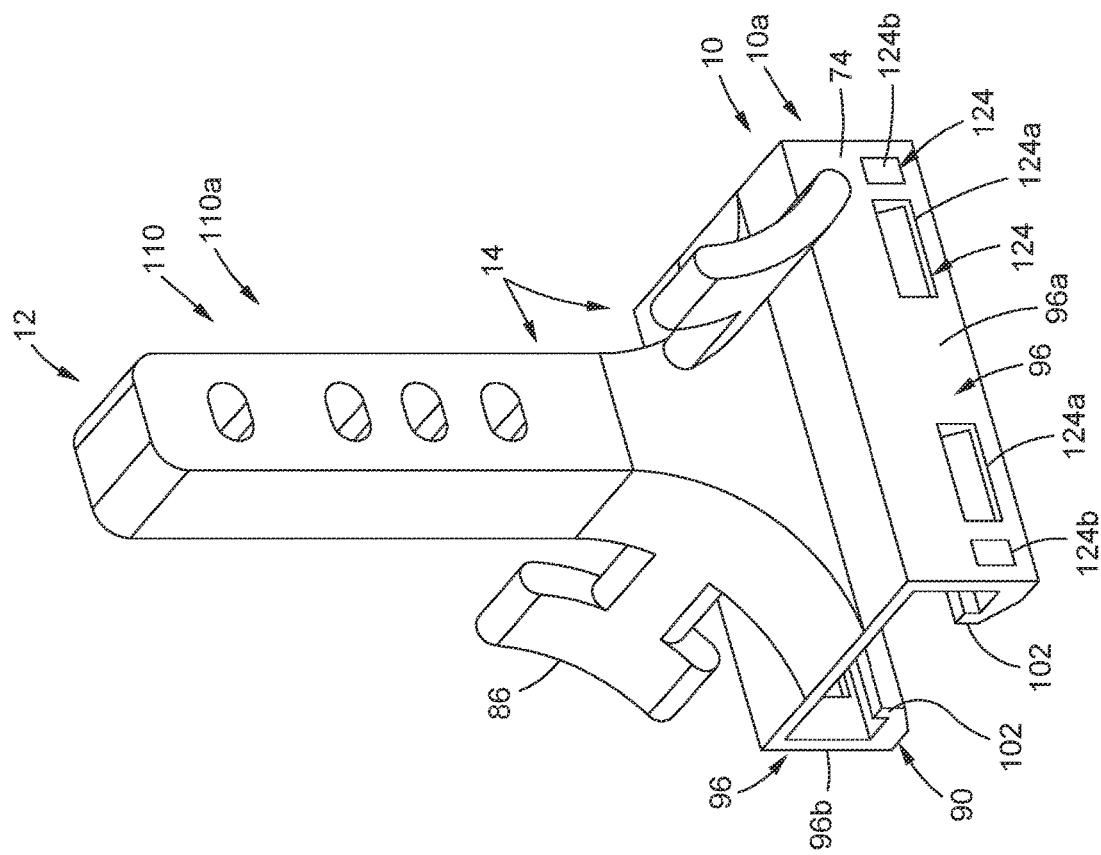
FIG. 3F is an illustration of a right side perspective view of the snap-on assembly of FIG. 3A, having openings in the side attachment arms.
Figure 3E:
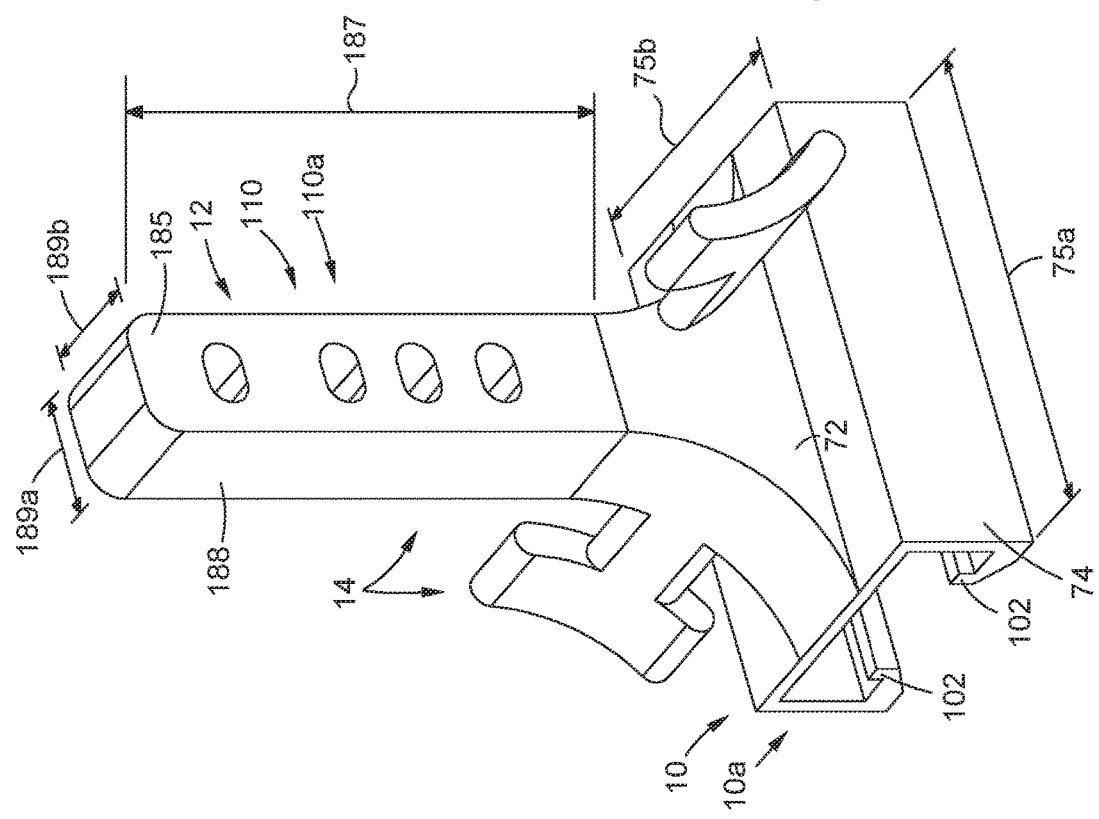
FIG. 3E is an illustration of a right side perspective view of the snap-on assembly of FIG. 3A.
Figure 3H:
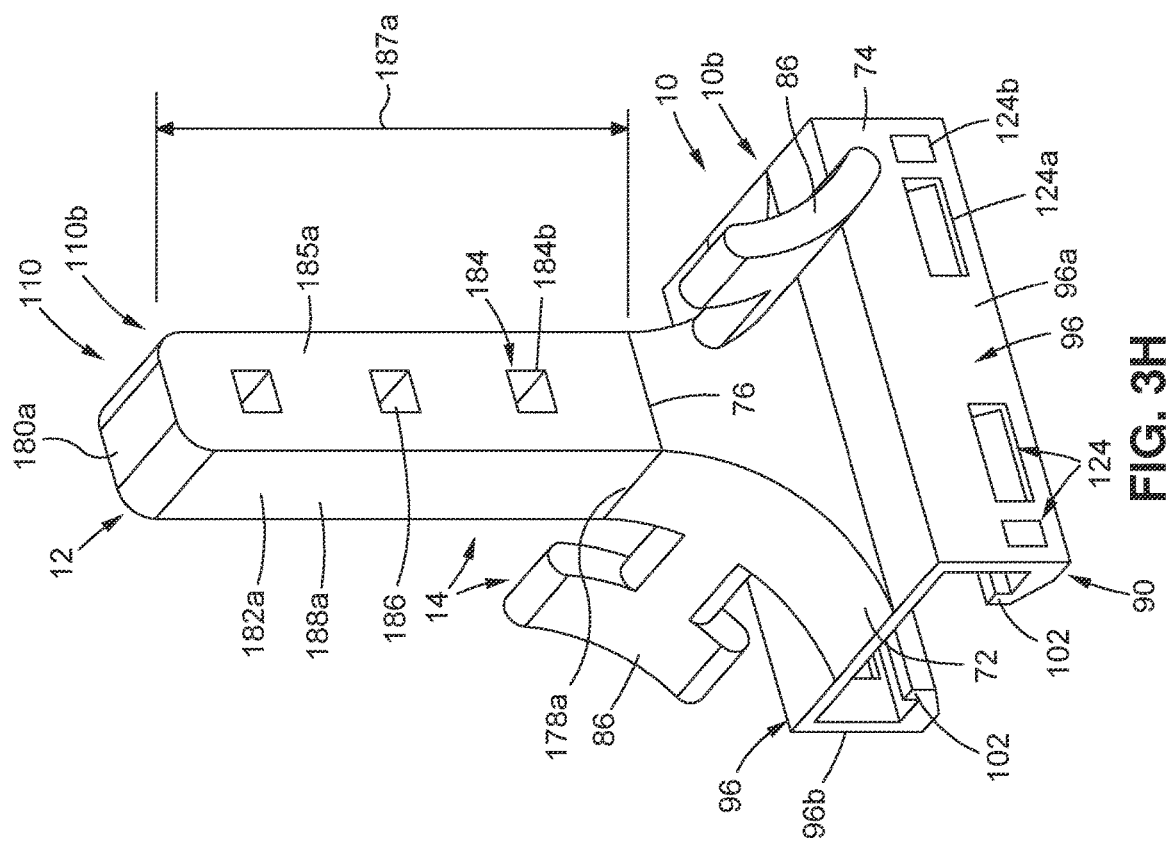
FIG. 3H is an illustration of a right side perspective view of another exemplary version of a snap-on assembly of the disclosure, showing the co-molded snap-on support base of FIG. 3A, co-molded with an apparatus in the form of another version of a monument.
Figure 3G:
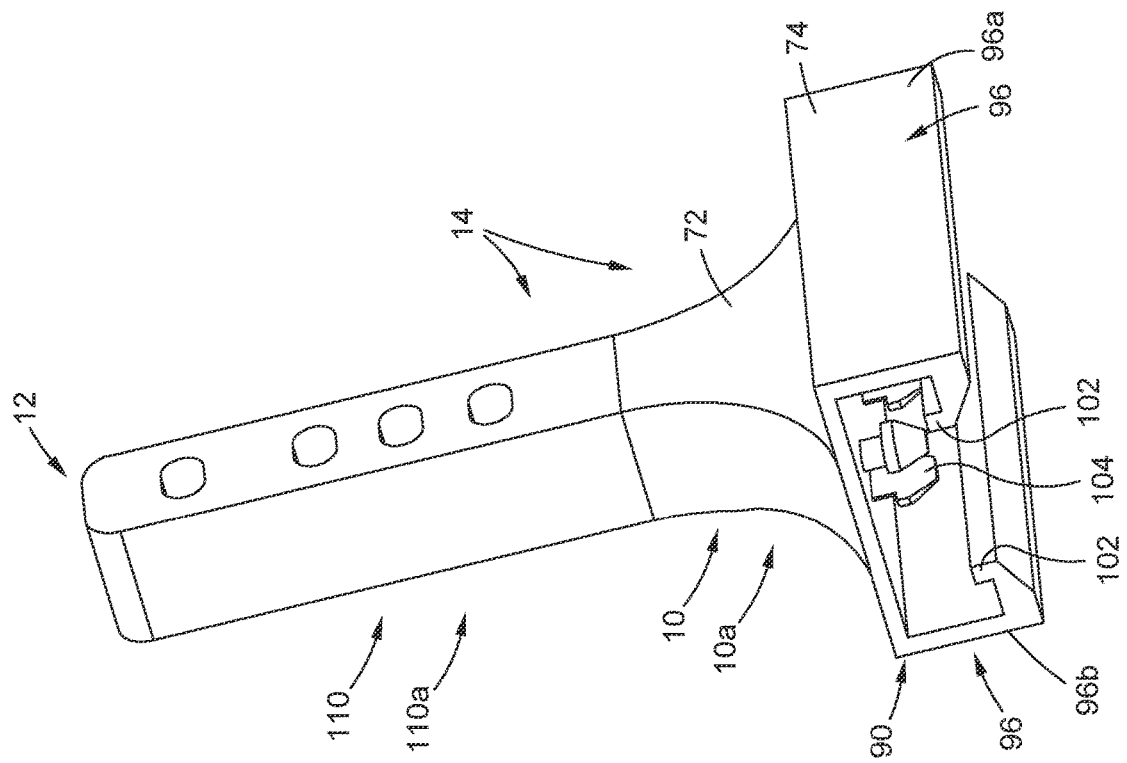
FIG. 3G is an illustration of a front right side perspective view of the snap-on assembly of FIG. 3A, having no curved support surface elements.

FIGS. 3A-3G show the apparatus 12 comprising the monument 110, such as the first monument 110a. FIG. 3A is an illustration of a front right side perspective view of an exemplary version of the snap-on assembly 14 of the disclosure, showing the co-molded snap-on support base co-molded with the apparatus 12 in the form of a version of a monument 110, such as the first monument 110a. FIG. 3B is an illustration of a bottom perspective view of the snap-on assembly 14 of FIG. 3A, having three secondary retaining clips 104. FIG. 3C is an illustration of a bottom perspective view of the snap-on assembly 14 of FIG. 3A, having two secondary retaining clips 104. FIG. 3D is an illustration of a bottom perspective view of the snap-on assembly 14 of FIG. 3A, having one secondary retaining clip 104. FIG. 3E is an illustration of a right side perspective view of the snap-on assembly 14 of FIG. 3A. FIG. 3F is an illustration of a right side perspective view of the snap-on assembly 14 of FIG. 3A, having openings 124 in the side attachment arms 96, such as the first side attachment arm 96a and the second side attachment arm 96b, of the bottom portion 74. FIG. 3G is an illustration of a front right side perspective view of the snap-on assembly 14 of FIG. 3A, having no curved support surface elements 86 (see FIG. 3A).

FIG. 3H shows the apparatus 12 comprising the monument 110, such as the second monument 110b. FIG. 3H is an illustration of a right side perspective view of another exemplary version of the snap-on assembly 14 of the disclosure, showing the co-molded snap-on support base of FIG. 3A, co-molded with the apparatus 12 in the form of another version of the monument 110, such as the second monument 110b.

FIGS. 3A-3F, 3H show the co-molded snap-on support base 10, such as in the form of co-molded snap-on support base 10a, with the curved support surface elements 86. FIG. 3G shows the co-molded snap-on support base 10, such as in the form of co-molded snap-on support base without the curved support surface elements 86. As discussed above, the co-molded snap-on support base 10 comprises the top portion 72 (see FIGS. 3A, 3E, 3G, 3H) co-molded with the bottom portion 74 (see FIGS. 3A, 3E, 3G, 3H). The bottom portion 74 comprises the attachment clip 90 (see FIGS. 3A, 3G, 3H) having the side attachment arms 96 (see FIGS. 3A, 3E, 3F, 3H), such as the first side attachment arm 96a (see FIGS. 3A, 3E, 3G, 3H) and the second side attachment arm 96b (see FIGS. 3A, 3E, 3G, 3H), and having the lateral retaining strips 102 (see FIGS. 3A, 3G, 3H), and having one or more secondary retaining clips 104 (see FIGS. 3A-3D, 3G). Further, FIGS. 3F, 3H show the bottom portion 74 having openings 124, such as first openings 124a and second openings 124b, in the side attachment arms 96 of the bottom portion 74. FIG. 3E further shows the length 75a and the width 75b of the bottom portion 74.

As shown in FIGS. 3A-3E, the monument 110, such as the first monument 110a, is co-molded to the top portion 72 of the co-molded snap-on support base 10. As shown in FIG. 3A, the monument 110, such as the first monument 110a, has a first end 178, such as a bottom end, co-molded to the topmost end 76 of the top portion 72 of the co-molded snap-on support base 10. As further shown in FIG. 3A, the monument 110, such as the first monument 110a, has a second end 180, such as a top end, and a body 182, such as a tower or post body, having 4 (four) openings 184, such as round openings 184a, formed through sides 185, such as open sides 185a, of the body 182 of the monument 110. The openings 184, such as the round openings 184a, define registration positions 186 along a length 187 (see FIG. 3E) of the monument 110. As shown in FIG. 3A, the monument 110, such as the first monument 110a, further has closed sides 188. The open side 185 preferably has a width 189a (see FIG. 3E) in a range of 0.2 inch to 0.8 inch, and more preferably has a width 189a of 0.4 inch+/−(plus or minus) 0.03 inch. The closed side 188 preferably has a width 189b (see FIG. 3E) in a range of 0.2 inch to 0.8 inch, and more preferably has a width 189b of 0.4 inch+/−0.03 inch. In one version, the monument 110 preferably has a length 187, or height, in a range of 0.75 inch to 3.0 inches, and more preferably has a length 187 of 1.04 inches+/−0.02 inch. In one version, the top portion 72 (see FIG. 3E) of the co-molded snap-on support base 10 preferably has a length, or height, in a range of 0.5 inch to 1.25 inches, and more preferably has a length, or height, of 0.75 inch+/−0.02 inch.

As shown in FIG. 3H, the monument 110, such as the second monument 110b, is co-molded to the top portion 72 of the co-molded snap-on support base 10. As shown in FIG. 3H, the monument 110, such as the first monument 110a, has a first end 178a, such as a bottom end, co-molded to the topmost end 76 of the top portion 72 of the co-molded snap-on support base 10. As further shown in FIG. 3H, the monument 110, such as the first monument 110a, has a second end 180a, such as a top end, and a body 182a, such as a tower or post body, having 3 (three) openings 184, such as square openings 184b, formed through open sides 185a, of the body 182a of the monument 110. The openings 184, such as the square openings 184b, define registration positions 186 along a length 187a (see FIG. 3E) of the monument 110. As shown in FIG. 3H, the monument 110, such as the second monument 110b, further has closed sides 188a.

Now referring to FIG. 4, FIG. 4 is an illustration of a right side perspective view of an exemplary version of a support system 16 of the disclosure, showing snap-on assemblies 14 of FIG. 3A, installed on an elongate bar structure 42, such as the spanner bar 44, and showing elongate elements 26, such as elongate conductive elements 26a, for example, wires 34, attached to the snap-on assemblies 14. The support system 16 includes the elongate bar structure 42, such as the spanner bar 44, that extends across a passageway or space and is secured to a more permanent object, such as an interior portion of a fuselage 282 (see FIG. 16) of an aircraft 30a, or another support surface, capable of withstanding the load of the support system 16 and the elongate elements 26 being held thereby.

FIG. 4 shows 3 (three) snap-on assemblies 14 attached to 3 (three) portions 42a of the elongate bar structure 42, such as the spanner bar 44. The snap-on assemblies 14 each comprise the co-molded snap-on support base 10, such as the co-molded snap-on support base 10a, co-molded to the apparatus 12 comprising the monument 110, such as the first monument 110a, having 4 (four) openings 184 that define the registration positions 186. As shown in FIG. 4, the co-molded snap-on support base 10, such as the co-molded snap-on support base 10a, comprises the top portion 72 having the topmost end 76 co-molded to the monument 110, such as the first monument 110a, and having the bottom end 78 co-molded to the bottom portion 74. As shown in FIG. 4, the top portion 72 has the first opposite sides 82a comprising the straight sides 84, and the second opposite sides 82b comprising the curved sides 85. As shown in FIG. 4, the bottom portion 74 comprises the attachment clip 90 having the side attachment arms 96, such as the first side attachment arm 96a and the second side attachment arm 96b.

As shown in FIG. 4, the co-molded snap-on support base 10, such as the co-molded snap-on support base 10a, comprises the curved support surface elements 86 that support the elongate elements 26, such as wires 34. The elongate elements 26, such as the wires 34, are attached to the curved support surface elements 86, with fastener devices 134, such as zip ties 134a.

As further shown in FIG. 4, a stackable riser 190, or cap, may be slidably inserted over the monument 110 and secured at one of the registration positions 186 defined by the openings 184 along the length 187 (see FIG. 3E) of the monument 110. The stackable riser 190, or cap, can be added to the monument 110 to provide one or more layers of attach points for two or more elongate elements 26, or harnesses 28, if needed. When the stackable riser 190 is sufficiently secured to the monument 110, such as by engaging a registration member 192 through an opening (not shown) of the stackable riser 190 and the openings 184 of the monument 110, one or more elongate elements 26, such as wires 34, can be secured to the stackable riser 190 by way of the fastener devices 134, such as the zip ties 134a, or the like. As such, stacks or layers of elongate elements 26, or harnesses 28 of elongate elements 26, can be spaced along the length 187 (see FIG. 3E) of the monument 110 by stacking or layering multiple stackable risers 190 along the monument 110. For monuments 110, such as the first monument 110a, having 4 (four) openings 184, the first monument 110a may accept two or three stackable risers 190 depending on the length 187 of the monument 110, such as the first monument 110a. However, the length 187 of the monument 110 and number of openings 184 can vary according to the needs of the support system 16.

Figure 5:
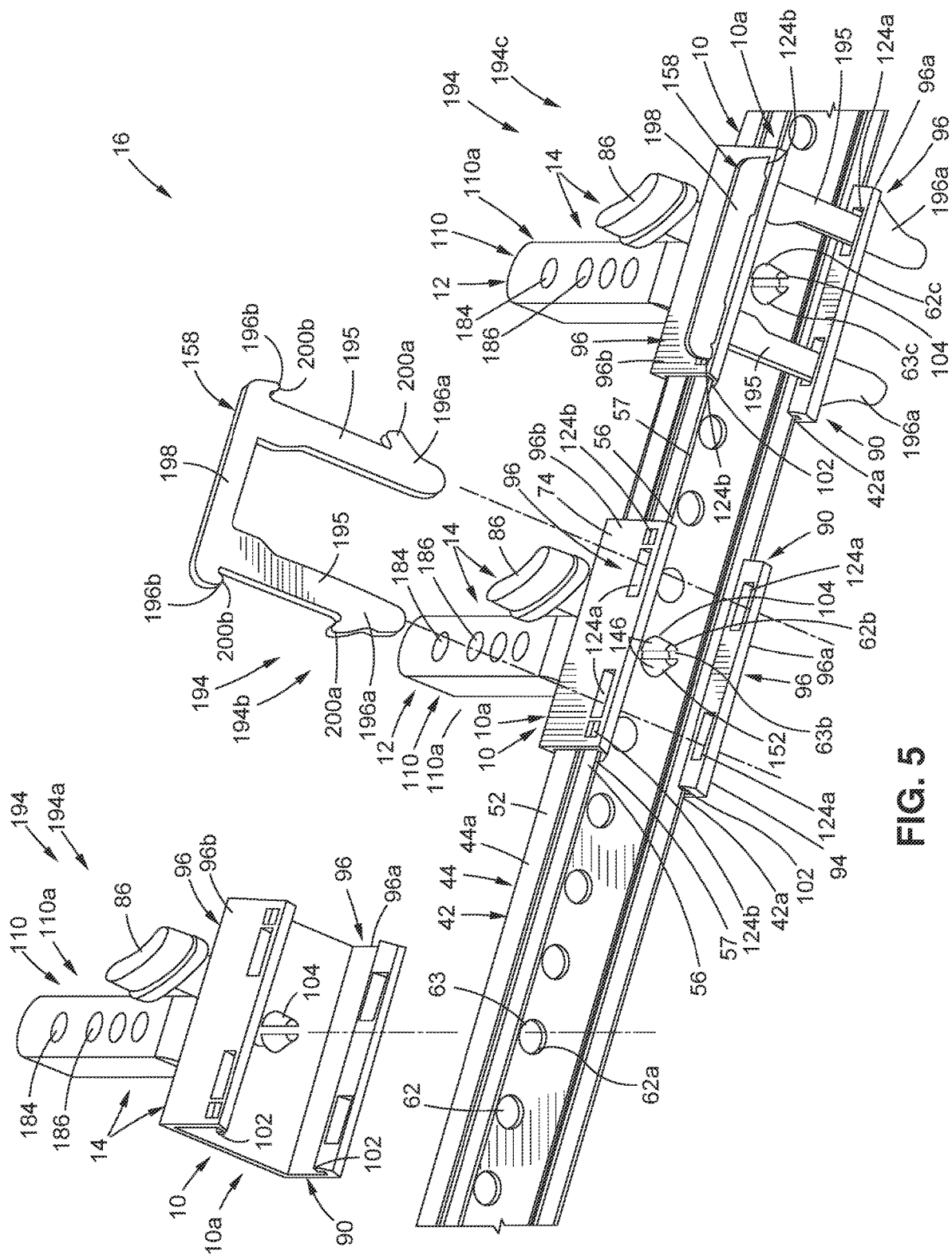
FIG. 5 is an illustration of a bottom perspective view of an exemplary version of a support system of the disclosure, showing multiple snap-on assemblies of FIG. 3A, in different installation positions with respect to the elongate bar structure.

Now referring to FIG. 5, FIG. 5 is an illustration of a bottom perspective view of an exemplary version of a support system 16 of the disclosure, showing multiple snap-on assemblies 14 of FIG. 3A, in different installation positions 194, or different stages of assembly, with respect to the elongate bar structure 42, such as the spanner bar 44. As shown in FIG. 5, the elongate bar structure 42, such as the spanner bar 44, has holes 62 that define registration points 63.

FIG. 5 shows the snap-on assemblies 14 comprising the co-molded snap-on support base 10, such as the co-molded snap-on support base 10a, co-molded to the apparatus 12 comprising the monument 110, such as the first monument 110a, having 4 (four) openings 184 that define the registration positions 186. As shown in FIG. 5, each co-molded snap-on support base 10, such as the co-molded snap-on support base 10a, comprises the attachment clip 90 having the side attachment arms 96, such as the first side attachment arm 96a and the second side attachment arm 96b, comprises the lateral retaining strips 102, comprises the secondary retaining clip 104, and comprises the curved support surface elements 86.

As shown in FIG. 5, in the installation position 194 comprising a first installation position 194a, the secondary retaining clip 104 of the co-molded snap-on support base 10, such as the co-molded snap-on support base 10a, is positioned over the elongate bar structure 42, such as the spanner bar 44, such that the secondary retaining clip 104 is aligned with a hole 62a to define a registration point 63a on the elongate bar structure 42, such as the spanner bar 44.

As further shown in FIG. 5, in the installation position 194 comprising a second installation position 194b, the co-molded snap-on support base 10, such as the co-molded snap-on support base 10a, of the snap-on assembly 14 is snapped onto a portion 42a of the elongate bar structure 42, such as the spanner bar 44, in a one-step snap-on attachment 60 (see FIG. 1), such that the head portion 152 of each clip portion 146 of the secondary retaining clip 104 is received by a hole 62b defining a registration point 63b in the elongate bar structure 42, such as the spanner bar 44. Further, in the second installation position 194b, the first side attachment arm 96a and the second side attachment arm 96b, the bottommost ends 94, and the lateral retaining strips 102 engage and snap over the sides 52, bottom ends 56, and edge surfaces 57 of the elongate bar structure 42, such as the spanner bar 44. The snap-on assembly 14 with the monument 110 co-molded with the co-molded snap-on support base 10, is sufficiently secured to the elongate bar structure 42, such as the spanner bar 44, with the lateral retaining strips 102 and the secondary retaining clip 104. However, the co-molded snap-on support base 10 of the snap-on assembly 14 may be further secured to the elongate bar structure 42, such as the spanner bar 44, with the use of an installation clip 158 (see FIG. 5). As shown in FIG. 5, the installation clip 158 has legs 195 with first hook portions 196a at the bottom end and second hook portions 196b at the top end, and a bridge portion 198 spanning between the legs 195, and from which the legs 195 extend downwardly, or away from. As shown in FIG. 5, the first hook portions 196a of the legs 195 are aligned with openings 124, such as first openings 124a, in the first side attachment arm 96a and the second side attachment arm 96b of the bottom portion 74. The first hook portions 196a include tips 200a (see FIG. 5), and the second hook portions 196b include tips 200b (see FIG. 5).

As shown in FIG. 5, in the installation position 194 comprising a third installation position 194c, the legs 195 and the first hook portions 196a of the installation clip 158 are inserted through the first openings 124a of the first side attachment arm 96a and the second side attachment arm 96b, and the tips 200a of the first hook portions 196a engage the second openings 124b on the first side attachment arm 96a, and tips 200b of the second hook portions 196b engage the second openings 124b on the second side attachment arm 96b. The installation clip 158 may be removed by pressing the legs 195 towards each other such that the first hook portions 196a can be pushed through the first openings 124a in a reverse process.

As shown in FIG. 5, the snap-on assemblies 14 are spaced along the length 66 (see FIG. 9D) of the elongate bar structure 42, such as the spanner bar 44, at desired intervals. In one version, the elongate bar structure 42, such as the spanner bar 44, is about 18 (eighteen) inches long, and may accommodate 4 (four) to 6 (six) snap-on assemblies 14. However, the length of the elongate bar structure 42, such as the spanner bar 44, may vary, as well as the size and/or amount of snap-on assemblies 14 and the desired spacing of the snap-on assemblies 14 along the elongate bar structure 42, such as the spanner bar 44.

Now referring to FIGS. 6A-6P, FIGS. 6A-6P show another version of a snap-on assembly 14 of the disclosure, where the snap-on assembly 14 comprises the co-molded snap-on support base 10, such as co-molded snap-on support base 10a (see FIGS. 6A-6J, 6L-6P), or such as co-molded snap-on support base 10b (see FIG. 6K), with the apparatus 12 in the form of a ring post 112.

FIGS. 6A-6J show various views of the snap-on assembly 14 comprising the co-molded snap-on support base 10, such as co-molded snap-on support base 10a, co-molded to the apparatus 12 in the form of a ring post 112, such as a 4-ring ring post 112d, with four rings 202. FIG. 6A is an illustration of a front perspective view of an exemplary version of the snap-on assembly 14 of the disclosure, in the form of the co-molded snap-on support base 10, such as co-molded snap-on support base 10a, with 3 (three) secondary retaining clips 104, and co-molded with the apparatus 12 in the form of the ring post 112, such as the 4-ring ring post 112d, with four rings 202. FIG. 6B is an illustration of a bottom perspective view of the snap-on assembly 14 of FIG. 6A. FIG. 6C is an illustration of a front right side perspective view of the snap-on assembly 14 of FIG. 6A. FIG. 6D is an illustration of a left side view of the snap-on assembly 14 of FIG. 6A. FIG. 6E is an illustration of a front view of the snap-on assembly 14 of FIG. 6A. FIG. 6F is an illustration of a rear view of the snap-on assembly 14 of FIG. 6A. FIG. 6G is an illustration of a bottom view of the snap-on assembly 14 of FIG. 6A. FIG. 6H is an illustration of a top view of the snap-on assembly 14 of FIG. 6A. FIG. 6I is an illustration of a bottom perspective view of the snap-on assembly 14 of FIG. 6A, where the co-molded snap-on support base 10 has 2 (two) secondary retaining clips 104. FIG. 6J is an illustration of a bottom perspective view of the snap-on assembly 14 of FIG. 6A, where the co-molded snap-on support base 10 has 1 (one) secondary retaining clip 104.

As shown in FIGS. 6A, 6H, the co-molded snap-on support base 10, such as in the form of co-molded snap-on support base 10a, has curved support surface elements 86, such as the first curved support surface element 86a and the second curved support surface element 86b. The curved support surface elements 86, such as the first curved support surface element 86a and the second curved support surface element 86b, comprise the curved support 126 (see FIGS. 6A, 6H) having the curved support surface side 128a (see FIG. 6A, 6H), or contact side, and the back side 128b (see FIG. 6A), or non-contact side. FIGS. 6A, 6H further show the extender arm 130 integral with the top portion 72, and extending outwardly from, the top portion 72, and integral with the curved support 126. Each extender arm 130 defines recess portions 133 (see FIG. 6A), discussed above, formed above and below the extender arm 130, and formed between the curved support 126 and the top portion 72. In another version, FIG. 6K shows the co-molded snap-on support base 10, such as in the form of co-molded snap-on support base 10b, without the curved support surface elements 86.

As discussed above, the co-molded snap-on support base 10 comprises the top portion 72 (see FIGS. 6A, 6K-6P) co-molded with the bottom portion 74 (see FIGS. 6A, 6K-6P). The bottom portion 74 comprises the attachment clip 90 (see FIGS. 6A-6P) having the side attachment arms 96 (see FIGS. 6A, 6E, 6F, 6K), such as the first side attachment arm 96a (see FIGS. 6A, 6E, 6F, 6K) and the second side attachment arm 96b (see FIGS. 6A, 6E, 6F, 6K), and having the lateral retaining strips 102 (see FIGS. 6A, 6F, 6I-6K), and having one or more secondary retaining clips 104 (see FIGS. 6A, 6B, 6E-6G, 6I-6K).

FIG. 6J shows a 1-secondary retaining clip attachment 105a with the secondary retaining clip 104 in the form of the first secondary retaining clip 104a. FIG. 6I shows a 2-secondary retaining clip attachment 105b with the secondary retaining clips 104 in the form of the first secondary retaining clip 104a and the second secondary retaining clip 104b. FIG. 6B shows the 3-secondary retaining clip attachment 105c with the secondary retaining clips 104 in the form of the first secondary retaining clip 104a, the second secondary retaining clip 104b, and the third secondary retaining clip 104c.

As shown in FIGS. 6A, 6K-6P, the apparatus 12, such as the ring post 112, is co-molded to the top portion 72 of the co-molded snap-on support base 10. As shown in FIG. 6A, the ring post 112 has a first end 204a, such as a bottom end, co-molded to the topmost end 76 of the top portion 72. As further shown in FIG. 6A, the ring post 112 has a second end 204b, such as a top end, and a ring post body 205 (see also FIG. 6H), such as a shaft 205a, having a generally cylindrical shape 206 (see also FIG. 6H) with an exterior 207a (see also FIG. 6H) and an interior 207b (see FIG. 6H). The ring posts 112 may vary in length depending on the number of rings 202 and height desired, and the ring post 112 or stack-up of ring posts 112 generally has a length in a range of 0.73 inch to 4.62 inches. For example, in one version, one ring post 112 may have a length of 0.75 inch+/−0.02 inch, and in one version, a stack-up of 6 (six) ring posts may have a length of 4.5 inches.

The ring post 112 comprises one or more rings 202. Each ring 202 has an inner circumference 208a (see FIG. 6H), an outer circumference 208b (see FIG. 6H), and a ring body 210 (see FIGS. 6A, 6H). In various versions, the ring post 112 comprises, a 1-ring ring post 112a (see FIG. 6L) having 1 (one) ring 202; a 2-ring ring post 112b (see FIG. 6M) having 2 (two) rings 202; a 3-ring ring post 112c (see FIG. 6N) having 3 (three) rings 202; a 4-ring ring post 112d (see FIGS. 6A-6F, 6I-6K) having 4 (four) rings 202; a 5-ring ring post 112e (see FIG. 6O) having 5 (five) rings 202; or a 6-ring ring post 112f (see FIG. 6P) having 6 (six) rings 202.

As shown in FIGS. 6A, 6H, each ring 202 is integral with, and spaced from, the ring post body 205, such as the shaft 205a, via spokes 212, such as radially extending spokes 212a, positioned between portions of the exterior 207a of the ring post body 205, and the ring body 210. Each ring 202 is integral with, and secured to, portions of the exterior 207a of the ring post body 205, via the spokes 212 that radially extend from the ring post body 205. As shown in FIG. 6H, the spokes 212 are spaced with respect to each other at 90 degree angles and define a corresponding number of through openings 214, or slots, between the spokes 212. Thus, the ring post 112 comprises one or more rings 202 each having one or more spokes 212, such as radially extending spokes 212a, that define a corresponding number of through openings 214, or slots, therebetween. The spokes 212 separate the through openings 214, or slots. Similar to a clock face, the 4 (four) spokes 212 shown in FIG. 6H are generally at the positions of 12 o'clock, 3 o'clock, 6 o'clock, and 9 o'clock.

The plurality of through openings 214, or slots, are of a sufficient size to receive a fastener device 134 (see FIG. 10A), such as a cable tie 134b (see FIG. 10A), a zip tie 134a (see FIG. 4), or another suitable fastener or attachment device. As shown in FIG. 6H, the ring 202 has 4 (four) spokes 212 and 4 (four) through openings 214. However the ring 202 may have another suitable number of spokes and corresponding through openings. As shown in FIG. 6A, the rings 202 of the ring post 112 are tiered in alignment with each other, and spaced apart from each other, along the length of the ring post body 205, such as the shaft 205a. When the ring post 112 has two or more rings 202, the spokes 212 and through openings 214 of each ring 202 are aligned with the spokes 212 and through openings 214 of the other rings 202 on the ring post body 205, such as the shaft 205a, and the rings 202 are tiered in alignment with each other and, in use, are in alignment with the elongate bar structure 42 (see FIG. 9A), such as the spanner bar 44 (see FIG. 9A).

As shown in FIG. 6E, and discussed above, in one version, the secondary retaining clip 104 comprises two clip portions 146, such as the first clip portion 146a and the second clip portion 146b, each having the first end 148a integral with, and projecting downwardly from, the interior surface 93a of the top end 92 of the bottom portion 74. Each clip portion 146 further has the second end 148b extending into the channel 106. As shown in FIG. 6E, each clip portion 146 further has the stem portion 150 extending downwardly from the first end 148a, and the stem portion 150 being integral with the head portion 152 extending downwardly from the stem portion 150. The head portion 152 generally has a greater width than the stem portion 150. As further shown in FIG. 6E, each clip portion 146 has the flat side 154, where the flat side 154 of the first clip portion 146a faces, and is the mirror image of, the flat side 154 of the second clip portion 146b. Each head portion 152 has the one-half truncated cone shape profile 155 (see FIG. 6E). FIG. 6E shows the gap 156 between the flat sides 154 of the clip portions 146.

FIG. 6K is an illustration of a front perspective view of the snap-on assembly 14 of FIG. 6I, where the co-molded snap-on support base 10 has openings 124, such as first openings 124a and second openings 124b, in the side attachment arms 96, such as the first side attachment arm 96a and the second side attachment arm 96b, of the bottom portion 74, and where the co-molded snap-on support base 10 has no curved support surface elements 86. The co-molded snap-on support base 10, such as in the form of co-molded snap-on support base 10b, of FIG. 6K, is identical to the co-molded snap-on support base 10, such as in the form of co-molded snap-on support base 10a, of FIG. 6A, except for the absence of the curved support surface elements 86 (see FIG. 6A), the number of secondary retaining clips 104, and the addition of the openings 124.

FIG. 6L is an illustration of a front right side perspective view of an exemplary version of the snap-on assembly 14 of the disclosure, in the form of the co-molded snap-on support base such as in the form of co-molded snap-on support base 10a, of FIG. 6A, co-molded with the apparatus 12 in the form of the ring post 112, such as the 1-ring ring post 112a, with one ring 202 on the ring post body 205. As shown in FIG. 6L, the first end 204a, such as the bottom end, of the ring post 112 is co-molded to the topmost end 76 of the top portion 72, and the second end 204b of the ring post 112 has a top threaded opening 163a configured to receive another ring post 112 or another suitable attachment device. As shown in FIG. 6L, the co-molded snap-on support base such as in the form of co-molded snap-on support base 10a, has curved support surface elements 86, the top portion 72 co-molded to the bottom portion 74, the attachment clip 90, the lateral retaining strips 102, and the secondary retaining clip 104.

FIG. 6M is an illustration of a front right side perspective view of an exemplary version of the snap-on assembly 14 of the disclosure, in the form of the co-molded snap-on support base such as in the form of co-molded snap-on support base 10a, of FIG. 6A, co-molded with the apparatus 12 in the form of the ring post 112, such as the 2-ring ring post 112b, with two rings 202 on the ring post body 205. As shown in FIG. 6M, the first end 204a, such as the bottom end, of the ring post 112 is co-molded to the topmost end 76 of the top portion 72, and the second end 204b of the ring post 112 has the top threaded opening 163a configured to receive another ring post 112 or another suitable attachment device. As shown in FIG. 6M, the co-molded snap-on support base such as in the form of co-molded snap-on support base 10a, has curved support surface elements 86, the top portion 72 co-molded to the bottom portion 74, the attachment clip 90, the lateral retaining strips 102, and the secondary retaining clip 104.

FIG. 6N is an illustration of a front right side perspective view of an exemplary version of the snap-on assembly 14 of the disclosure, in the form of a co-molded snap-on support base 10, such as in the form of co-molded snap-on support base 10a, of FIG. 6A, co-molded with the apparatus 12 in the form of the ring post 112, such as the 3-ring ring post 112c, with three rings 202 on the ring post body 205. As shown in FIG. 6N, the first end 204a, such as the bottom end, of the ring post 112 is co-molded to the topmost end 76 of the top portion 72, and the second end 204b of the ring post 112 has the top threaded opening 163a configured to receive another ring post 112 or another suitable attachment device. As shown in FIG. 6N, the co-molded snap-on support base 10, such as in the form of co-molded snap-on support base 10a, has curved support surface elements 86, the top portion 72 co-molded to the bottom portion 74, the attachment clip the lateral retaining strips 102, and the secondary retaining clip 104.

FIG. 6O is an illustration of a front right side perspective view of an exemplary version of a snap-on assembly 14 of the disclosure, in the form of the co-molded snap-on support base 10, such as in the form of co-molded snap-on support base 10a, of FIG. 6A, co-molded with the apparatus 12 in the form of the ring post 112, such as the 5-ring ring post 112e, with five rings 202 on the ring post body 205. As shown in FIG. 6O, the first end 204a, such as the bottom end, of the ring post 112 is co-molded to the topmost end 76 of the top portion 72, and the second end 204b of the ring post 112 has the top threaded opening 163a configured to receive another ring post 112 or another suitable attachment device. As shown in FIG. 6O, the co-molded snap-on support base such as in the form of co-molded snap-on support base 10a, has curved support surface elements 86, the top portion 72 co-molded to the bottom portion 74, the attachment clip 90, the lateral retaining strips 102, and the secondary retaining clip 104.

FIG. 6P is an illustration of a front right side perspective view of an exemplary version of a snap-on assembly 14 of the disclosure, in the form of a co-molded snap-on support base 10, such as in the form of co-molded snap-on support base 10a, of FIG. 6A, co-molded with the apparatus 12 in the form of the ring post 112, such as the 6-ring ring post 112f, with six rings 202 on the ring post body 205. As shown in FIG. 6P, the first end 204a, such as the bottom end, of the ring post 112 is co-molded to the topmost end 76 of the top portion 72, and the second end 204b of the ring post 112 has the top threaded opening 163a configured to receive another ring post 112 or another suitable attachment device. As shown in FIG. 6P, the co-molded snap-on support base 10, such as in the form of co-molded snap-on support base 10a, has curved support surface elements 86, the top portion 72 co-molded to the bottom portion 74, the attachment clip 90, the lateral retaining strips 102, and the secondary retaining clip 104.

Now referring to FIG. 7, FIG. 7 is an illustration of a front right side perspective view of an exemplary version of the snap-on assembly 14 of the disclosure, in the form of a co-molded snap-on support base 10, such as in the form of co-molded snap-on support base 10a, co-molded with the apparatus 12 in the form of the ring post 112, such as the 2-ring ring post 112b, with two rings 202 on the ring post body 205. As shown in FIG. 7, the first end 204a, such as the bottom end, of the ring post 112 is co-molded to the topmost end 76 of the top portion 72, and the second end 204b of the ring post 112 has the top threaded opening 163a configured to receive another ring post 112 or another suitable attachment device. As shown in FIG. 7, the co-molded snap-on support base 10, such as in the form of co-molded snap-on support base 10a, has curved support surface elements 86, the top portion 72 co-molded to the bottom portion 74, the attachment clip 90 with the side attachment arms 96 and the lateral retaining strips 102.

In this version, the ring post 112 has an insert 215, such as a metal rod insert 215a, disposed in, or inserted into, the interior 207b (see FIG. 6H) of the center of the ring post body 205 of the ring post 112, such as the 2-ring ring post 112b, and extending through an interior portion 87b of the center of the top portion 72 and through the bottom portion 74. The insert 215, such as the metal rod insert 215a, is preferably made of a strong and sturdy metal material, such as titanium, steel, stainless steel, or another suitably strong and sturdy metal material, to lend reinforcement and support to the ring post 112, in particular, if there is a stack-up of several ring posts 112. As shown in FIG. 7, the insert 215, such as the metal rod insert 215a, has a rod body 216 with a first end 218 at the top threaded opening 163a. The rod body 216 is connected to, or integral with, a flared base 220 (see FIG. 7) that flares out from a portion 216a (see FIG. 7) of the rod body 216. A second threaded end (not shown) of the rod body 216 is threaded and configured for insertion through a hole 62 (see FIGS. 1, 9A) in the elongate bar structure 42, such as the spanner bar 44, and for insertion through a washer and a nut to attach and torque the second threaded end down. Although the insert 215, such as the metal rod insert 215a, is shown in FIG. 7 with the 2-ring ring post 112b, the insert 215, such as the metal rod insert 215a, may be used with any of the ring posts 112 shown in FIGS. 6A, 6L, 6N-6P.

Now referring to FIG. 8, FIG. 8 is an illustration of a left side view of an exemplary version of the snap-on assembly 14 of the disclosure, in the form of the co-molded snap-on support base 10, such as in the form of co-molded snap-on support base 10b, co-molded with the apparatus 12 in the form of the ring post 112, such as the 2-ring ring post 112b, with two rings 202, and having the p-clamp 160, such as the latch p-clamp 160b, attached to the second end 204b, or top end, of the ring post 112, such as the 2-ring ring post 112a. As shown in FIG. 8, the first end 204a, such as the bottom end, of the ring post 112 is co-molded to the topmost end 76 of the top portion 72, and the second end 204b, or top end, of the ring post 112 is attached to the p-clamp 160, such as the latch p-clamp 160b. As further shown in FIG. 8, the co-molded snap-on support base 10, such as in the form of co-molded snap-on support base 10b, has the top portion 72 co-molded to the bottom portion 74, and the attachment clip 90 with the side attachment arm 96.

In this version, the ring post 112 is attached to the p-clamp 160, such as the latch p-clamp 160b. The p-clamp 160, such as the latch p-clamp 160a, comprises the body 164, such as the hinged circular latch body 164a, with the latch closure 165 having a locking clip 222, such as a first locking clip 222a. As shown in FIG. 8, the p-clamp 160, such as the latch p-clamp 160a, is in the closed position 166, and the opening 168 formed by the hinged circular latch body 164a, such as made of a metal material, is designed to receive, surround, and hold, one or more elongate elements 26, such as wires 34 or cables 36, or is designed to receive, surround, and hold, a harness 28 of elongate elements 26.

As shown in FIG. 8, the p-clamp 160, such as the latch p-clamp 160a, further comprises a hollow centering base 224 with sides 225. The hollow centering base 224 is attached to the bottom of the hinged circular latch body 164a. The hollow centering base 224 is configured to cover the second end 204b, or top end, of the ring post 112, when the p-clamp 160, such as the latch p-clamp 160a, is attached to the ring post 112. As shown in FIG. 8, the p-clamp 160, such as the latch p-clamp 160a, further comprises two legs 226 extending from bottom of the hinged circular latch body 164a of the p-clamp 160, such as the latch p-clamp 160a, and positioned adjacent the exterior of the sides 225 of the hollow centering base 224. As shown in FIG. 8, the end of each leg 226, has a locking clip 222, such as a second locking clip 222b, that is formed. The second locking clips 222b and a portion 226a of the legs 226 are configured for insertion through two of the through openings 214 of the ring 202, such as a topmost ring 202a, of the ring post 112, and the second locking clips 222b secure the p-clamp, such as the latch p-clamp 160b, to a bottom side 203 of the ring 202, such as the topmost ring 202a, to secure the p-clamp 160, such as the latch p-clamp 160b, to the ring post 112.

Now referring to FIGS. 9A-9D, FIGS. 9A-9D show snap-on assemblies 14 of FIG. 6A installed on an elongate bar structure 42, such as a spanner bar 44. FIG. 9A is an illustration of a right side perspective view of the snap-on assemblies 14 of FIG. 6A installed on the elongate bar structure 42, such as the spanner bar 44. FIG. 9B is an illustration of a rear perspective view of the snap-on assemblies 14 installed on the elongate bar structure 42, such as the spanner bar 44, of FIG. 9A. FIG. 9C is an illustration of a bottom right side perspective view of the snap-on assemblies 14 installed on the elongate bar structure 42, such as the spanner bar 44, of FIG. 9A. FIG. 9D is an illustration of a bottom perspective view of the snap-on assemblies 14 installed on the elongate bar structure 42, such as the spanner bar 44, of FIG. 9A.

As shown in FIGS. 9A-9D, the snap-on assemblies 14 comprise the co-molded snap-on support base 10, such as in the form of co-molded snap-on support base 10a, co-molded with the apparatus 12 in the form of the ring post 112, such as the 4-ring ring post 112d having 4 (four) rings 202 on the ring post body 205 (see FIG. 9A). As shown in FIG. 9A, the rings 202 of the ring post 112 are tiered in alignment with each other, and spaced apart from each other, along the length of the ring post body 205, and the spokes 212 and through openings 214 of each ring 202 are aligned with the spokes 212 and through openings 214 of the 3 (three) other rings 202 on the ring post body 205. Further, the 4 (four) rings 202 are tiered in alignment with each other and with holes 62 (see FIG. 9B) of the portion 42a (see FIG. 9B) of the elongate bar structure 42 (see FIG. 9A), such as the spanner bar 44 (see FIG. 9A), to which the co-molded snap-on support base 10 of the snap-on assembly 14 is attached. As shown in FIG. 9A, the first end 204a, such as the bottom end, of each ring post 112 is co-molded to the topmost end 76 of the top portion 72, and the second end 204b of the ring post 112 has the top threaded opening 163a configured to receive another ring post 112 or another suitable attachment device.

As shown in FIG. 9A, each of the ring posts 112 is in a clocked orientation 228, where the rings 202, including the spokes 212 and through openings 214 of each ring 202, of the ring post 112 are vertically aligned in parallel with each other and aligned with the desired holes 62 in the elongate bar structure 42, such as the spanner bar 44. Because the ring posts 112 are co-molded with the co-molded snap-on support base 10, no clocking is needed for the ring posts 112 when in operation. As used herein, "clocking" means a procedure for orienting and aligning the spokes and through openings of the rings of a ring post with respect to the spokes and through openings of the rings of other ring posts in a stack-up of ring posts on an elongate bar structure, such as a spanner bar or a support bar, and orienting and aligning the rings of the ring posts to be parallel or perpendicular to a reference point, such as the elongate bar structure, such as the spanner bar or the support bar.

The co-molded snap-on support base 10, such as in the form of co-molded snap-on support base 10a, further comprises the curved support surface elements 86 (see FIG. 9A), the top portion 72 (see FIG. 9A) co-molded with the bottom portion 74 (see FIG. 9A) comprising the attachment clip 90 (see FIGS. 9A-9D) with the side attachment arms 96 (see FIGS. 9A-9C), such as the first side attachment arm 96a (see FIGS. 9A-9C) and the second side attachment arm 96b (see FIGS. 9A-9C). The co-molded snap-on support base 10, such as in the form of co-molded snap-on support base 10a, further comprises the lateral retaining strips 102 (see FIGS. 9B-9C) and the secondary retaining clips 104 (see FIGS. 9B-9D). As shown in FIGS. 9B-9D, each co-molded snap-on support base 10 has 3 (three) secondary retaining clips 104.

As shown in FIG. 9A, the elongate bar structure 42, such as in the form of the spanner bar 44, for example, a linear spanner bar 44a (see FIG. 10A), comprises the first end 48a, the second end 48b, the elongate body 50 formed between the first end 48a and the second end 48b, and sides 52, such as the first side 52a and the second side 52b, that depend downwardly from top edges 54 of the elongate body 50. As shown in FIG. 9A, the elongate bar structure 42, such as in the form of the spanner bar 44, further comprises the top end 55, the bottom ends 56 (see also FIG. 9D), such as a first bottom end 56a and a second bottom end 56b, integral with, and perpendicular to, the first side 52a and the second side 52b, respectively. As shown in FIG. 9A, the elongate bar structure 42, such as in the form of the spanner bar 44, further comprises the edge surface 57 depending upwardly from each bottom end 56 and facing into the interior channel 58 (see FIG. 9C) formed between the edge surfaces 57 and formed in the interior space of the elongate bar structure 42, such as the spanner bar 44, surrounded by the top end 55, the sides 52, and the bottom ends 56. The top end 55, sides 52, and bottom ends 56 of the elongate bar structure 42, such as the spanner bar 44, form a bracket 59 (see FIG. 9B) having a generally C-shaped configuration 246 (see FIG. 13A). However, the elongate bar structure 42, such as the spanner bar 44, can have other suitable shapes and sizes, including polygonal, round, elliptical, and the like. The elongate bar structure 42, such as the spanner bar 44, may also form a hollow elongate bar structure or may be primarily solid depending on the application.

The co-molded snap-on support base 10 of each snap-on assembly 14 is attached to the elongate bar structure 42 with a one-step snap-on attachment 60 (see FIG. 1) over the top end 55, the sides 52, the bottom ends 56, and the edge surfaces 57 of each portion 42a (see FIGS. 9A-9D) of the elongate bar structure 42, such as the spanner bar 44, to which the co-molded snap-on support base 10 is attached. The elongate bar structure 42, such as the spanner bar 44, has holes 62 (see FIGS. 9A-9D), such as through holes, that define registration points 63 (see FIGS. 9C-9D) formed through the central portion 64 (see FIG. 9A) of the elongate body 50, along the length 66 (see FIG. 9D) of the elongate bar structure 42, such as the spanner bar 44. As shown in FIGS. 9A-9D, the holes 62 are spaced an equal distance apart from each other along the length 66 (see FIG. 9D). In one version, the elongate bar structure 42, such as the spanner bar 44, is about 18 (eighteen) inches long, although the length 66 of the elongate bar structure 42, such as the spanner bar 44, can vary from a few inches to several feet or more depending upon the application. In addition, the elongate bar structure 42, such as the spanner bar 44, may be linear as shown, but may have other, non-linear configurations if so desired.

As shown in FIG. 9A, the elongate bar structure 42, such as the spanner bar 44, has the slot opening 68 formed through the central portion 64 of the elongate body 50, at, or near, the first end 48a of the elongate bar structure 42, such as the spanner bar 44.

As shown in FIGS. 9A-9D, the co-molded snap-on support base 10 of each of the 2 (two) snap-on assemblies 14 is attached to the portion 42a of the elongate bar structure 42, such as the spanner bar 44, in a spaced apart configuration 230 (see FIG. 9C), with the 3 (three) secondary retaining clips 104 (see FIGS. 9B-9C) inserted through holes 62 (see FIGS. 9C-9D), defining registration points 63 (see FIGS. 9C-9D). As further shown in FIGS. 9A-9D, the co-molded snap-on support base 10 of each of the 2 (two) snap-on assemblies 14 is attached to the portion 42*a* of the elongate bar structure 42, such as the spanner bar 44, with the side attachment arms 96 attached over the top end 55 (see FIG. 9A), the sides 52 (see FIG. 9A), and the bottom ends 56 of each portion 42*a* of the elongate bar structure 42, such as the spanner bar 44, and the lateral retaining strips 102 attached over the edge surfaces 57 of each portion 42*a* of the elongate bar structure 42, such as the spanner bar 44. Once the snap-on assemblies 14 are installed on and locked to the elongate bar structure 42, such as the spanner bar 44, one or more elongate elements 26, or harnesses 28 bundling the elongate elements 26, may be attached and routed to the snap-on assemblies 14.

Figure 10B:
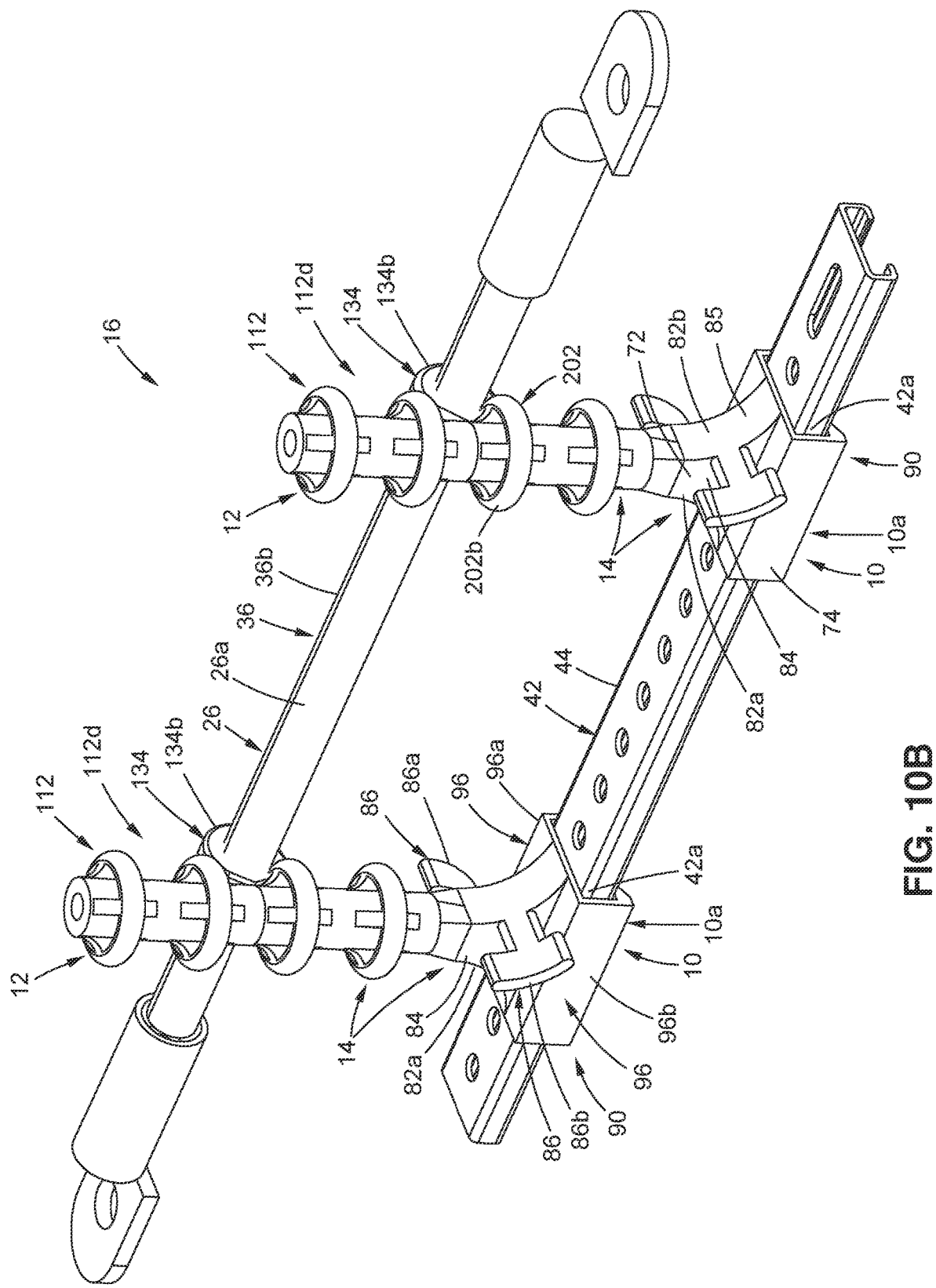
FIG. 10B is an illustration of a left side perspective view of the support system of FIG. 10A.
Figure 10C:
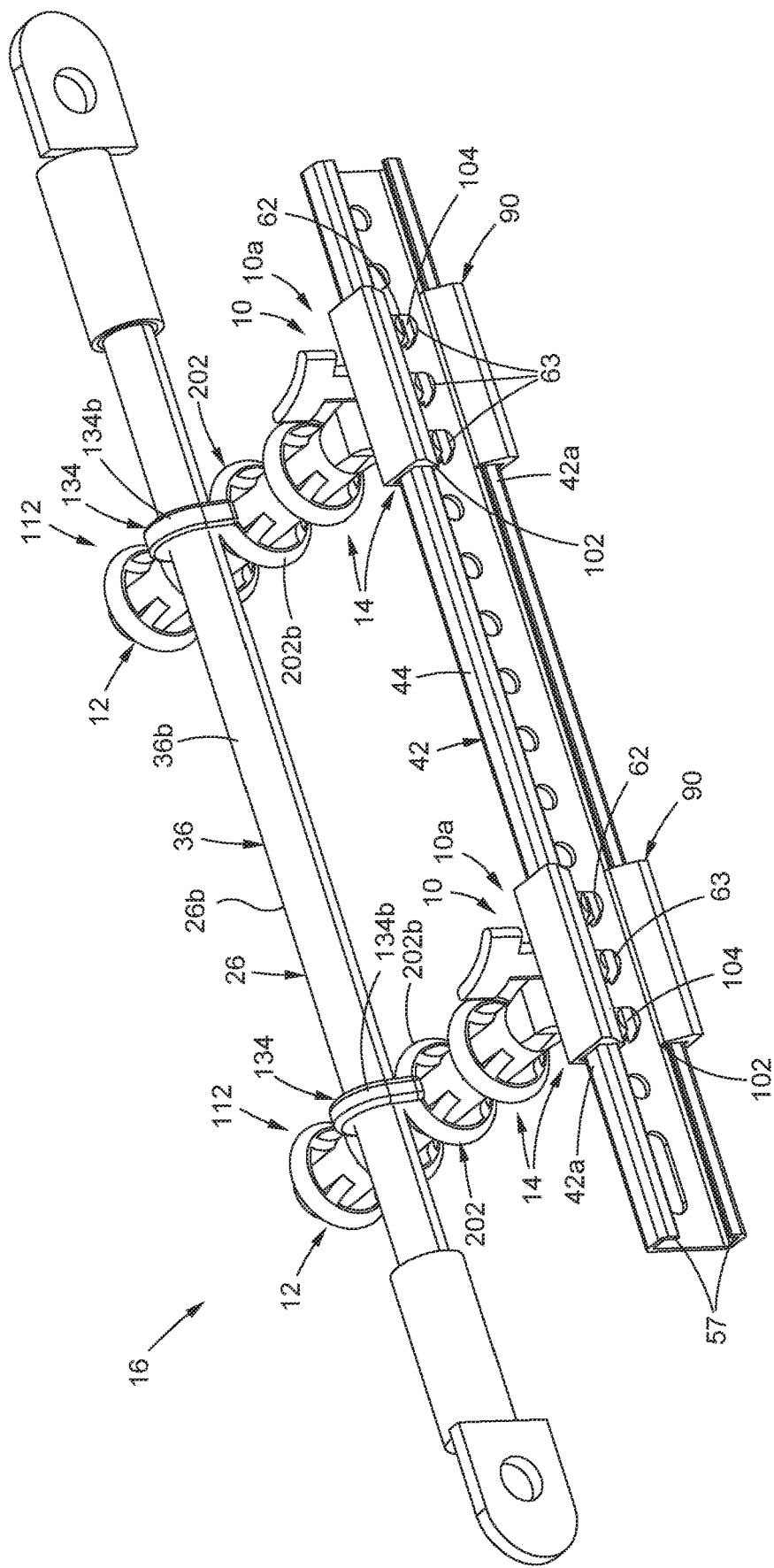
FIG. 10C is an illustration of a bottom right side perspective view of the support system of FIG. 10A.

Now referring to FIGS. 10A-10C, FIGS. 10A-10C show a version of a support system 16 of the disclosure. FIG. 10A is an illustration of a right side perspective view of an exemplary version of the support system 16 of the disclosure, showing the snap-on assemblies 14, and elongate bar structure 42, such as the spanner bar 44, of FIGS. 9A-9D, and showing an elongate element 26, such as an elongate conductive element 26*a*, for example, a cable 36, such as a current return network cable 36*b*, attached to a ring 202 of each ring post 112, such as the 4-ring ring post 112*d*, of the snap-on assemblies 14, via a fastener device 134, such as a cable tie 134*b*. FIG. 10B is an illustration of a left side perspective view of the support system 16 of FIG. 10A. FIG. 10C is an illustration of a bottom right side perspective view of the support system 16 of FIG. 10A.

As shown in FIGS. 10A-10C, the snap-on assemblies 14 comprise the co-molded snap-on support base 10, such as in the form of co-molded snap-on support base 10*a*, co-molded with the apparatus 12 in the form of the ring post 112, such as the 4-ring ring post 112*d* having 4 (four) rings 202 on the ring post body 205 (see FIG. 10A). As shown in FIGS. 10A-10C, the elongate element 26, such as the elongate conductive element 26*a*, for example, the cable 36, such as the current return network cable 36*b*, is attached to the ring 202, such as a third ring 202*b*, of each ring post 112, such as the 4-ring ring post 112*d*, of the snap-on assemblies 14, via the fastener device 134, such as the cable tie 134*b*. As shown in FIG. 10A, the cable 36, such as the current return network cable 36*b*, comprises termination portions 232, such as wire termination portions 232*a*, for connecting to another electrical conducting surface or mating connector. A hole 234 (see FIG. 10A) in each termination portion 232, such as the wire termination portion 232*a*, is configured to receive a fastener or attachment element (not shown) to make an electrical connection with another surface. For example, smaller wires may use pins inserted in a connector, which attaches to another connector to continue a circuit. The cable 36, such as the current return network cable 36*b*, may be used for an electrical ground system on a vehicle 30 (see FIG. 1), such as an aircraft 30*a* (see FIG. 1). The cable 36, such as the current return network cable 36*b*, is an example of an elongate element 26 that may be attached and routed to the apparatus 12, such as the ring post 112, of the snap-on assembly 14 in the support system 16. Other types of elongate elements 26 may also be attached and routed to the apparatus 12, such as the ring post 112, of the snap-on assembly 14.

FIGS. 10A-10B show the curved support surface elements 86, such as the first curved support surface element 86*a* and the second curved support surface element 86*b*, integral with and extending away from first opposite sides 82*a* comprising straight sides 84. FIG. 10B further shows the second opposite sides 82*b* such as the curved sides 85 of the top portion 72. FIGS. 10A-10B show the bottom portion 74 comprising the attachment clip 90 with the side attachment arms 96, such as the first side attachment arm 96*a* and the second side attachment arm 96*b*. The co-molded snap-on support base 10, such as in the form of co-molded snap-on support base 10*a*, further comprises the lateral retaining strips 102 (see FIG. 10C) and the secondary retaining clips 104 (see FIG. 10C). As shown in FIG. 10C, each co-molded snap-on support base 10 has 3 (three) secondary retaining clips 104.

As shown in FIGS. 10A-10C, the elongate bar structure 42, such as in the form of the spanner bar 44, for example, the linear spanner bar 44*a* (see FIG. 10A), has holes 62, such as through holes, that define registration points 63 (see FIG. 10C) formed through the central portion 64 (see FIG. 10A) of the elongate body 50 of the elongate bar structure 42, such as the spanner bar 44. As shown in FIG. 10A, the elongate bar structure 42, such as in the form of the spanner bar 44, has the slot opening 68 formed through the central portion 64 (see FIG. 9A) of the elongate body 50 of the elongate bar structure 42, such as the spanner bar 44.

The co-molded snap-on support bases 10 of the snap-on assemblies 14 are attached to portions 42*a* (see FIGS. 10A-10C) of the elongate bar structure 42 with a one-step snap-on attachment 60 (see FIG. 1). As shown in FIG. 10C, the co-molded snap-on support bases 10 of the 2 (two) snap-on assemblies 14 are attached to the portions 42*a* of the elongate bar structure 42, such as the spanner bar 44, with the 3 (three) secondary retaining clips 104 inserted through holes 62, defining the registration points 63, and with the lateral retaining strips 102 attached or locked over the edge surfaces 57 of the elongate bar structure 42, such as the spanner bar 44.

Figure 11:
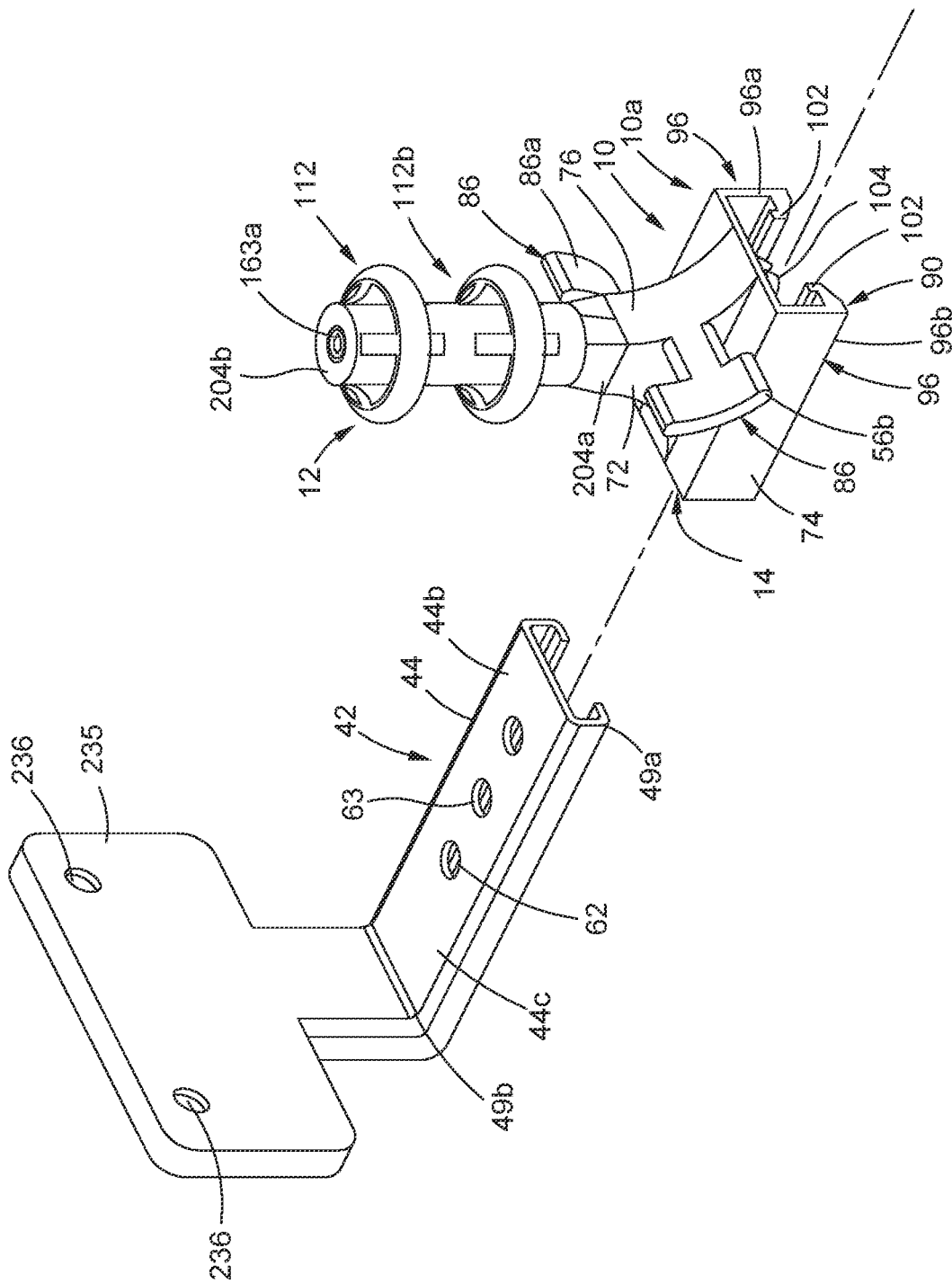
FIG. 11 is an illustration of a left side perspective view of an exemplary version of a snap-on assembly of the disclosure, configured for attachment to a bracketed spanner bar.

Now referring to FIG. 11, FIG. 11 is an illustration of a left side perspective view of an exemplary version of a snap-on assembly 14 of the disclosure, such as the snap-on assembly 14 of FIG. 6M, configured for attachment to an elongate bar structure 42, such as the spanner bar 44, in the form of a bracketed spanner bar 44*b*. As shown in FIG. 11, the bracketed spanner bar 44*b* comprises a shortened spanner bar portion 44*c* having a first end 49*a* configured to receive the co-molded snap-on support base 10, such as the co-molded snap-on support base 10*a*, of the snap-on assembly 14, and having a second end 49*b* attached to, or integral with, a bracket portion 235 having fastener holes 236 for receiving fastener elements, such as screws, bolts, and the like, to attach the bracketed spanner bar 44*b* to a structure in the vehicle 30 (see FIG. 1) or to an architectural structure 32 (see FIG. 1). As shown in FIG. 11, the shortened spanner bar portion 44*c* has 3 (three) holes 62, defining registration points 63, for the secondary retaining clips 104 of the co-molded snap-on support base 10. The bracketed spanner bar 44*b* is preferably made of a composite material, such as a carbon fiber material, a polymeric material, or another suitable composite material. The bracketed spanner bar 44*b* is designed to accept 1 (one) snap-on assembly 14.

As shown in FIG. 11, the snap-on assembly 14 comprises the apparatus 12 comprising the ring post 112, such as the 2-ring ring post 112*b*, co-molded to the co-molded snap-on support base 10, such as in the form of co-molded snap-on support base 10*a*. As shown in FIG. 11, the first end 204*a*, such as the bottom end, of the ring post 112 is co-molded to the topmost end 76 of the top portion 72, and the second end 204b of the ring post 112 has the top threaded opening 163a configured to receive another ring post 112 or another suitable attachment device. As shown in FIG. 11, the co-molded snap-on support base 10, such as in the form of co-molded snap-on support base 10a, has curved support surface elements 86, the top portion 72 co-molded to the bottom portion 74, the attachment clip 90 having the side attachment arms 96, such as the first side attachment arm 96a and the second side attachment arm 96b, the lateral retaining strips 102, and the secondary retaining clip 104.

Figures 12A, 12B:
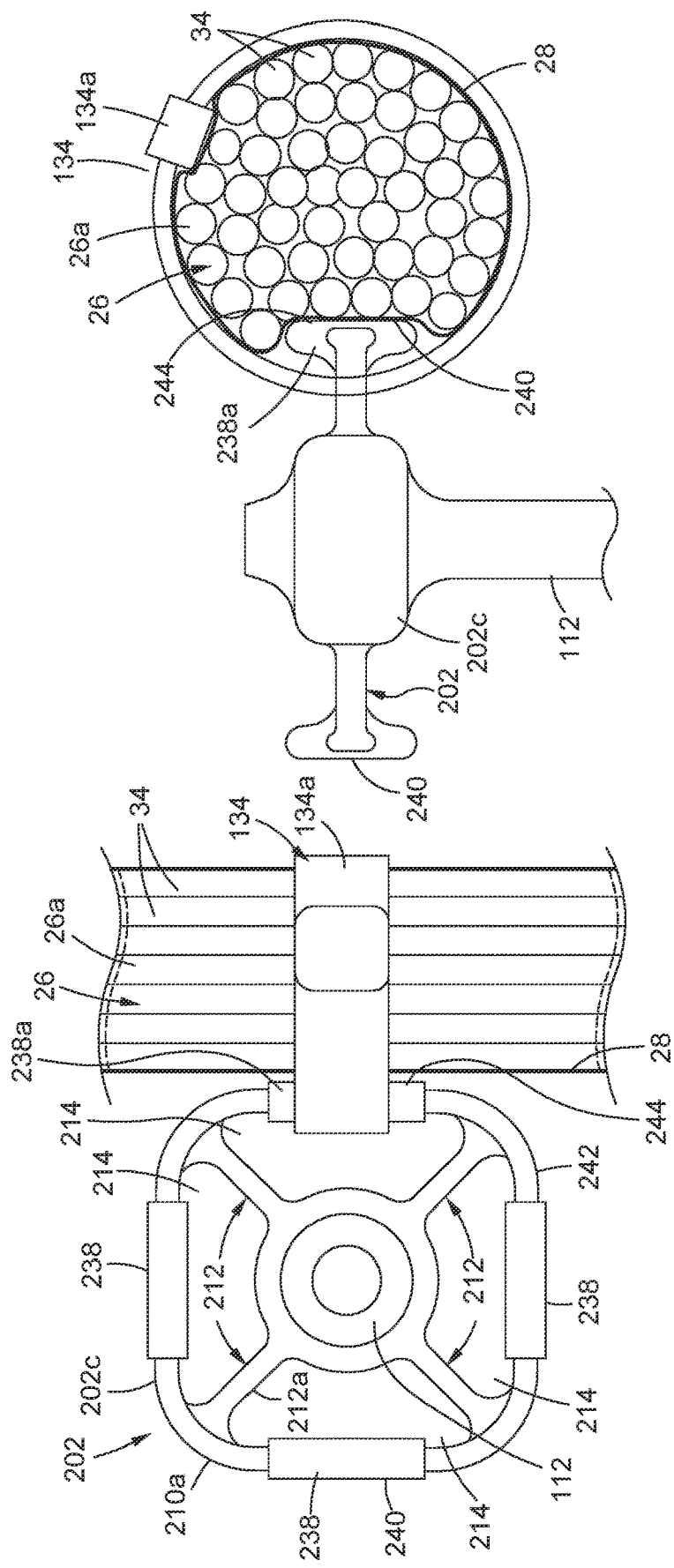
FIG. 12A is an illustration of a top view of a harness of elongate elements attached to an exemplary version of a ring post having a ring with flat side portions.
FIG. 12B is an illustration of a sectional side view of the harness of elongate elements attached to the ring of the ring post of FIG. 12A.

Now referring to FIGS. 12A-12B, FIG. 12A is an illustration of a top view of a harness 28 bundling elongate elements 26, such as elongate conductive elements 26a, for example, wires 34, attached to an exemplary version of a ring post 112 having a ring 202, such as a flattened side ring 202c, with flat side portions 238, and FIG. 12B is an illustration of a sectional side view of the harness 28 bundling the elongate elements 26, such as the elongate conductive elements 26a, for example, the wires 34, attached to the ring 202, such as the flattened side ring 202c, with flat side portions 238, of the ring post 112, of FIG. 12A.

In this version, the ring post 112 has one or more rings 202 comprising flattened side rings 202c, where each flattened side ring 202c has one or more flat side portions 238 (see FIGS. 12A-12B) that have been flattened, to decrease or prevent wear on the elongate elements 26, such as elongate conductive elements 26a, for example, wires 34, adjacent the ring 202, such as the flattened side ring 202c. By flattening edges 240 (see FIGS. 12A-12B) of the ring body 210a of the ring 202, such as the flattened side ring 202c, it provides a smooth surface for the elongate elements 26, such as elongate conductive elements 26a, for example, wires 34, to rest on so there is less, or no, wearing away or abrasion of insulation covering the wires 34. Flattening the edges 240 also provides a flatter surface on which to attach the fastener device 134 (see FIGS. 12A-12B), such as the zip tie 134a (see FIGS. 12A-12B), when attaching the harness 28 (see FIGS. 12A-12B) of wires 34 to the ring 202, such as the flattened side ring 202c, with the fastener device 134, such as the zip tie 134a. Instead of the ring 202 being round, in this version, the ring 202 has a substantially square configuration 242 (see FIG. 12A) with rounded corners.

As shown in FIG. 12A, the ring 202, such as the flattened side ring 202c, of the ring post 112, has a ring body 210a with 4 (four) flat side portions 238. FIG. 12A further shows 4 (four) spokes 212, such as radially extending spokes 212a, extending between the ring post 112 and the ring body 210a. FIG. 12A further shows the corresponding 4 (four) through openings 214, or slots in between the spokes 212. As shown in FIGS. 12A-12B, the elongate elements 26, such as the elongate conductive elements 26a, for example, the wires 34, are bundled with a harness 28 and attached with the fastener device 134, such as the zip tie 134a, to a flat side portion 238a of the ring 202, such as the flattened side ring 202c. As shown in FIGS. 12A-12B, the fastener device 134, such as the zip tie 134a, encircles the harness 28 of wires 34 and loops around the flat side portion 238a of the flattened side ring 202c, to secure the harness 28 of wires 34 to the ring post 112. As shown in FIGS. 12A-12B, the flat side portion 238a has a flat side 244 compressing against several wires 34 bundled in the harness 28, while not causing any intrusion into the wires 34, which may result in slack in the wires.

Now referring to FIGS. 13A-13C, FIGS. 13A-13C show various cross-section profiles 245 for designs of spanner bars 44 that may be used in the support system 16 (see FIG. 1) disclosed herein. FIG. 13A is an illustration of a cross-sectional front view of a version of a spanner bar 44 having a cross-section profile 245, such as a first cross-section profile 245a, used with a version of a support system 16 (see FIG. 10A) of the disclosure. As shown in FIG. 13A, the cross-section profile 245, such as a first cross-section profile 245a, comprises a bracket 59 having a generally C-shaped configuration 246. As shown in FIG. 13A, the spanner bar 44, such as the linear spanner bar 44a, having the first cross-section profile 245a, has the top end 55, and sides 52, such as the first side 52a and the second side 52b, that depend downwardly from top edges 54 at the top end 55. As further shown in FIG. 13A, the spanner bar 44, such as the linear spanner bar 44a, having the first cross-section profile 245a, has edge surfaces 57 depending upwardly from bottom ends 56, such as the first bottom end 56a and the second bottom end 56b, and facing into the interior channel 58 formed between the edge surfaces 57 and formed in the interior space of the spanner bar 44, surrounded by the top end 55, the sides 52, and the bottom ends 56.

FIG. 13B is an illustration of a cross-sectional front view of another version of a spanner bar 44 having a cross-section profile 245, such as a second cross-section profile 245b, that may be used with a version of the support system 16 (see FIG. 1) of the disclosure. As shown in FIG. 13B, the cross-section profile 245, such as the second cross-section profile 245b, comprises a first U-shaped configuration 248. As further shown in FIG. 13B, the spanner bar 44 has a top end 55a with rounded top edges 54a, and sides 52c, that depend downwardly from the rounded top edges 54a. The top end 55a of the second cross-section profile 245b (see FIG. 13B) is wider and has a greater width than the top end 55 of the first cross-section profile 245a (see FIG. 13A). As further shown in FIG. 13B, the sides 52c terminate in bottom ends 56c that are not extended inward like the bottom ends 56 (see FIG. 13A) of the first cross-section profile 245a (see FIG. 13A), and the second cross-section profile 245b does not have the edge surfaces 57 (see FIG. 13A) of the first cross-section profile 245a.

FIG. 13C is an illustration of a cross-sectional front view of yet another version of a spanner bar 44 having a cross-section profile 245, such as a third cross-section profile 245c, that may be used with a version of the support system 16 (see FIG. 1) of the disclosure. As shown in FIG. 13C, the cross-section profile 245, such as the third cross-section profile 245c, comprises a second U-shaped configuration 250 that is larger than the first U-shaped configuration 248 (see FIG. 13B). As further shown in FIG. 13C, the spanner bar 44 has a top end 55b with rounded top edges 54b, and sides 52d that depend downwardly from the rounded top edges 54b. The top end of the third cross-section profile 245c (see FIG. 13C) is also wider and has a greater width than the top end 55 of the first cross-section profile 245a (see FIG. 13A). As further shown in FIG. 13C, the sides 52d terminate in bottom ends 56d that are not extended inward like the bottom ends 56 (see FIG. 13A) of the first cross-section profile 245a (see FIG. 13A), and the third cross-section profile 245c does not have the edge surfaces 57 (see FIG. 13A) of the first cross-section profile 245a. As further shown in FIG. 13C, the sides 52d of the third cross-section profile 245c are longer and have a greater length than the sides 52c of the second cross-section profile 245b.

Figure 14A:
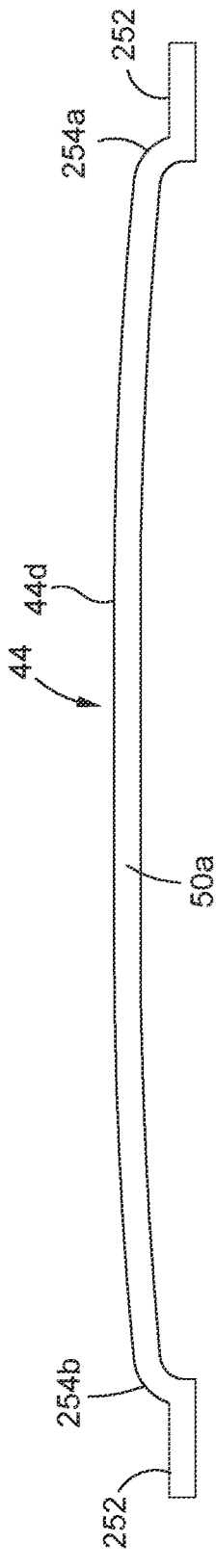
FIG. 14A is an illustration of a side view of a version of a spanner bar with end mount portions that may be used with a version of a support system of the disclosure.
Figure 14B:
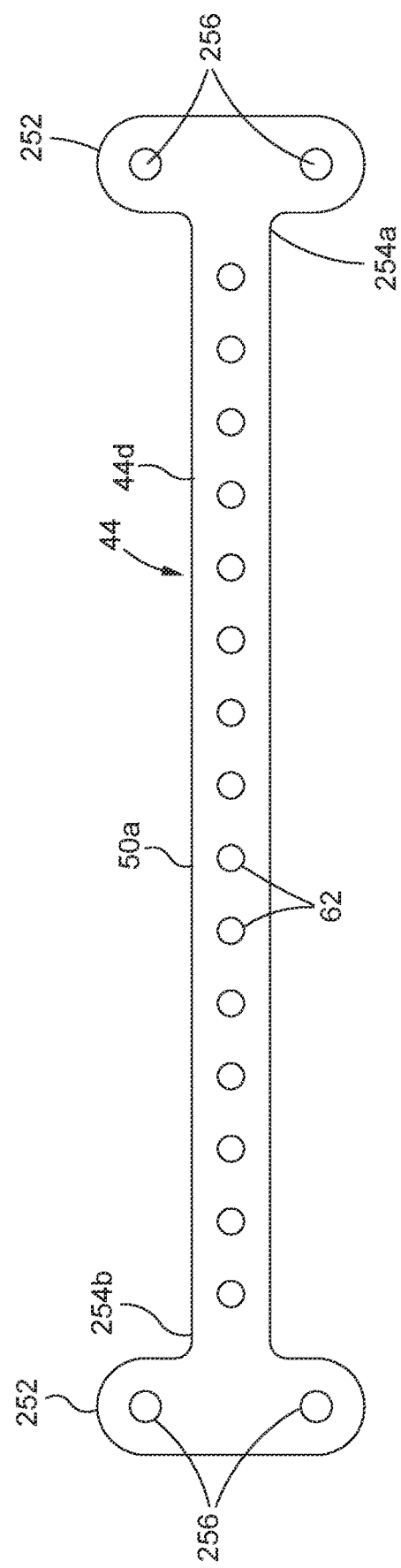
FIG. 14B is an illustration of a top view of the spanner bar of FIG. 14A.

Now referring to FIGS. 14A-14B, FIG. 14A is an illustration of a side view of a version of a spanner bar 44, such as in the form of an end mount spanner bar 44d, that may be used with a version of the support system 16 (see FIG. 1) of the disclosure, and FIG. 14B is an illustration of a top view of the spanner bar 44, such as in the form of the end mount spanner bar 44d, of FIG. 14A. As shown in FIGS. 14A-14B, the end mount spanner bar 44d has an elongate body 50a with a first end 254a and a second end 254b, where both the first end 254a and the second end 254b terminate with an end mount portion 252. As shown in FIG. 14B, the end mount spanner bar 44d has holes 62 formed through the elongate body 50a that are spaced an equal distance apart and are designed to accept multiple snap-on assemblies 14. As further shown in FIG. 14B, each end mount portion 252 of the end mount spanner bar 44d has fastener holes 256 for receiving fasteners (not shown) such as screws, bolts, or other suitable fasteners, to mount the end mount spanner bar 44d to upright structures, such as racks, frameworks, and the like, for example, in electronic equipment bays in vehicles 30 such as aircraft 30a (see FIG. 1). The end mount spanner bar 44d is preferably made of a composite material, such as a carbon fiber material, a polymeric material, or another suitable composite material. This version of the end mount spanner bar 44d does not require spacers and provides strong structural support.

Figure 15:
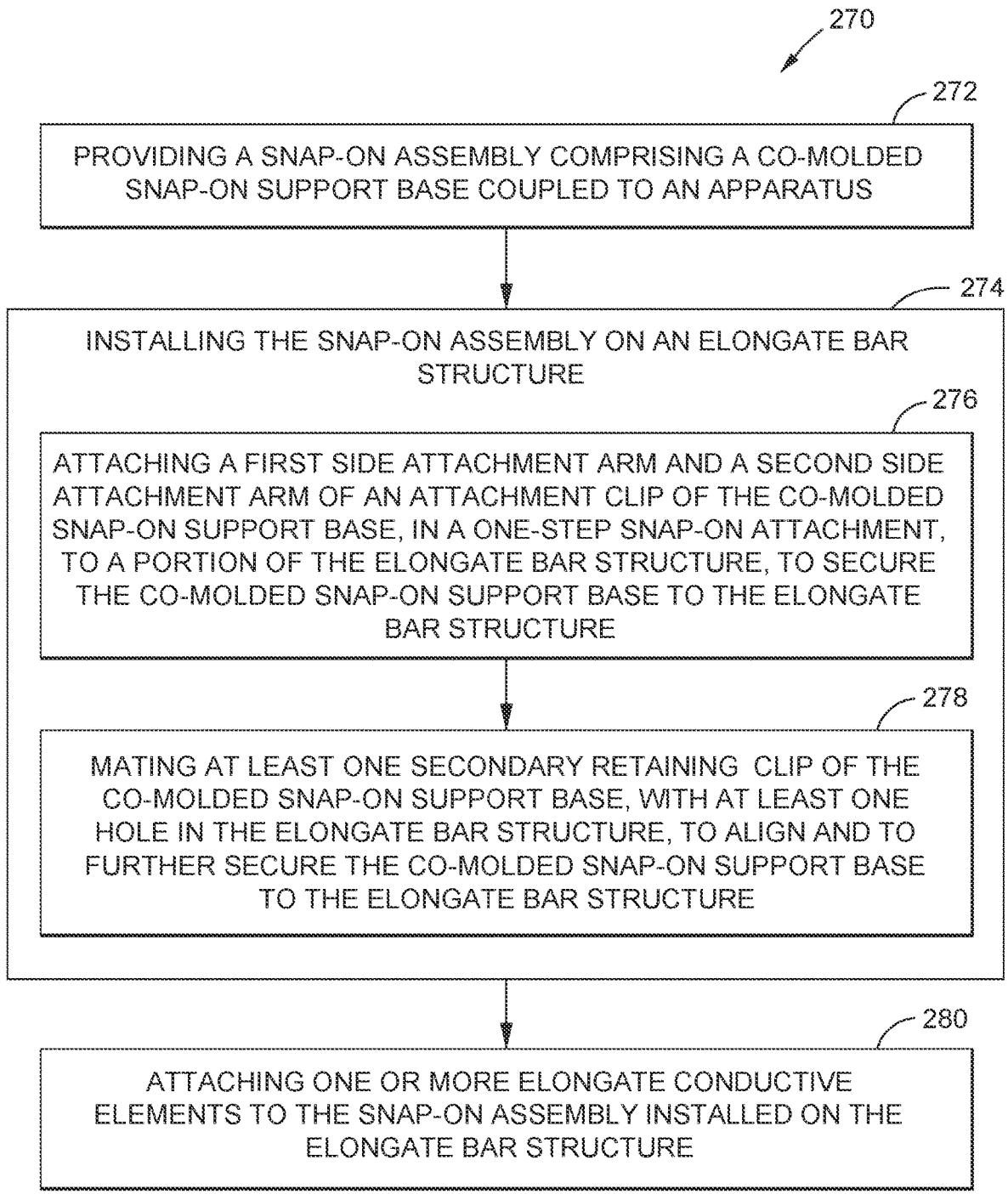
FIG. 15 is an illustration of a flow diagram of an exemplary version of a method of the disclosure.

As shown in FIG. 15, the method 270 comprises the step of providing 272 a snap-on assembly 14 (see FIG. 1) comprising the co-molded snap-on support base 10 (see FIG. 1) coupled to one of the apparatuses 12 (see FIG. 1). As discussed in detail above, the co-molded snap-on support base 10 comprises a top portion 72 (see FIG. 1) coupled to one of the apparatuses 12. The co-molded snap-on support base 10 further comprises a bottom portion 74 (see FIG. 1) co-molded with the top portion 72.

The bottom portion 74 comprises the attachment clip 90 (see FIG. 1) with the side attachment arms 96 (see FIG. 1), such as the first side attachment arm 96a (see FIG. 1) and the second side attachment arm 96b (see FIG. 1). In one version, as shown in FIGS. 2F, 2I, 2J, 3F, 6K, the bottom portion 74 of the co-molded snap-on support base 10 has openings 124, such as first openings 124a and second openings 124b, in the side attachment arms 96 of the bottom portion 74, that may receive an installation clip 158 (see FIG. 5), or another suitable fastener or attachment device, to further secure the co-molded snap-on support base 10 to the elongate bar structure 42, such as the spanner bar 44, if needed. A lateral retaining strip 102 (see FIG. 1) is formed on each of the first side attachment arm 96a and the second side attachment arm 96b.

The bottom portion 74 further comprises at least one secondary retaining clip 104 (see FIG. 1) projecting from the interior surface 93a (see FIG. 2a) of the bottom portion 74 of the co-molded snap-on support base 10 into a channel 106 (see FIGS. 1, 2A) formed between the first side attachment arm 96a and the second side attachment arm 96b.

The step of providing 272 the snap-on assembly 14 may further comprise, co-molding the top portion 72 of the co-molded snap-on support base 10 with one of the apparatuses 12 comprising, the monument 110 (see FIGS. 1, 3A-3H), or the ring post 112 (see FIGS. 1, 6A-6P). Where the apparatus 12 comprises the ring post 112, the ring post 112 comprises one or more rings 202. For example, the ring post 112 may have one of, one ring 202 (see FIG. 6L), two rings 202 (see FIG. 6M), three rings 202 (see FIG. 6N), four rings 202 (see FIG. 6A), five rings 202 (see FIG. 6O), or six rings 202 (see FIG. 6P). Each ring 202 has through openings 214 (see FIG. 6H), or slots, and spokes 212 (see FIG. 6H) separating the through openings 214, or slots. Where the ring post 112 has two or more rings 202, the rings 202 are tiered in alignment with each other and with the elongate bar structure 42.

The step of providing 272 the snap-on assembly 14 may further comprise, flattening one or more edges 240 of one or more rings 202 of the ring post 112, to obtain one or more flat side portions 238 (see FIG. 12A), to prevent wear on the elongate elements 26, such as wires 34 (see FIG. 12B) and/or the harness 28 bundling the wires 34, adjacent one or more rings 202, such as one or more flattened side rings 202c (see FIG. 12B). In this version of the ring post 112, each ring 202 of the ring post 112 has one or more flat side portions 238, to reduce or prevent wear on the elongate elements 26, such as the wires 34, and/or the harness 28 adjacent the ring 202, such as the flattened side ring 202c.

In another version, the ring post 112 may have an insert 215 (see FIG. 7), such as a metal rod insert 215a (see FIG. 7), disposed in an interior 207b (see FIG. 6H) of the ring post 112, along a length of the ring post 112, and through an interior portion 87b (see FIG. 7) of the top portion 72 (see FIG. 7), to provide support and reinforcement to the ring post 112. In another version, the second end 204b (see FIG. 8), or top end, of the ring post 112 is attached to a p-clamp 160, such as a latch p-clamp 160b (see FIG. 8) having a hollow centering base 224 (see FIG. 8) and a pair of legs 226 (see FIG. 8) each with a locking clip 222 (see FIG. 8), such as a second locking clip 222b (see FIG. 8). The hollow centering base 224 is attached to the second end 204b, or top end, of the ring post 112, and the pair of legs 226 with the locking clips 222, such as the second locking clips 222b, are attached to a topmost ring 202a (see FIG. 8) of the ring post 112 (see FIG. 8). The p-clamp 160, such as the latch p-clamp 160b, further has a hinged circular latch body 164a (see FIG. 8) with a latch closure 165 (see FIG. 8) having a locking clip 222, such as a first locking clip 222a (see FIG. 8).

The step of providing 272 the snap-on assembly 14 may further comprise, forming a threaded opening 88 (see FIGS. 2J, 2K) in a topmost end 76 of the top portion 72 of the co-molded snap-on support base 10, and attaching to the threaded opening 88 one of the apparatuses 12 comprising, a threaded end p-clamp assembly 114 (see FIG. 2L), a p-clamp fastener assembly 116 (see FIG. 2M), a threaded end ring post assembly 118 (see FIG. 2N), a ring post fastener assembly 120 (see FIG. 2O), a connector attachment plate fastener assembly 122 (see FIG. 1), or another suitable apparatus.

As shown in FIG. 15, the method 270 further comprises the step of installing 274 the snap-on assembly 14 on an elongate bar structure 42. The elongate bar structure 42 may be attached to, and in, the vehicle 30 or to, and in, an architectural structure 32. The step of installing 274 comprises the sub-step of attaching 276 (see FIG. 15) the first side attachment arm 96a and the second side attachment arm 96b of the attachment clip 90 of the co-molded snap-on support base in a one-step snap-on attachment 60 (see FIG. 1), to a portion 42a (see FIG. 1) of the elongate bar structure 42, so that the lateral retaining strips 102 of the first side attachment arm 96a and the second side attachment arm 96b clamp against bottom ends 56 (see FIG. 1) and/or edge surfaces 57 (see FIG. 9C) of the portion 42a of the elongate bar structure 42, to secure the co-molded snap-on support base 10 to the elongate bar structure 42.

The portion 42a of the elongate bar structure 42 is secured between the first side attachment arm 96a and the second side attachment arm 96b of the attachment clip 90, when the attachment clip 90 of the co-molded snap-on support base 10 is attached to, and installed on, the elongate bar structure 42.

As shown in FIG. 15, the step of installing 274 further comprises the sub-step of mating 278 the at least one secondary retaining clip 104 (see FIG. 1) of the co-molded snap-on support base 10, with at least one hole 62 (see FIG. 1) in the elongate bar structure 42, to align and to further secure the co-molded snap-on support base 10 to the elongate bar structure 42.

The step of installing 274 the snap-on assembly 14 on the elongate bar structure 42, including attaching the attachment clip 90 and the at least one secondary retaining clip 104 of the co-molded snap-on support base 10 in the one-step snap-on attachment 60 to the elongate bar structure 42 further comprises, installing the snap-on assembly 14 on the elongate bar structure 42 at a reduced installation time 22 (see FIG. 1) of five (5) seconds per snap-on assembly 14, including the co-molded snap-on support base 10, as compared to a one (1) minute time 18 of installation 20 per a known monument assembly attached to a spanner bar with a locking bar and an installation clip, or per a known ring post assembly attached to a spanner bar using one or more fastener devices.

As shown in FIG. 15, the method 270 further comprises the step of attaching 280 one or more of the elongate elements 26 (see FIG. 1) to the snap-on assembly 14 installed on the elongate bar structure 42, such as in the vehicle 30. The step of attaching 280 one or more of the elongate elements 26 to the snap-on assembly 14 installed on the elongate bar structure 42, such as in the vehicle 30, further comprises, attaching one or more of the elongate elements 26, such as on a harness 28, to the snap-on assembly 14 installed on the elongate bar structure 42 comprising a spanner bar 44 (see FIG. 1) in the vehicle 30 (see FIG. 1) comprising an aircraft 30a (see FIG. 1), and wherein the one or more of the elongate elements 26 comprise one or more of, wires 34 (see FIG. 1); cables 36 (see FIG. 1) including electrical cables 36a (see FIG. 1), current return network (CRN) cables 36b (see FIG. 1), data bus cables 36c (see FIG. 1), fiber optic cables 36d (see FIG. 1), high speed transmission cables 36e (see FIG. 1), coaxial cables 36f (see FIG. 1), or another suitable cable; tubes 38 (see FIG. 1); hoses 40 (see FIG. 1); or other suitable elongate elements. The elongate elements 26 may comprise elongate conductive elements 26a (see FIG. 1), such as wires 34, and electrical cables 36a. The co-molded snap-on support base 10 of the snap-on assembly 14 is attached to the elongate bar structure 42 without the use of tools or fasteners.

Figure 16:
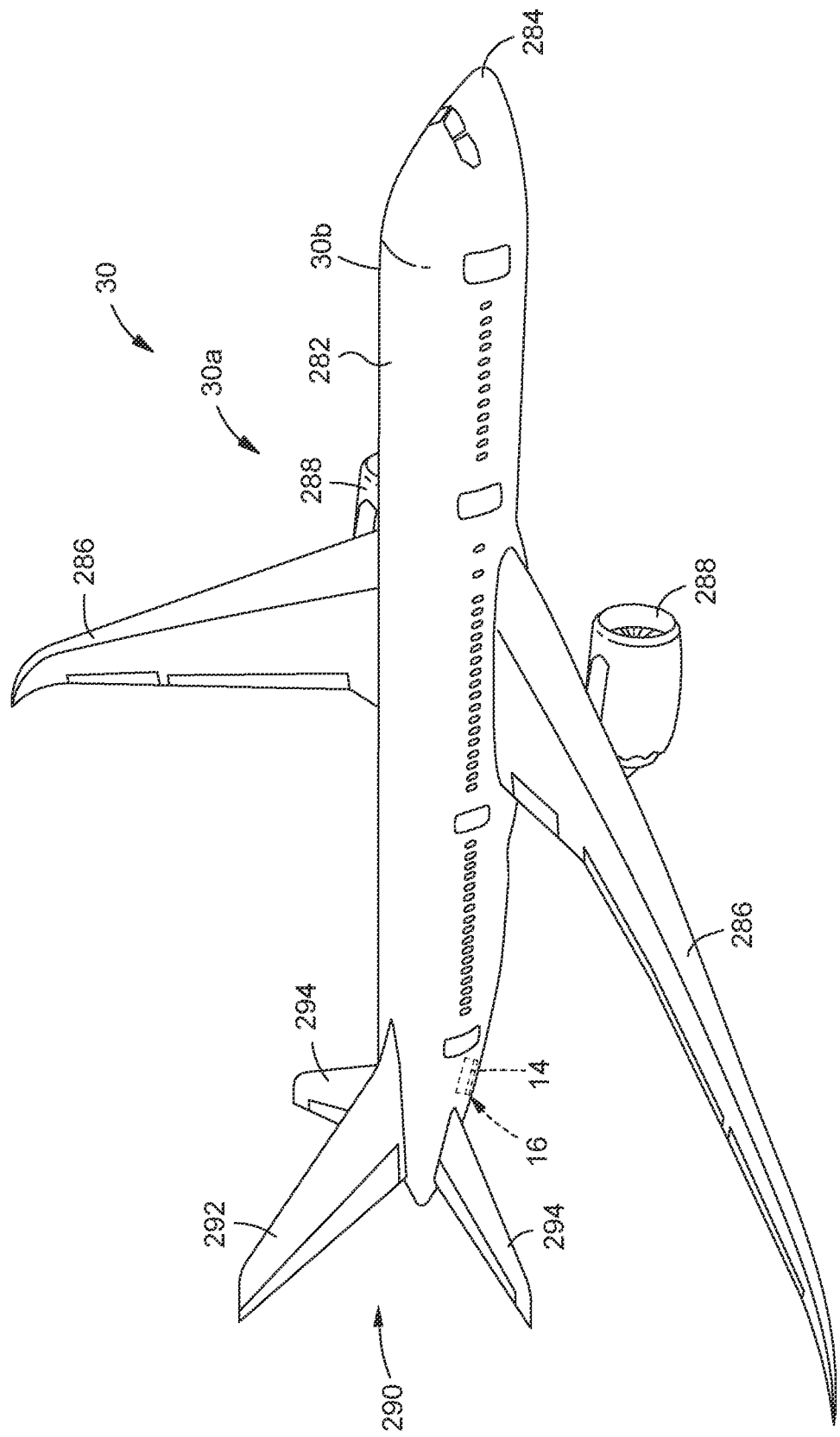
FIG. 16 is an illustration of a perspective view of an aircraft incorporating one or more versions of a support system of the disclosure.

Now referring to FIG. 16, FIG. 16 is an illustration of a perspective view of a vehicle such as an aircraft 30a, for example, a commercial aircraft 30b, incorporating the support system 16 with the snap-on assembly 14 having the co-molded snap-on support base 10 (see FIGS. 1, 2A) coupled to one of the apparatuses 12 (see FIG. 1), such as the monument 110 (see FIGS. 1, 3A), the ring post 112 (see FIGS. 1, 6A), or another apparatus, as discussed above. As shown in FIG. 16, the vehicle 30, such as the aircraft 30a, for example, the commercial aircraft 30b, includes a fuselage 282, a nose 284, wings 286, engines 288, and an empennage 290. As shown in FIG. 16, the empennage 290 comprises a vertical stabilizer 292 and horizontal stabilizers 294. In one illustrative version, as shown in FIG. 16, the support system 16 with the snap-on assembly 14 is shown in a cargo section of the vehicle 30, such as the aircraft 30a, for example, the commercial aircraft 30b. The vehicle 30 may also include rotorcraft 30c (see FIG. 1), spacecraft 30d (see FIG. 1), watercraft 30e (see FIG. 1), automobiles 30f (see FIG. 1), and other suitable vehicles, or in an architectural structure 32 (see FIG. 1), such as a building 32a (see FIG. 1), or other suitable architectural structures.

Figure 17:
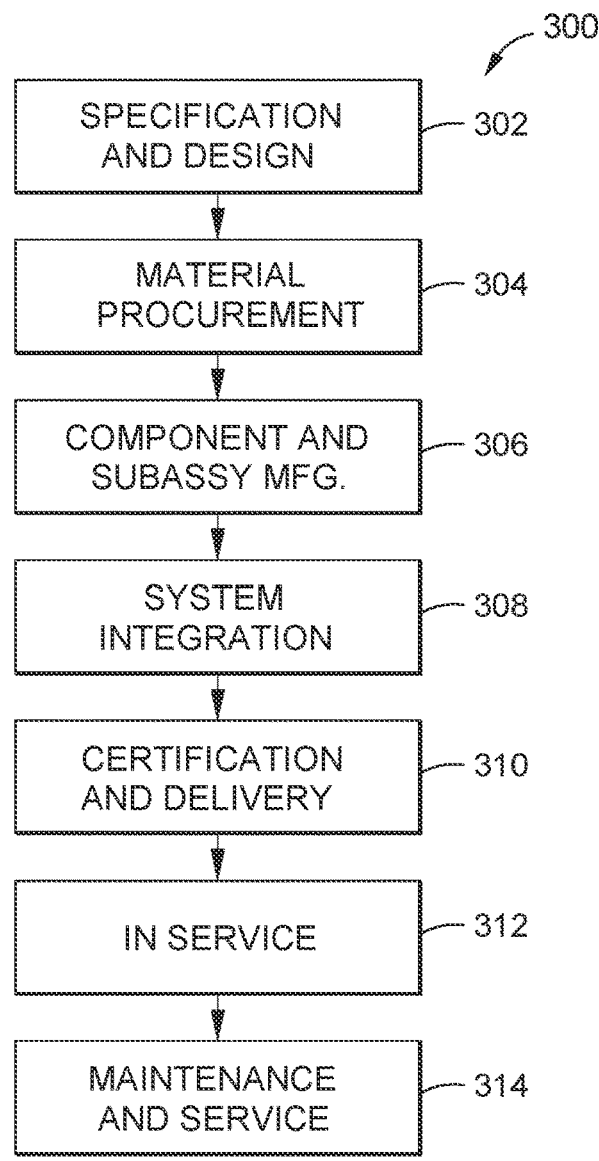
FIG. 17 is an illustration of a flow diagram of an exemplary aircraft manufacturing and service method.
Figure 18:
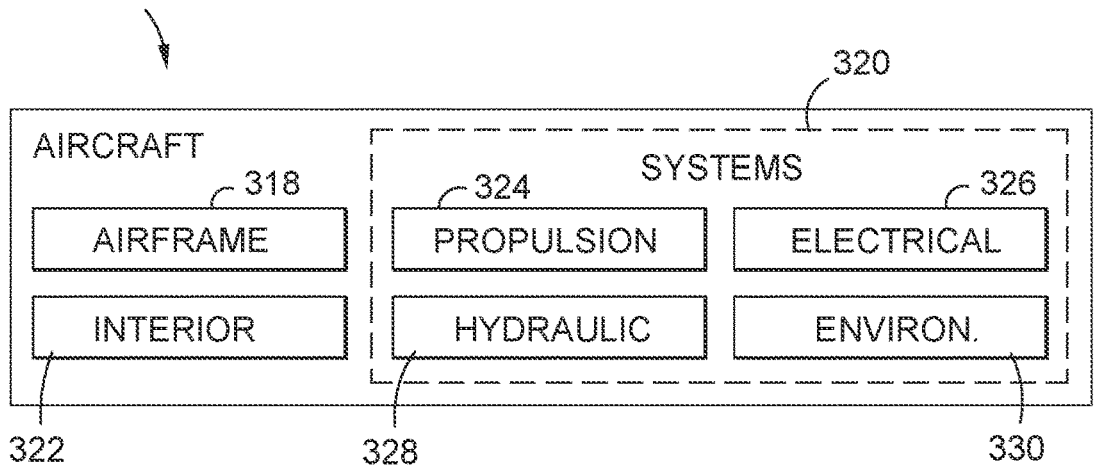
FIG. 18 is an illustration of an exemplary block diagram of an aircraft.

Now referring to FIGS. 17 and 18, FIG. 17 is an illustration of a flow diagram of an exemplary aircraft manufacturing and service method 300, and FIG. 18 is an illustration of an exemplary block diagram of an aircraft 316. Referring to FIGS. 17 and 18, versions of the disclosure may be described in the context of the aircraft manufacturing and service method 300 as shown in FIG. 17, and the aircraft 316 as shown in FIG. 18.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 18, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the co-molded snap-on support base 10 (see FIGS. 1, 2A-2K), the support system 16 (see FIGS. 1, 4, 10A), and the method 270 (see FIG. 15) provide for a snap-on assembly 14 with the co-molded snap-on support base 10 having built-in side attachment arms 96 (see FIG. 1) with lateral retaining strips 102 (see FIG. 1) and one, two, or three secondary retaining clips 104 (see FIG. 1), where the co-molded snap-on support base 10 is co-molded to the apparatus 12 (see FIG. 1), such as the monument 110, ring post 112, or other apparatus. Disclosed versions of the co-molded snap-on support base 10 (see FIGS. 1, 2A-2K), the support system 16 (see FIGS. 1, 4, 10A), and the method 270 (see FIG. 15) provide for a single piece locking base component 70 (see FIG. 1) in the form of the snap-on assembly 14 (see FIGS. 1, 3A, 6A) having the co-molded snap-on support base 10 coupled, such as co-molded or attached, to the apparatus 12 (see FIG. 1), such as the monument 110 (see FIG. 3A) or the ring post 112 (see FIG. 6A) or another suitable apparatus 12, and that is attached to an elongate bar structure 42 (see FIGS. 1, 4, 9A), such as a spanner bar 44 (see FIGS. 1, 4, 9A), in a one-step snap-on attachment 60 (see FIG. 1), without the use of additional tools or hardware, such as clips, fasteners, and the like. This allows for the assembly and routing of elongate elements 26, such as wires 34 (see FIG. 1) and cables 36 (see FIG. 1), and harnesses 28 for bundling the elongate elements 26, to be installed and completed much more quickly and efficiently, while also removing weight from the vehicle 30 (see FIG. 1), such as an aircraft 30a (see FIGS. 1, 16), by eliminating or reducing the use of clips, fasteners, washers, nuts, and other hardware used to secure known monuments and ring posts to the elongate bar structure 42, such as the spanner bar 44, in the vehicle 30, such as the aircraft 30a.

In addition, disclosed versions of the co-molded snap-on support base 10 (see FIGS. 1, 2A-2K), the support system 16 (see FIGS. 1, 4, 10A), and the method 270 (see FIG. 15) provide for a single piece co-molded snap-on assembly 14 that is easy to manufacture, quick to install and remove, and is less complex to install and assemble since no, or a reduced number of, tools and hardware are needed. For example, the one-step snap-on attachment 60 does not require the use of added fasteners, washers, nuts, or other fastener assembly components to attach ring posts 112 or monuments 110 to, and under, the spanner bar 44, and thus weight to the vehicle 30, such as the aircraft 30a, is reduced. Moreover, manually rotating ring posts to the spanner bar 44, threadably coupling ring posts to the spanner bar 44, and attaching the ring posts on the bottom side of the spanner bar 44 with fasteners, washers, and/or nuts to secure the ring posts, is avoided with use of the co-molded snap-on support base 10 disclosed herein. Moreover, having to attach installation clips to install monuments on the spanner bar 44 is not required with the co-molded snap-on support base 10 disclosed herein. Use of installation clips 158 (see FIG. 5) is merely optional if further securement of the snap-on assembly 14 to the spanner bar 44 is desired. Disclosed versions of the co-molded snap-on support base 10 (see FIGS. 1, 2A-2K), the support system 16 (see FIGS. 1, 4, 10A), and the method 270 (see FIG. 15) do not require the use of numerous tools, such as drills, screwdrivers, wrenches, or other tools, that may be needed to build a ring post stack-up on the spanner bar 44, or that may be needed to attach the ring post or monument to the spanner bar 44. The use of the co-molded snap-on support base 10 avoids the use of numerous tools, and thus avoids the need for tracking and/or calibration of such tools, and avoids the risk of lost tools in a manufacturing area.

Disclosed versions of the co-molded snap-on support base 10 (see FIGS. 1, 2A-2K), the support system 16 (see FIGS. 1, 4, 10A), and the method 270 (see FIG. 15) reduce the time 18 (see FIG. 1) of installation 20 (see FIG. 1) of the co-molded snap-on support base 10, to obtain a reduced installation time 22 (see FIG. 1) for routing and attaching the elongate elements 26, such as wires 34 (see FIG. 1) and cables 36 (see FIG. 1), and harnesses 28 for bundling the elongate elements 26. This results in a significant decrease in the time 18 of installation 20, and assembly and labor to install and assemble, and in turn, may result in significant cost savings during manufacture and assembly. For example, installing the snap-on assembly 14 of the disclosure on the elongate bar structure 42 has a reduced installation time 22 of five (5) seconds per snap-on assembly 14, that includes the co-molded snap-on support base 10 co-molded to the monument 110 or ring post 112, as compared to a one (1) minute installation time per a known monument assembly attached to a spanner bar with an installation clip, or per a known ring post assembly attached to a spanner bar using one or more tools and fastener devices. Moreover, the ergonomics of installation of the snap-on assembly 14 of the disclosure use one motion per installation of the snap-on assembly 14. Thus, the ergonomics of installation of the snap-on assembly 14 may be improved with less motions involved than with installation of known assemblies.

Moreover, disclosed versions of the co-molded snap-on support base 10 (see FIGS. 1, 2A-2K), the support system 16 (see FIGS. 1, 4, 10A), and the method 270 (see FIG. 15) do not require "clocking" of the ring posts, when stacking the ring posts together, since versions of the ring posts 112 used in the support system 16 include ring posts 112 having from 1 to 6 rings 202 co-molded to the co-molded snap-on support base 10 to arrive at a one-piece snap-on assembly 14 for attachment to the elongate bar structure 42, such as the spanner bar 44. This avoids the extensive time and labor involved in correctly clocking the ring posts, and may result in decreased manufacturing and assembly costs.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A co-molded snap-on support base comprising:
a top portion;
a bottom portion co-molded with the top portion, the bottom portion comprising:
an attachment clip designed for a one-step snap-on attachment to an elongate bar structure, the attachment clip comprising:
a first side attachment arm and a second side attachment arm, to secure the co-molded snap-on support base to a portion of the elongate bar structure, the first side attachment arm and the second side attachment arm each having a sloped surface portion with a first end adjacent a bottommost end of the bottom portion and with a second end; and
a lateral retaining strip formed on each of the first side attachment arm and the second side attachment arm, to clamp against bottom ends of the portion of the elongate bar structure, each lateral retaining strip having a first side surface adjacent the second end of the sloped surface portion, and each lateral retaining strip having a square shaped profile or a rectangular shaped profile; and at least one secondary retaining clip projecting from an interior surface of the bottom portion of the co-molded snap-on support base into a channel formed between the first side attachment arm and the second side attachment arm, the at least one secondary retaining clip designed to mate with at least one hole in the elongate bar structure, to align and to further secure the co-molded snap-on support base to the elongate bar structure, and the at least one secondary retaining clip consisting of two clip portions, including a first clip portion with a flat side opposite a flat side of a second clip portion and with a gap between the flat side of the first clip portion and the flat side of the second clip portion, each of the first clip portion and the second clip portion having a stem portion extending downwardly from the interior surface of the bottom portion, and having a head portion integral with, and extending downwardly from the stem portion, and a top end of the head portion having a greater width than the stem portion, and each of the first clip portion and the second clip portion having a one-half truncated cone shape profile, wherein the co-molded snap-on support base is used to reduce a time of installation of apparatuses for routing elongate elements.

2. The co-molded snap-on support base of claim 1, wherein the top portion has curved support surface elements on first opposite sides of the top portion, the curved support surface elements designed to support the elongate elements, or to support a harness bundling the elongate elements.

3. The co-molded snap-on support base of claim 1, wherein the top portion has a threaded opening formed in a topmost end of the top portion, and the threaded opening is configured for attachment to one of the apparatuses comprising, a threaded end p-clamp assembly, a p-clamp fastener assembly, a threaded end ring post assembly, a ring post fastener assembly, or a connector attachment plate fastener assembly.

4. The co-molded snap-on support base of claim 1, wherein the top portion of the co-molded snap-on support base is co-molded with one of the apparatuses comprising, a monument, or a ring post.

5. The co-molded snap-on support base of claim 4, wherein the ring post has a metal rod insert disposed in an interior of a ring post body of the ring post, to provide support and reinforcement to the ring post.

6. The co-molded snap-on support base of claim 4, wherein the ring post is attached to a latch p-clamp having a hollow centering base and legs with locking clips, the hollow centering base attached to the ring post, and the locking clips attached to a topmost ring of the ring post.

7. The co-molded snap-on support base of claim 4, wherein the ring post comprises one or more rings, and wherein two or more of the rings are tiered in alignment with each other and with the elongate bar structure.

8. The co-molded snap-on support base of claim 7, wherein the ring post comprises one of, one ring, two rings, three rings, four rings, five rings, or six rings.

9. The co-molded snap-on support base of claim 7, wherein each ring of the ring post has one or more flat side portions, to reduce or prevent wear on the elongate elements adjacent the ring.

10. The co-molded snap-on support base of claim 1, wherein the elongate elements comprise one or more of, wires; cables, including electrical cables, current return network cables, data bus cables, fiber optic cables, high speed transmission cables, and coaxial cables; tubes; and hoses.

11. The co-molded snap-on support base of claim 1, wherein the elongate bar structure comprises a spanner bar.

12. The co-molded snap-on support base of claim 1, wherein the co-molded snap-on support base comprises one of, one secondary retaining clip, two secondary retaining clips, or three secondary retaining clips.

13. A support system using a co-molded snap-on support base, to reduce a time of installation of apparatuses for routing elongate elements, the support system comprising:
an elongate bar structure comprising a spanner bar;
a snap-on assembly comprising the co-molded snap-on support base coupled to one of the apparatuses, the co-molded snap-on support base comprising:
a top portion coupled to one of the apparatuses;
a bottom portion co-molded with the top portion, the bottom portion comprising:
an attachment clip designed for a one-step snap-on attachment to the elongate bar structure, the attachment clip comprising:
a first side attachment arm and a second side attachment arm, to secure the co-molded snap-on support base to a portion of the elongate bar structure, the first side attachment arm and the second side attachment arm each having a sloped surface portion with a first end adjacent a bottommost end of the bottom portion and with a second end; and
a lateral retaining strip formed on each of the first side attachment arm and the second side attachment arm, to clamp against bottom ends of the portion of the elongate bar structure, each lateral retaining strip having a first side surface adjacent the second end of the sloped surface portion, and each lateral retaining strip having a square shaped profile or a rectangular shaped profile; and
at least one secondary retaining clip projecting from an interior surface of the bottom portion of the co-molded snap-on support base into a channel formed between the first side attachment arm and the second side attachment arm, the at least one secondary retaining clip designed to mate with at least one hole in the elongate bar structure, to align and to further secure the co-molded snap-on support base to the elongate bar structure, and the at least one secondary retaining clip consisting of two clip portions, including a first clip portion with a flat side opposite a flat side of a second clip portion and with a gap between the flat side of the first clip portion and the flat side of the second clip portion, each of the first clip portion and the second clip portion having a stem portion extending downwardly from the interior surface of the bottom portion, and having a head portion integral with, and extending downwardly from the stem portion, and a top end of the head portion having a greater width than the stem portion, and each of the first clip portion and the second clip portion having a one-half truncated cone shape profile; and
one or more of the elongate elements attached to the snap-on assembly, wherein the co-molded snap-on support base is used to reduce the time of installation of the apparatuses for routing the elongate elements in a vehicle.

14. The support system of claim 13, wherein the top portion of the co-molded snap-on support base is co-molded with one of the apparatuses comprising, a monument, or a ring post.

15. The support system of claim 13, wherein the top portion has a threaded opening formed in a topmost end of the top portion, and the threaded opening is configured for attachment to one of the apparatuses comprising, a threaded end p-clamp assembly, a p-clamp fastener assembly, a threaded end ring post assembly, a ring post fastener assembly, or a connector attachment plate fastener assembly.

16. The support system of claim 13, wherein the vehicle comprises an aircraft, and the elongate elements comprise one or more of, wires; cables, including electrical cables, current return network cables, data bus cables, fiber optic cables, high speed transmission cables, and coaxial cables; tubes; and hoses.

17. A method of using a co-molded snap-on support base, to reduce a time of installation of apparatuses for routing elongate elements in a vehicle, the method comprising the steps of:
providing a snap-on assembly comprising the co-molded snap-on support base coupled to one of the apparatuses, the co-molded snap-on support base comprising:
a top portion coupled to one of the apparatuses;
a bottom portion co-molded with the top portion, the bottom portion comprising:
an attachment clip with a first side attachment arm, a second side attachment arm, and a lateral retaining strip formed on each of the first side attachment arm and the second side attachment arm, the first side attachment arm and the second side attachment arm each having a sloped surface portion with a first end adjacent a bottommost end of the bottom portion and with a second end, and each lateral retaining strip having a first side surface adjacent the second end of the sloped surface portion, and each lateral retaining strip having a square shaped profile or a rectangular shaped profile; and
at least one secondary retaining clip projecting from an interior surface of the bottom portion of the co-molded snap-on support base into a channel formed between the first side attachment arm and the second side attachment arm, and the at least one secondary retaining clip consisting of two clip portions, including a first clip portion with a flat side opposite a flat side of a second clip portion and with a gap between the flat side of the first clip portion and the flat side of the second clip portion,
each of the first clip portion and the second clip portion having a stem portion extending downwardly from the interior surface of the bottom portion, and having a head portion integral with, and extending downwardly from the stem portion, and a top end of the head portion having a greater width than the stem portion, and each of the first clip portion and the second clip portion having a one-half truncated cone shape profile;
installing the snap-on assembly on an elongate bar structure, with sub-steps of:
attaching the first side attachment arm and the second side attachment arm of the attachment clip of the co-molded snap-on support base, in a one-step snap-on attachment, to a portion of the elongate bar structure, so that the lateral retaining strips of the first side attachment arm and the second side attachment arm clamp against bottom ends of the portion of the elongate bar structure, to secure the co-molded snap-on support base to the elongate bar structure, and
mating the at least one secondary retaining clip of the co-molded snap-on support base, with at least one hole in the elongate bar structure, to align and to further secure the co-molded snap-on support base to the elongate bar structure; and
attaching one or more of the elongate elements to the snap-on assembly installed on the elongate bar structure in the vehicle.

18. The method of claim 17, wherein the step of providing the snap-on assembly further comprises, co-molding the top portion of the co-molded snap-on support base with one of the apparatuses comprising, a monument, or a ring post.

19. The method of claim 17, wherein the step of providing the snap-on assembly further comprises, forming a threaded opening in a topmost end of the top portion of the co-molded snap-on support base, and attaching to the threaded opening one of the apparatuses comprising, a threaded end p-clamp assembly, a p-clamp fastener assembly, a threaded end ring post assembly, a ring post fastener assembly, or a connector attachment plate fastener assembly.

20. The method of claim 17, wherein the step of attaching one or more of the elongate elements to the snap-on assembly installed on the elongate bar structure in the vehicle further comprises, attaching one or more of the elongate elements to the snap-on assembly installed on the elongate bar structure comprising a spanner bar in the vehicle comprising an aircraft, and wherein the one or more of the elongate elements comprise one or more of, wires; cables, including electrical cables, current return network cables, data bus cables, fiber optic cables, high speed transmission cables, and coaxial cables; tubes; and hoses.

* * * * *